United States Patent
Lee

(10) Patent No.: US 10,645,427 B2
(45) Date of Patent: May 5, 2020

(54) MULTIMEDIA DEVICE AND CONTROL METHOD THEREFOR

(71) Applicant: LG ELECTRONICS INC., Seoul (KR)

(72) Inventor: Inchul Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 180 days.

(21) Appl. No.: 15/529,960

(22) PCT Filed: Aug. 20, 2015

(86) PCT No.: PCT/KR2015/008705
§ 371 (c)(1),
(2) Date: May 25, 2017

(87) PCT Pub. No.: WO2016/085094
PCT Pub. Date: Jun. 2, 2016

(65) Prior Publication Data
US 2017/0332116 A1  Nov. 16, 2017

(30) Foreign Application Priority Data
Nov. 25, 2014 (KR) .................. 10-2014-0165093

(51) Int. Cl.
*H04N 21/2343* (2011.01)
*H04N 21/845* (2011.01)
(Continued)

(52) U.S. Cl.
CPC ... *H04N 21/234345* (2013.01); *H04N 19/184* (2014.11); *H04N 21/236* (2013.01);
(Continued)

(58) Field of Classification Search
CPC .................................................. H04N 19/184
See application file for complete search history.

(56) References Cited

U.S. PATENT DOCUMENTS 9,009,341 B2 * 4/2015 Edholm ................. H04N 7/152
709/231
9,143,812 B2 * 9/2015 Braness ........... H04N 21/23439
(Continued)

FOREIGN PATENT DOCUMENTS

KR    1020110063011       6/2011
KR    1020130008548       1/2013
(Continued)

OTHER PUBLICATIONS

European Patent Office Application Serial No. 15862383.5, Search Report dated Mar. 20, 2018, 10 pages.
(Continued)

*Primary Examiner* — Paulos M Natnael
(74) *Attorney, Agent, or Firm* — Lee, Hong, Degerman, Kang & Waimey PC

(57) ABSTRACT

A multimedia device and a control method therefor are disclosed. The multimedia device according to one embodiment of the present invention comprises: a reception unit for receiving a stream segment, of a first bitrate, among stream segments, which constitute first content, of several bitrates; a display unit for displaying video data corresponding to the received stream segment of the first bitrate; and a control unit, wherein the control unit detects a size change of a screen on which the video data is displayed, requests a stream segment of a second bitrate, which is different from the first bitrate, on the basis of the detected size change of the screen, controls the reception unit such that the reception unit receives the requested stream segment of the second bitrate, and controls the display unit such that the display unit displays video data corresponding to the received stream segment of the second bitrate.

16 Claims, 28 Drawing Sheets

(51) Int. Cl.
  *H04N 21/442* (2011.01)
  *H04N 21/24* (2011.01)
  *H04N 21/6373* (2011.01)
  *H04N 21/431* (2011.01)
  *H04N 21/236* (2011.01)
  *H04N 19/184* (2014.01)
  *H04N 21/4402* (2011.01)
(52) U.S. Cl.
  CPC ............ *H04N 21/23439* (2013.01); *H04N 21/234363* (2013.01); *H04N 21/2402* (2013.01); *H04N 21/431* (2013.01); *H04N 21/4402* (2013.01); *H04N 21/44209* (2013.01); *H04N 21/6373* (2013.01); *H04N 21/8456* (2013.01)

(56) References Cited

U.S. PATENT DOCUMENTS

| | | | | |
|---|---|---|---|---|
| 10,097,746 | B2* | 10/2018 | Lasher | H04N 5/23206 |
| 10,200,725 | B2* | 2/2019 | Tatourian | H04N 21/23434 |
| 2007/0039032 | A1 | 2/2007 | Goldey et al. | |
| 2011/0158313 | A1* | 6/2011 | Ogata | H04N 7/181 375/240.02 |
| 2011/0307623 | A1 | 12/2011 | George et al. | |
| 2012/0001914 | A1* | 1/2012 | Pan | G06Q 30/0241 345/428 |
| 2013/0195204 | A1 | 8/2013 | Reznik et al. | |
| 2013/0297743 | A1 | 11/2013 | Eschet et al. | |
| 2014/0006635 | A1* | 1/2014 | Braness | H04N 21/23439 709/231 |
| 2014/0133836 | A1* | 5/2014 | Burns | G11B 27/10 386/278 |
| 2014/0189582 | A1* | 7/2014 | Igari | G06F 3/04845 715/799 |
| 2016/0247300 | A1* | 8/2016 | Takata | G06F 16/5854 |
| 2016/0366454 | A1* | 12/2016 | Tatourian | H04N 21/23434 |

FOREIGN PATENT DOCUMENTS

| | | |
|---|---|---|
| KR | 1020130088234 | 8/2013 |
| KR | 101446808 | 9/2014 |
| KR | 1020140107251 | 9/2014 |

OTHER PUBLICATIONS

PCT International Application No. PCT/KR2015/008705, Written Opinion of the International Searching Authority dated Dec. 15, 2015, 19 pages.

European Patent Office Application Serial No. 15862383.5, Office Action dated Jul. 2, 2019, 6 pages.

European Patent Office Application No. 15862383.5, Office Action dated Feb. 4, 2020, 8 pages.

* cited by examiner

FIG. 19
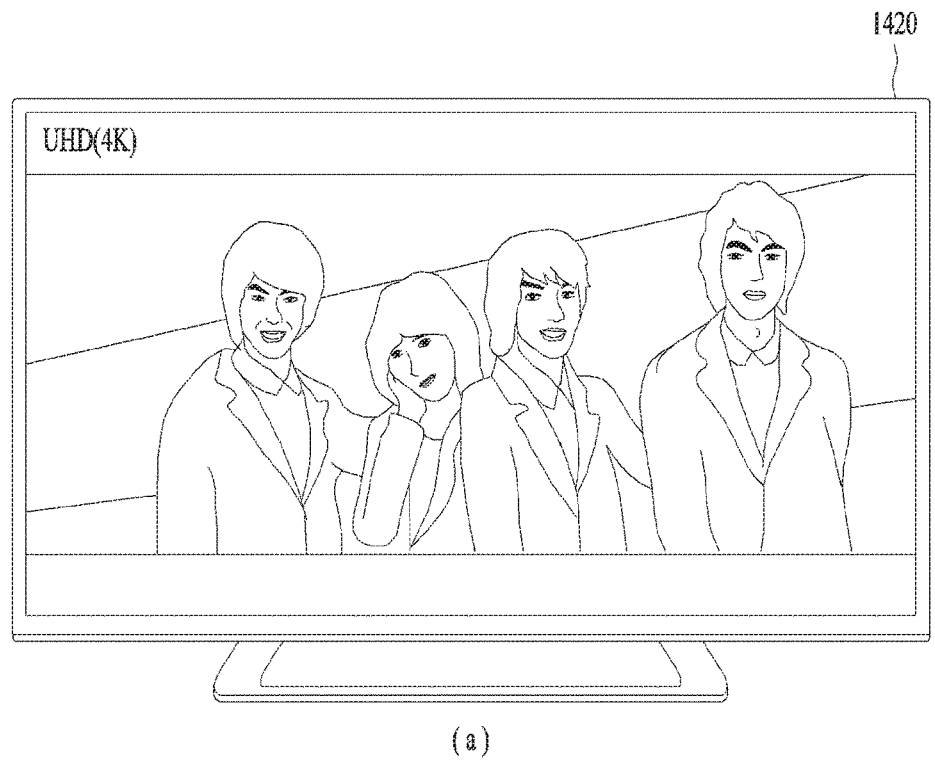
(a)
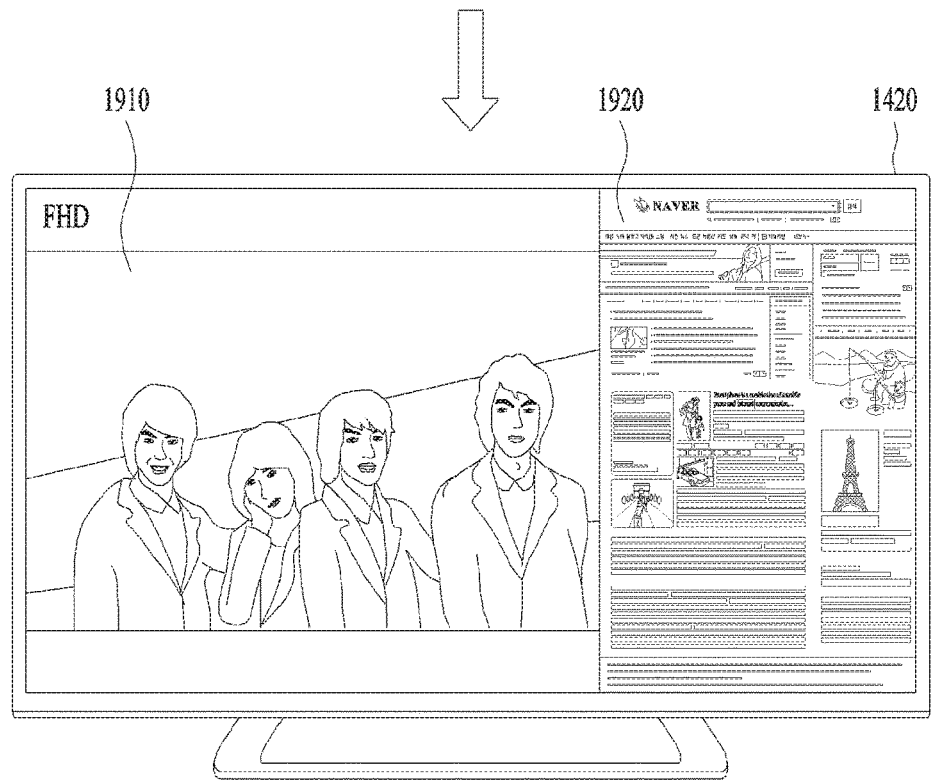
(b)

FIG. 21
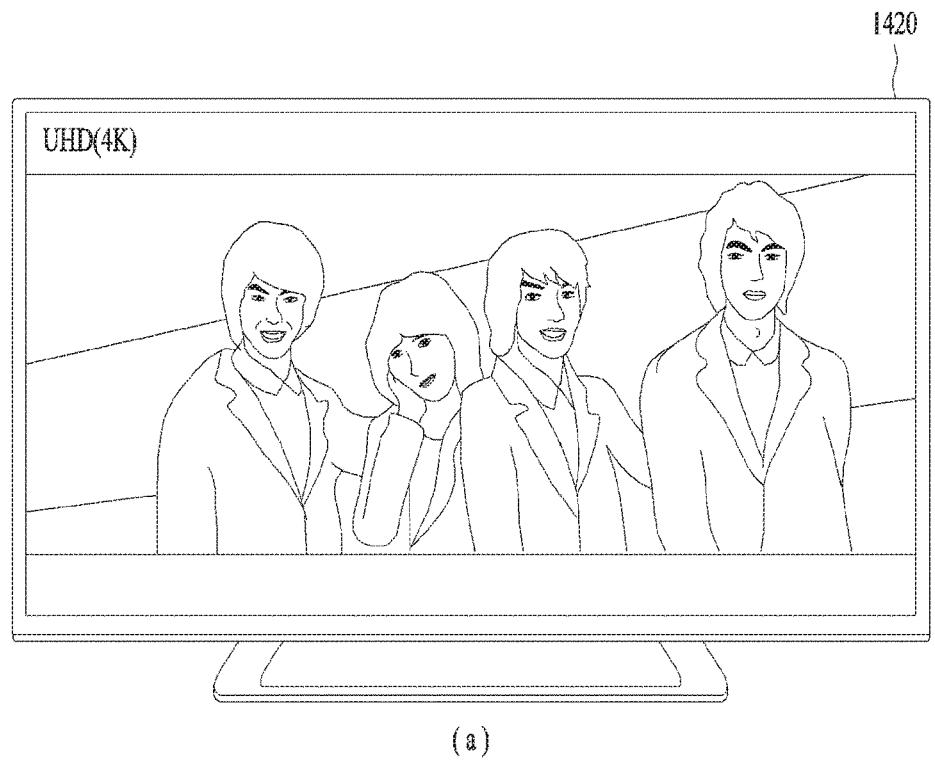
(a)
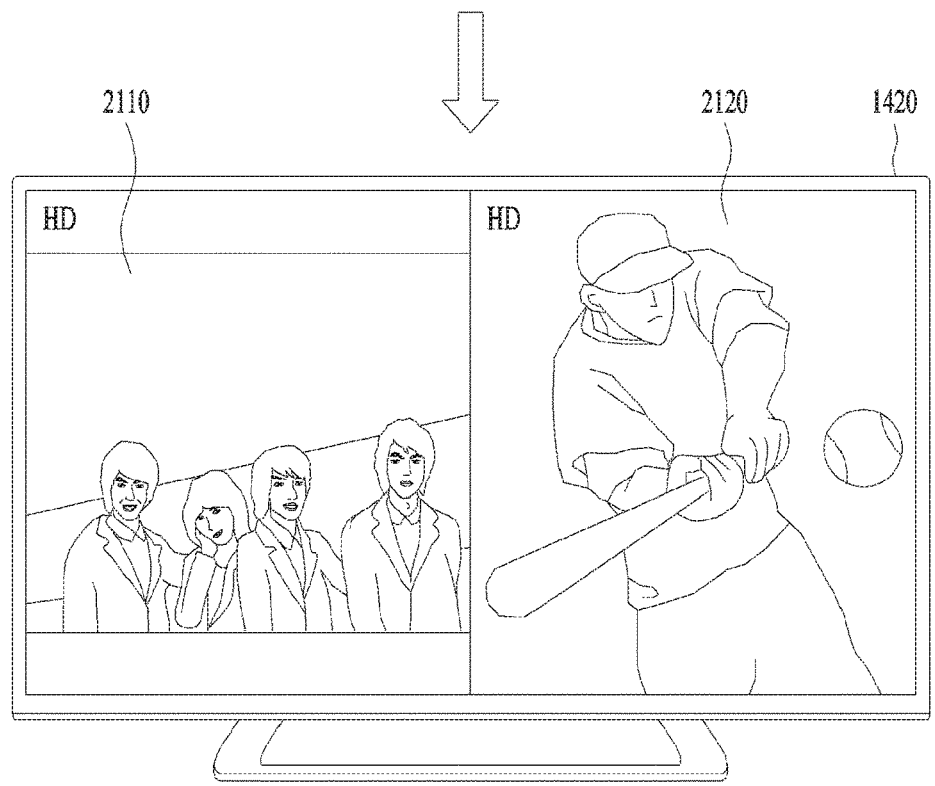
(b)

FIG. 23
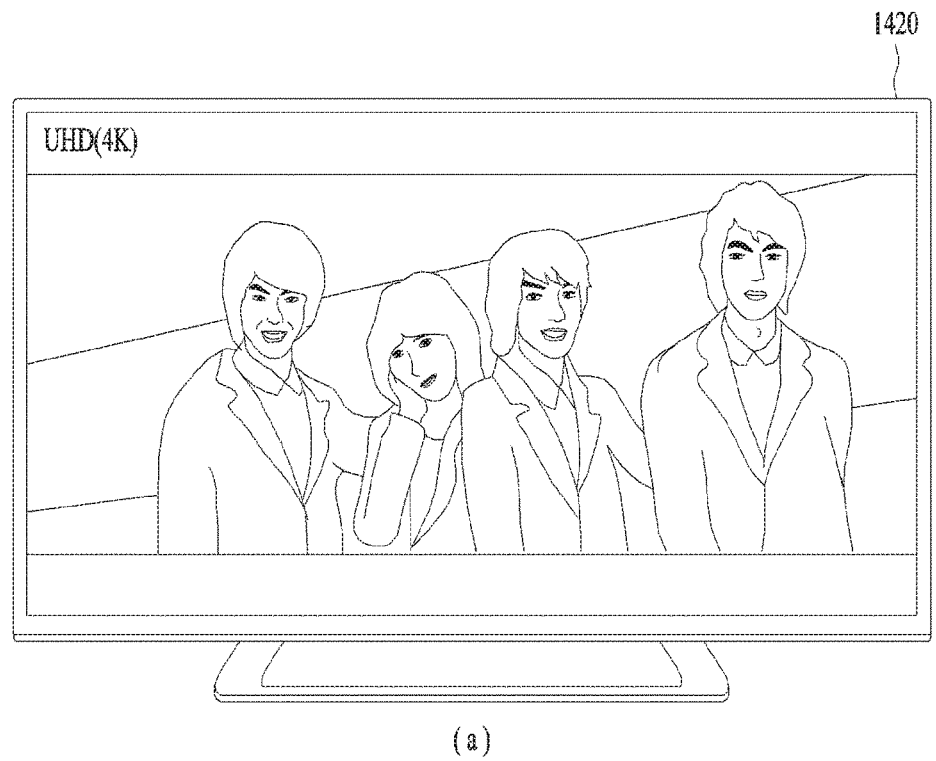
(a)
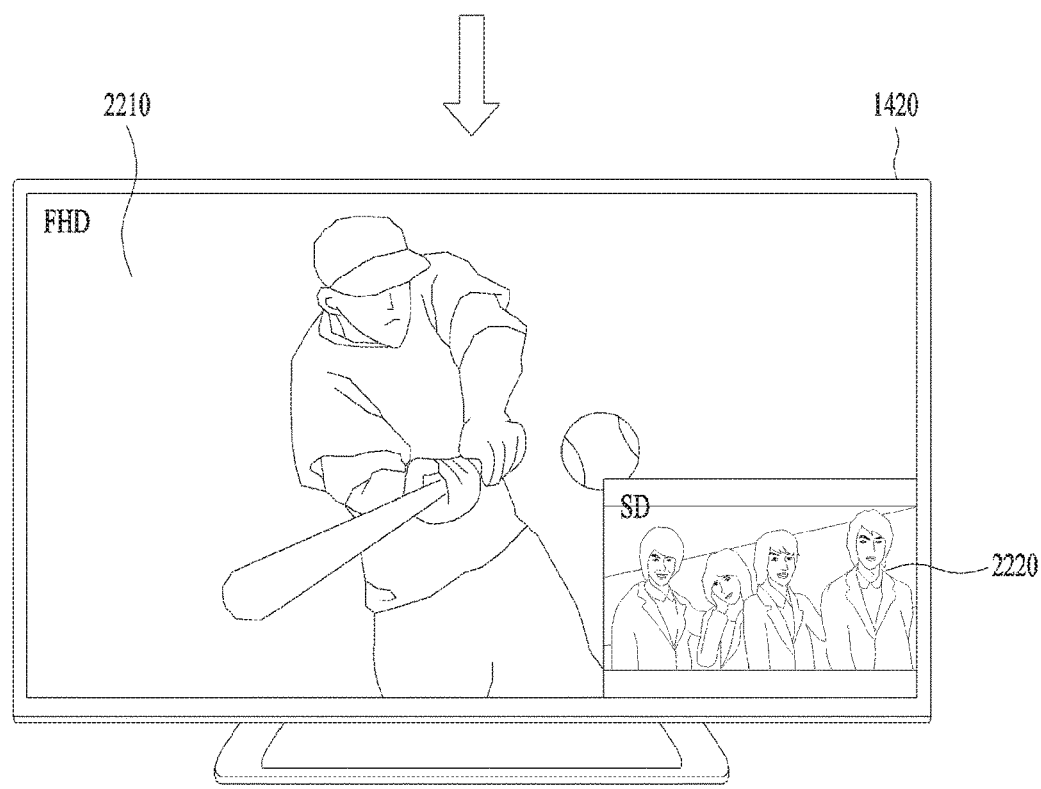
(b)

FIG. 24
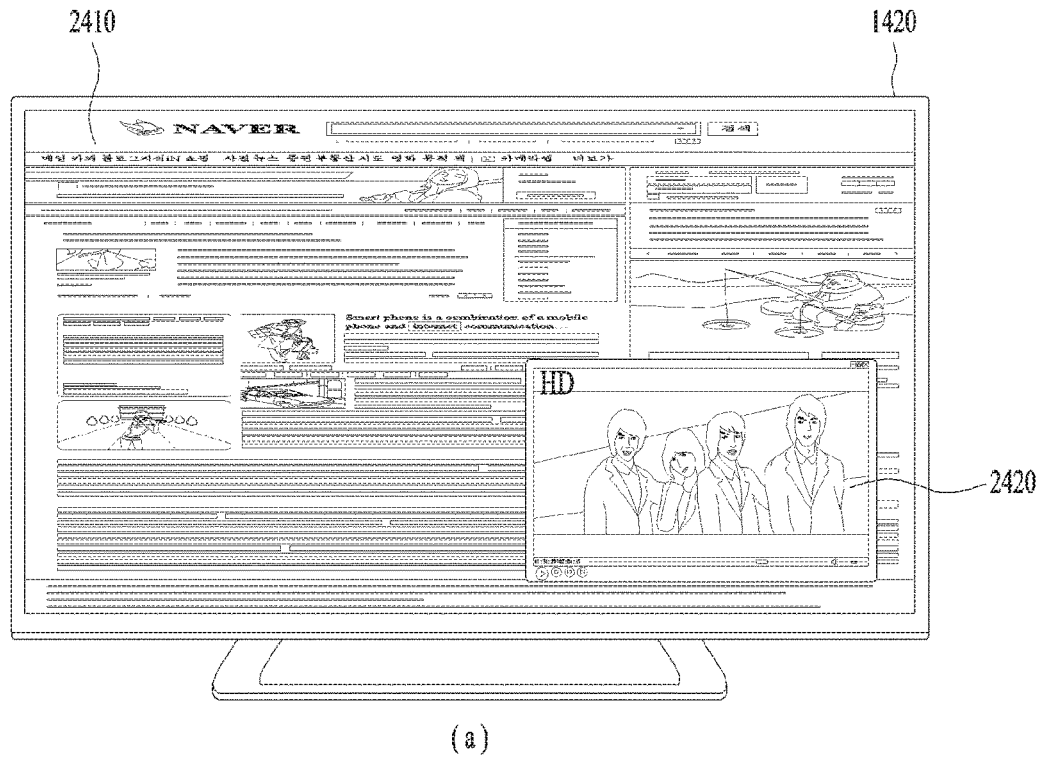
(a)
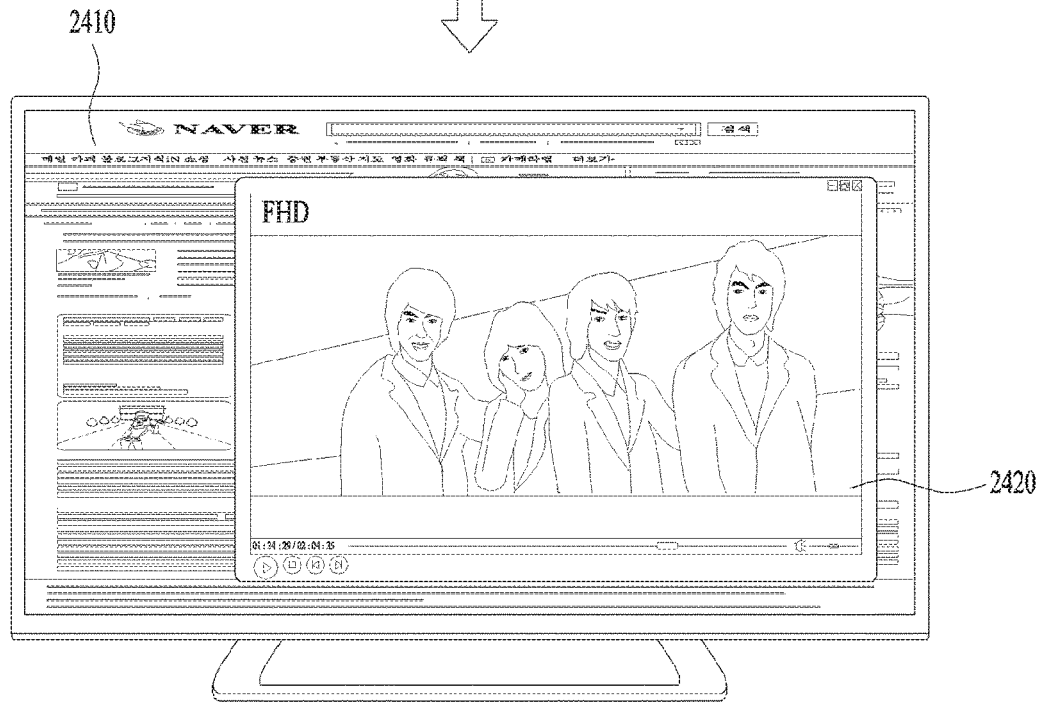
(b)

(a)

(b)

FIG. 26
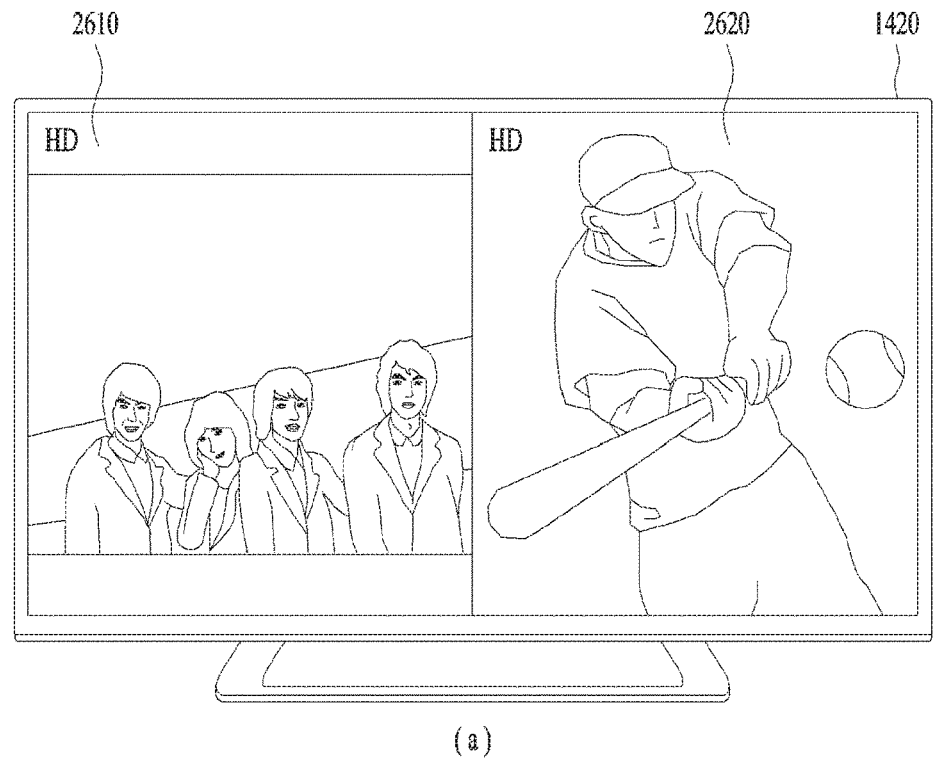
(a)
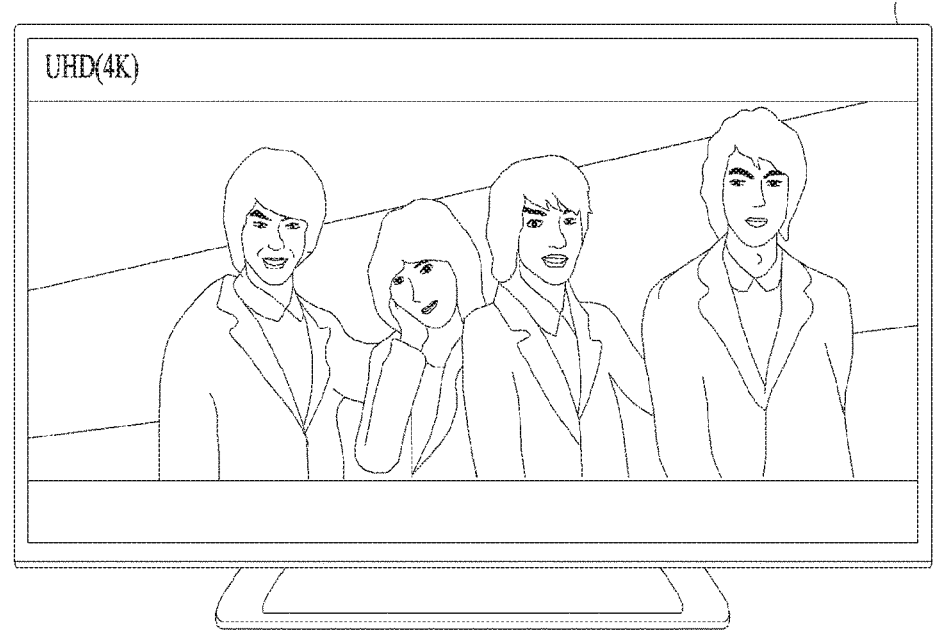
(b)

FIG. 29
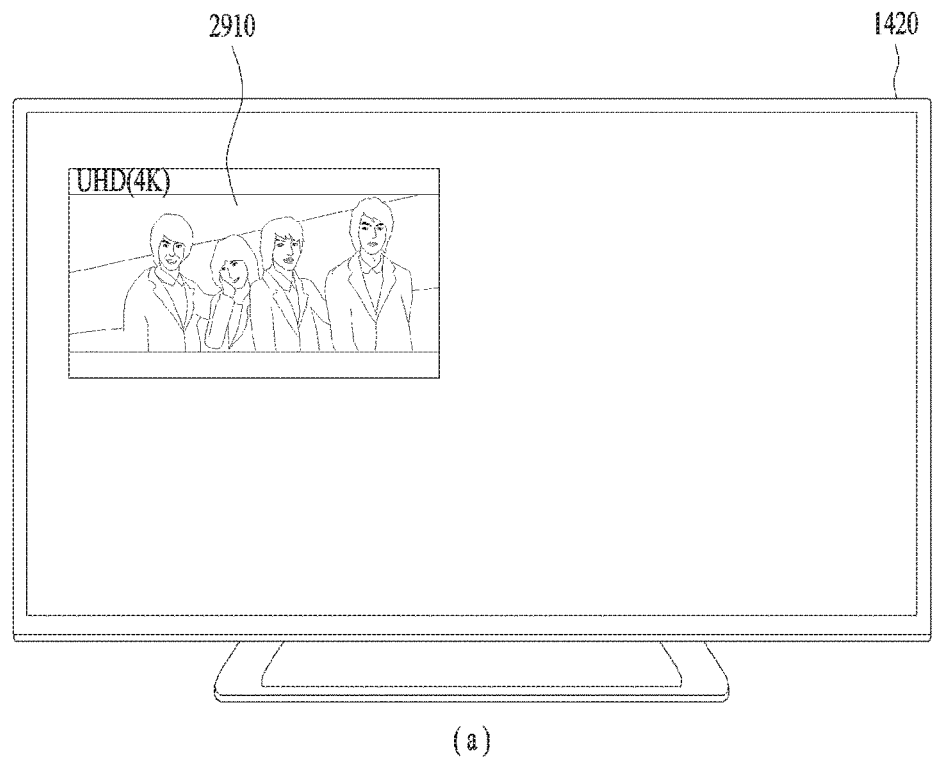
(a)
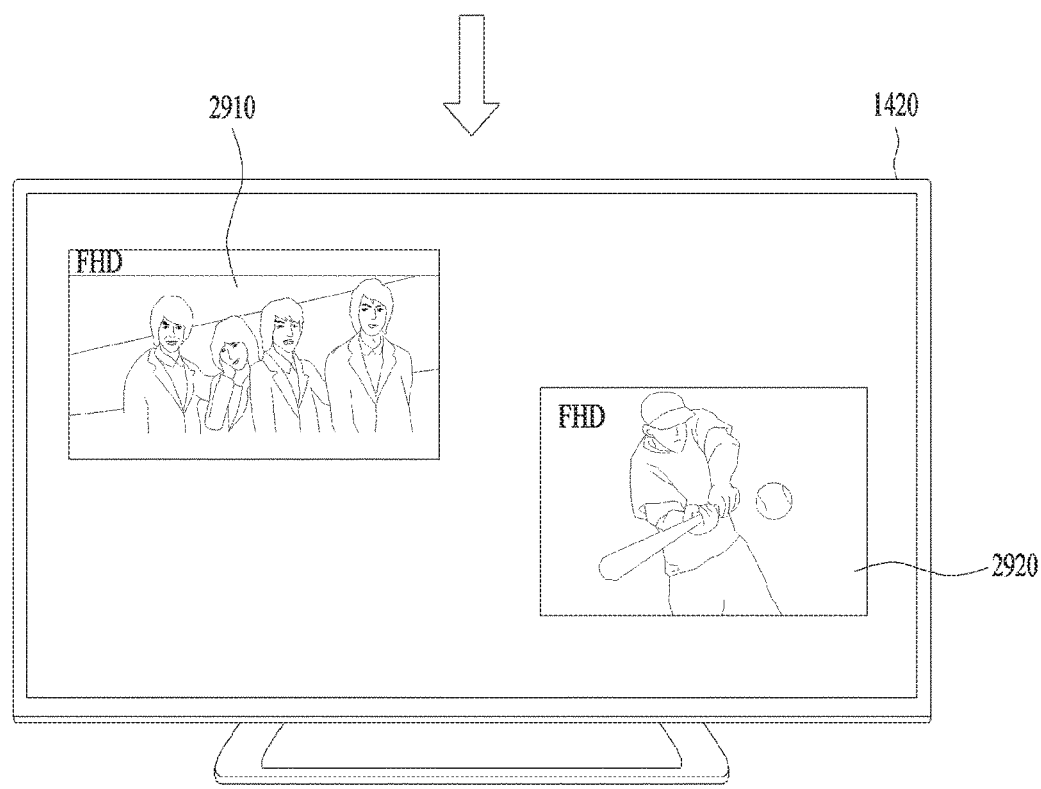
(b)

MULTIMEDIA DEVICE AND CONTROL METHOD THEREFOR

CROSS-REFERENCE TO RELATED APPLICATIONS

This application is the National Stage filing under 35 U.S.C. 371 of International Application No. PCT/KR2015/008705, filed on Aug. 20, 2015, and also claims the benefit of earlier filing date and right of priority to Korean Patent Application No. 10-2014-0165093 filed on Nov. 25, 2014, the contents of which are all hereby incorporated by reference herein in their entirety.

TECHNICAL FIELD

The present invention relates to a multimedia device and a control method therefor.

BACKGROUND ART

Not only various standing devices such as a Personal Computer (PC) and a television (TV), but also various mobile devices such as a smartphone and a tablet PC have been remarkably developed. Although the standing devices and the mobile devices have been developed in different ways in their unique regions, their unique regions become ambiguous in accordance with the recent boom of digital convergence.

Meanwhile, the TV has been implemented in the form of a multimedia device having complex functions as a computer support function, an Internet function, etc. in addition to a broadcasting receiving function have been added thereto.

Such a multimedia device type TV could simultaneously output a plurality of media services on one screen in accordance with the development of its functions, and could process contents of UHD grade resolution as well as FHD grade resolution. However, since resources (e.g., CPU, decoder, memory, etc.) built in the multimedia device are restrictive, when a user desires to simultaneously use a plurality of media services on multiple screens, a solution for processing the media services is required.

DISCLOSURE

Technical Problem

An object of the present invention is to solve the aforementioned problem and other problems. Another object of the present invention is to provide a solution for efficiently processing a plurality of media services when a user desires to simultaneously use the media services by using restrictive resources.

Other object of the present invention is to provide a solution for efficiently using restrictive resources by using an adaptive bitrate streaming scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A control method for a multimedia device according to one embodiment of the present invention comprises the steps of receiving a stream segment of a first bitrate among stream segments of several bits, which constitute the first content; displaying video data corresponding to the received stream segment of the first bitrate on a display unit; detecting a size change of a screen on which the video data is displayed; requesting a stream segment of a second bitrate, which is different from the first bitrate, on the basis of the detected size change of the screen; receiving the requested stream segment of the second bitrate; displaying video data corresponding to the received stream segment of the second bitrate on the display unit.

A multimedia device according to one embodiment of the present invention comprises a reception unit for receiving a stream segment of a first bitrate among stream segments of several bits, which constitute a first content; a display unit for displaying video data corresponding to the received stream segment of the first bitrate; and a controller, wherein the controller detects a command for executing a second content while the video data corresponding to the stream segment of the first bitrate is being displayed, controls the reception unit to receive a stream segment of a second bitrate, which is different from the first bitrate among the stream segments of several bits, which constitute the first content, on the basis of the detected command, controls the reception unit to receive a stream segment of a third bitrate among the stream segments of several bits, which constitute a second content, and controls the display unit to display video data corresponding to the received stream segment of the second bitrate and video data corresponding to the received stream segment of the third bitrate.

Advantageous Effects

Advantageous effects of a multimedia device and a control method therefor according to the present invention are as follows.

According to at least one of the embodiments of the present invention, it is possible to provide a solution for efficiently processing a plurality of media services when a user desires to simultaneously use the media services by using restrictive resources.

According to at least one of the embodiments of the present invention, it is possible to provide a solution for efficiently using restrictive resources by using an adaptive bitrate streaming scheme.

Additional scope of applicability of the present invention will be apparent from the following detailed description. However, since various modifications and corrections may explicitly be understood by persons skilled in the art within spirits and scope of the present invention, the detailed description and a specific embodiment such as the preferred embodiment of the present invention should be understood to be only given as an example.

BRIEF DESCRIPTION OF THE DRAWINGS

FIG. 19 is a diagram illustrating an example of a method for displaying a content by receiving the content in an adaptive bitrate streaming mode in a multimedia device according to one embodiment of the present invention.

FIG. 21 is a diagram illustrating still another example of a method for displaying a content by receiving the content in an adaptive bitrate streaming mode in a multimedia device according to one embodiment of the present invention.

FIG. 23 is a diagram illustrating further still another example of a method for displaying a content by receiving the content in an adaptive bitrate streaming mode in a multimedia device according to one embodiment of the present invention.

FIG. 24 is a diagram illustrating an example of a method for displaying a content by receiving the content in an adaptive bitrate streaming mode in a multimedia device according to one embodiment of the present invention.

FIG. 26 is a diagram illustrating still another example of a method for displaying a content by receiving the content in an adaptive bitrate streaming mode in a multimedia device according to one embodiment of the present invention.

FIG. 29 is a diagram illustrating an example of a method for displaying a content by receiving the content in an adaptive bitrate streaming mode in a multimedia device according to one embodiment of the present invention.

BEST MODE FOR CARRYING OUT THE INVENTION

Figure 1:
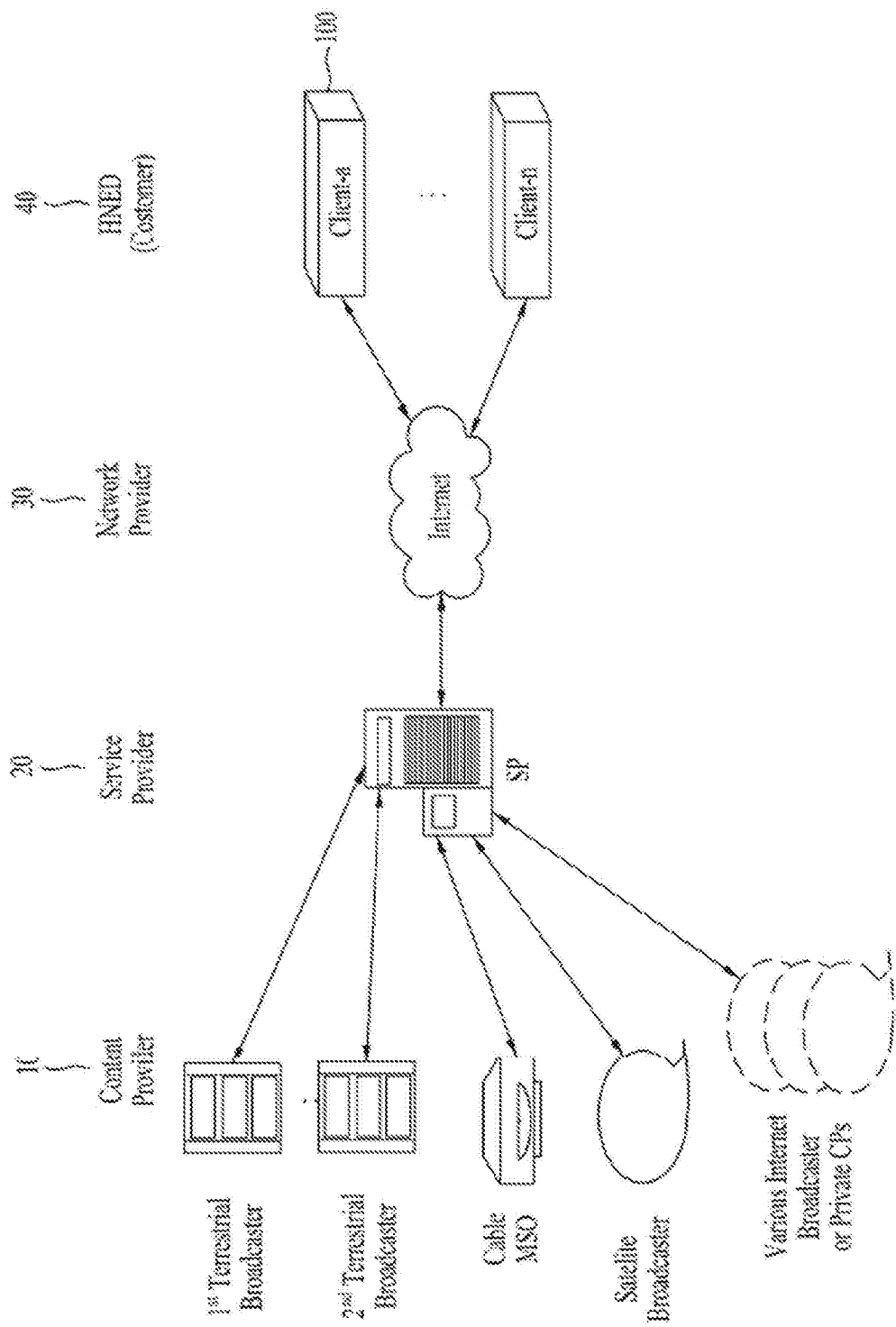
FIG. 1 is a schematic diagram illustrating a service system including a digital device according to one embodiment of the present invention.

Hereinafter, various embodiment(s) of a digital device and a control method therefor according to the present invention will be described in detail with reference to the accompanying drawings.

In this specification, a suffix such as "module" and "unit" can be used to refer to elements or components. Use of such a suffix herein is merely intended to facilitate description of the specification, and the suffix itself is not intended to give any special meaning or function. Also, although the terms such as "first" and/or "second" may be used to facilitate description of various elements, it is to be understood that the elements are not limited by such terms.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Meanwhile, the disclosure in this specification or/and drawings is the preferred embodiment according to the present invention and its scope should be determined by reasonable interpretation of the appended claims.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive predetermined data. At this time, the predetermined data may be converted properly if necessary before transmission and reception. Examples of the digital device may include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 as an example of the digital device. Further, the digital device in this specification may refer configuration having only a panel, set-top box (STB), or a set such as device and system.

Meanwhile, the wired or wireless network described in this specification refers to a communication network that supports various communication standards or protocols for pairing or/and data transmission and reception between digital devices or between a digital device and an external server. The wired or wireless network also includes all communication networks which will be supported by the standard now as well as in the future, and may support one or more communication protocols for the communication network. Examples of the wired or wireless network include wired network supported by various telecommunication standards such as Universal Serial Bus (USB), Composite Video Banking Sync (CVBS), Component, S-Video (analog), Digital Visual Interface (DVI), High Definition Multimedia Interface (HDMI), RGB, and D-SUB, and wireless network supported by various telecommunication standards including Bluetooth, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), and Wi-Fi direct.

In addition, when this specification simply refers to the digital device, the digital device may mean a standing device or a mobile device depending on the context, and may refer to both the standing device and the mobile device unless mentioned specifically.

Meanwhile, the digital device is an intelligent device that supports a broadcasting receiving function, a computer function, and at least one external input, and may support e-mailing, web browsing, banking, games, applications, etc. through the aforementioned wire/wireless network. Moreover, the digital device may be provided with an interface for supporting at least one input or control means (hereinafter, referred to as 'input means') such as a manual type input device, a touch screen, a spatial remote controller.

In addition, although the digital device may use a standardized general-purpose operating system (OS), especially the digital device disclosed in this specification uses a web OS as one embodiment. Therefore, the digital device enables processing such as adding, deleting, amending, updating, etc. of various services or applications on a general-purpose OS kernel or Linux kernel, and may provide more user-friendly environment through the processing.

Meanwhile, the aforementioned digital device may receive and process an external input. At this time, the external input includes all of input means or digital devices that are connected with an external input device, that is, the aforementioned digital device through the wire/wireless network to transmit and receive data. For example, examples of the external input includes HDMI (High-Definition Multimedia Interface), game device such as playstation or X-box, a smart phone, a tablet PC, a printing device such as pocket photo, and all of digital devices such as smart TV and Blu-ray device.

The "server" disclosed in this specification means a digital device or system capable of transmitting and receiving data to and from the aforementioned digital device, that is, client, and may also be referred to as a processor. For example, examples of the server may include a portal server providing web page, web content or web service, an advertising server providing advertising data, a content server providing a content, a Social Network Service (SNS) server providing SNS service, a service server provided from a manufacturer, and a Multichannel Video Programming Distributor (MVPD) providing Video on Demand or streaming service, and a service server providing pay services.

Also, in this specification, when only an application is described for the convenience of description, the application may mean services as well as applications based on the context.

Hereinafter, the present invention will be described in more detail with reference to the accompanying drawings.

FIG. 1 is a schematic diagram illustrating a service system including a digital device according to one embodiment of the present invention.

Referring to FIG. 1, the service system includes a content provider (CP) 10, a service provider (SP) 20, a network provider (NP) 30, and a home network end user (HNED) (Customer) 40. The HNED 40 includes a client 100, that is, a digital device according to the present invention.

The CP 10 produces and provides various contents. As shown in FIG. 1, examples of the CP 10 may include a terrestrial broadcaster, a cable system operator (SO), a multiple system operator (MSO), a satellite broadcaster, various Internet broadcasters, private content providers (CPs), etc. The content provider 10 may produce and provide various services or applications as well as broadcast content.

The SP 20 service-packetizes content provided by the CP 10 and provides the packetized content to the HNED 40. For example, the SP 20 service-packetizes at least one or more of contents produced by first terrestrial broadcasting, second terrestrial broadcasting, cable MSO, satellite broadcasting, various Internet broadcastings, and applications and provides the packetized contents to the HNED 40.

The SP 20 provides services to the client 100 in a uni-cast or multi-cast manner. Meanwhile, the SP 20 may transmit data to a plurality of clients 100, which are previously registered, at one time, and to this end, an Internet Group Management Protocol (IGMP) may be used.

The CP 10 and the SP 20 may be configured in the form of one entity. For example, the CP 10 may function as the SP 20 by producing content, packetizing the produced content into services and providing the packetized content to the HNED 40, and vice versa.

The NP 30 provides a network environment for data exchange between the content provider 10 or/and the service provider 20 and the client 100.

The client 100 is a consumer belonging to the HNED 40, and may construct a home network through the network provider 30 to receive data, and may transmit/receive various services such as VoD and streaming or data related to applications.

Meanwhile, the CP or/and SP 20 within the service system may use a conditional access or content protection means for protection of content which is transmitted. Therefore, the client 100 may use a means such as a cable card (or POD: Point of Deployment) and downloadable CAS (DCAS), which corresponds to the conditional access or content protection.

In addition, the client 100 may use an interactive service through a network. In this case, the client 100 may serve as the CP 10, and the SP 20 may receive the content and then transmit the content to another client.

In FIG. 1, the CP 10 or/and SP 20 may be a server that provides services which will be described later in this specification. In this case, the server may include or won the network provider 30 if necessary. Hereinafter, the service or service data includes internal service or application as well as externally received service or application, unless specifically mentioned, and this service or application may mean service or application data for the Web OS based client 100.

Figure 2:
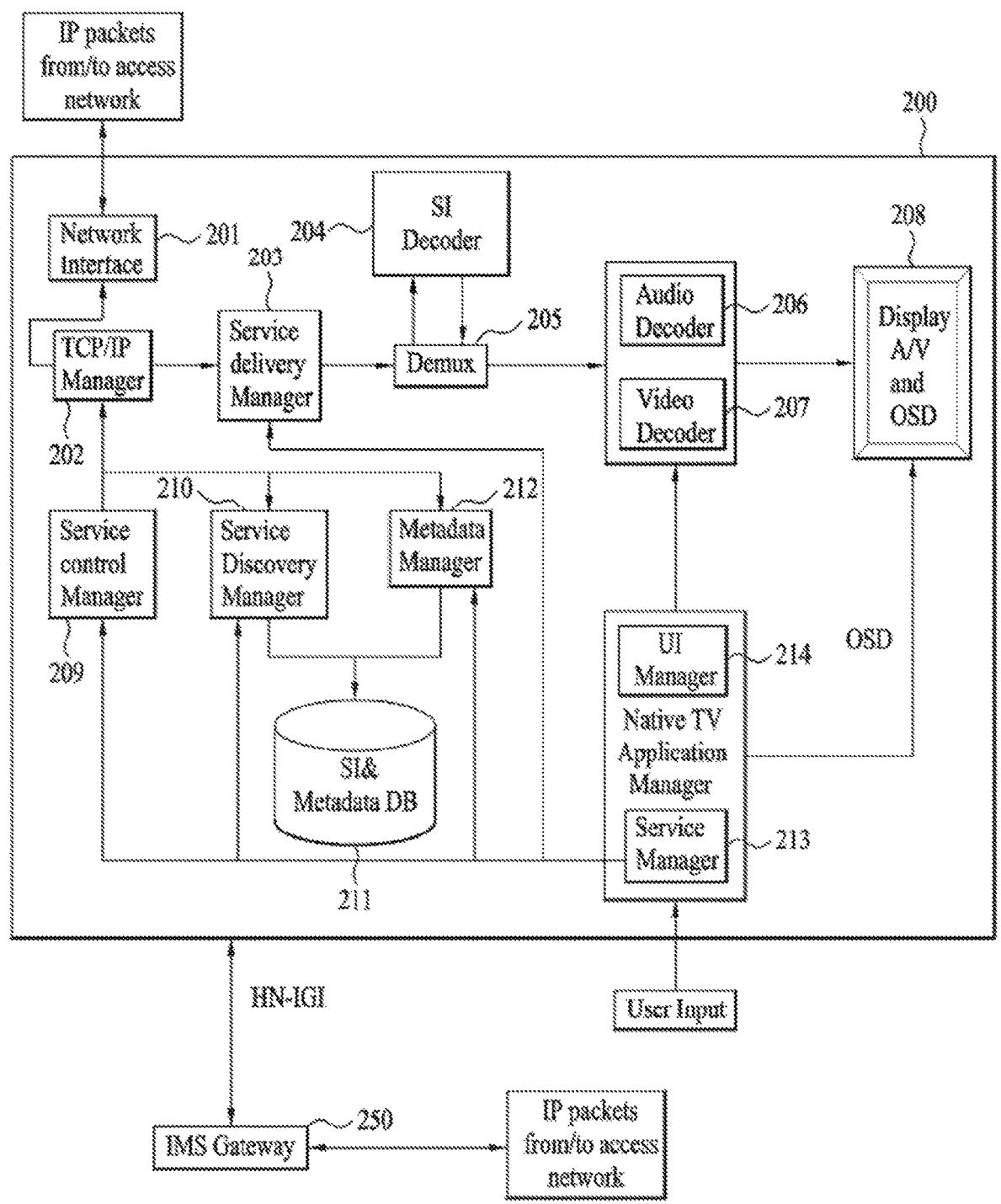
FIG. 2 is a block diagram illustrating a digital device according to one embodiment of the present invention.

FIG. 2 is a block diagram illustrating a digital device according to one embodiment of the present invention.

Hereinafter, the digital device described in this specification corresponds to the client 100 shown in FIG. 1.

The digital device 200 includes a network interface 201, a TCP/IP manager 202, a service delivery manager 203, an SI (System Information) decoder 204, a demultiplexer (or demux) 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 transmits and receives IP (Internet Protocol) packet(s) or IP datagram(s) (hereinafter, referred to as IP packet(s)) through an access network. For example, the network interface 201 may receive service, application and content from the service provider 20 of FIG. 1 through the network.

The TCP/IP manager 202 involves delivery of IP packets transmitted to the digital device 200 and IP packets transmitted from the digital device 200, that is, packet delivery between a source and a destination. The TCP/IP manager 202 may classify received packet(s) according to an appropriate protocol and output the classified packets to the service delivery manager 205, the service discovery manager 210, the service control manager 209, and the metadata manager 212.

The service delivery manager 203 controls the received service data. For example, the service delivery manager 203 may control real-time streaming data, for example, using real-time protocol/real-time control protocol (RTP/RTCP). If the real-time streaming data are transmitted using RTP, the service delivery manager 203 parses the received data packet on the basis of the RTP and transmits the parsed data packet to the demultiplexer 205 or stores the parsed data packet in the SI & metadata DB 211 under the control of the service manager 213. The service delivery manager 203 feeds back network reception information to the server on the basis of the RTCP.

The demultiplexer 205 demultiplexes audio data, video data, SI data from the received packet and transmits the demultiplexed data to the audio/video decoder 206/207 and the SI decoder 204.

The SI decoder 204 decodes the demultiplexed SI data, that is, service information such as program specific information (PSI), program and system information protocol (PSIP), digital video broadcast-service information (DVB-SI), Digital Television Terrestrial Multimedia Broadcasting/ Coding Mobile Multimedia Broadcasting (DTMB/CMMB), etc. The SI decoder 204 may store the decoded service information in the SI & metadata DB 211. The service information stored in the SI & metadata DB 211 may be read or extracted and used by a corresponding component in accordance with a user's request, etc.

The audio decoder 206 and the video decoder 207 respectively decode audio data and video data, which are demultiplexed by the demultiplexer 205. The decoded audio data and video data are provided to the user through the display module 208.

An application manager may include a service manager 213 and a user interface (UI) manager 214, to function as a controller of the digital device 200. In other words, the application manager may administrate the overall state of the digital device 200, provide a UI, and manage other mangers.

The UI manager 214 may provide a graphical user interface (GUI)/UI through OSD (On Screen Display), receive a key input from the user and perform a device operation corresponding to the key input. For example, if a key input signal for channel selection is received from the user, the UI manager 214 transmits a key input signal to the service manager 213.

The service manager 213 controls service-related managers such as the service delivery manager 203, the service discovery manager 210, the service control manager 209, and the metadata manager 212.

Also, the service manager 213 generates a channel map and controls channel selection using the channel map in accordance with the key input received from the UI manager 214. The service manager 213 receives service information from the SI decoder 204 and sets audio/video PID of a selected channel to the demultiplexer 205. The set PID may be used for the demultiplexing procedure of the demultiplexer 205. Therefore, the demultiplexer 205 filters (PID or section filtering) audio data, video data and SI data using the PID.

The service discovery manager 210 provides information required to select a service provider that provides a service. Upon receipt of a signal for selecting a channel from the service manager 213, the service discovery manager 210 discovers a service on the basis of the received signal.

The service control manager 209 selects and controls a service. For example, the service control manager 209 performs service selection and control using IGMP (Internet Group Management Protocol) or real time streaming protocol (RTSP) when the user selects a live broadcast service and using RTSP when the user selects a video on demand (VOD) service. The RTSP protocol may provide a trick mode for real-time streaming. Also, the service control manager 209 may initialize and manage a session to an IMS gateway 250 using IMS (IP Multimedia Subsystem), and SIP (Session Initiation Protocol). The above protocols are only exemplary, and other protocols may be used in accordance an implementation example.

The metadata manager 212 manages metadata regarding services and stores metadata in the SI & metadata DB 211.

The SI & metadata DB 211 stores SI data decoded by the SI decoder 204, metadata managed by the metadata manager 212, and information required to select a service provider, which is provided by the service discovery manager 210. In addition, the SI & metadata DB 211 stores system set-up data.

The SI & metadata DB 211 may be implemented using a Non-Volatile RAM (NVRAM) or a Flash memory, and the like.

Meanwhile, the IMS (IP Multimedia Subsystem) gateway 250 includes functions required to access IMS based IPTV services.

Figure 3:
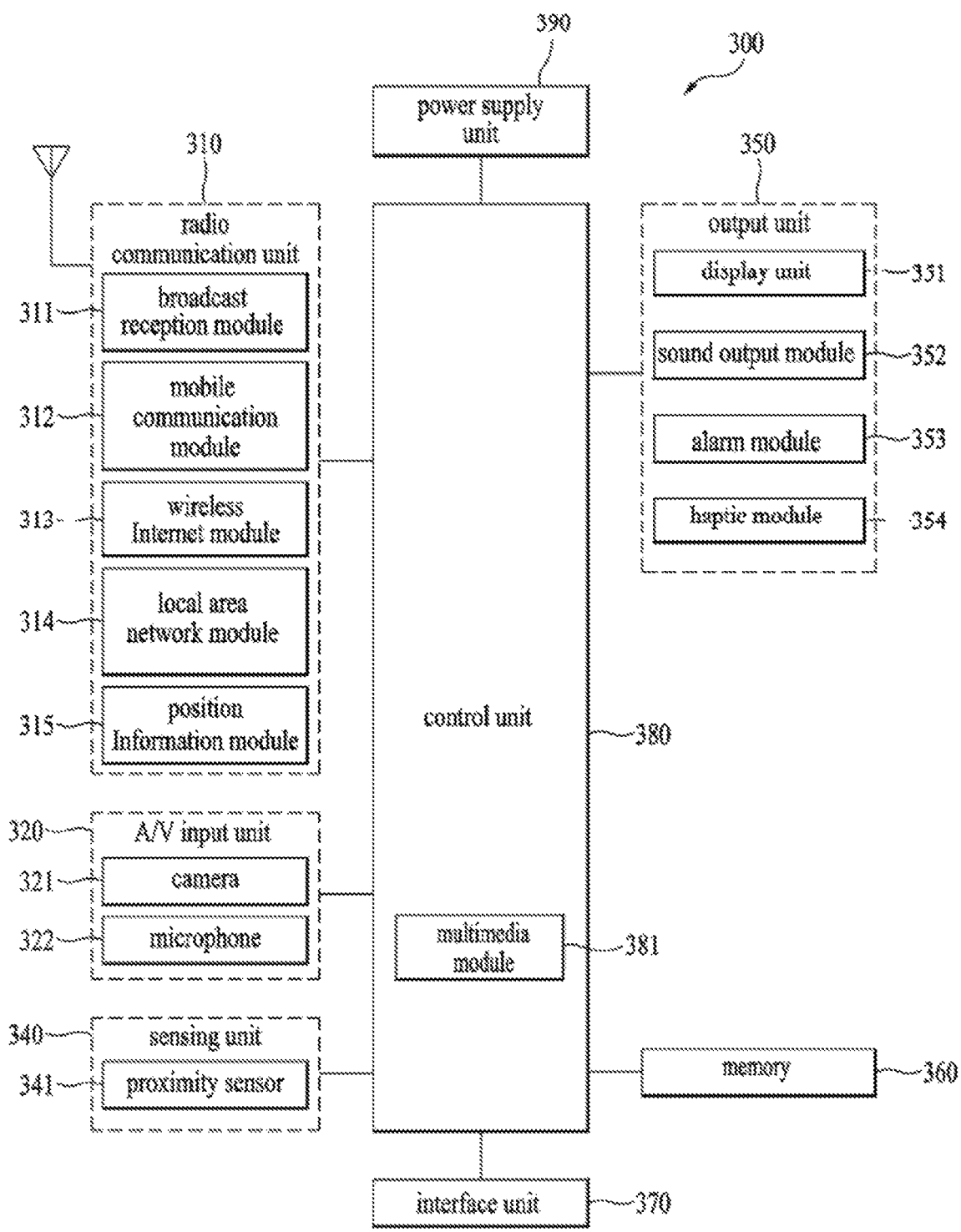
FIG. 3 is a block diagram illustrating a digital device according to another embodiment of the present invention.

FIG. 3 is a block diagram illustrating a digital device according to another embodiment of the present invention.

The standing device has been described as an embodiment of the digital device in FIG. 2, whereas a mobile device will be described as another embodiment of the digital device in FIG. 3.

Referring to FIG. 3, the mobile device 300 may include a wireless communication unit 310, an A/V (audio/video) input unit 320, a user input unit 330, a sensing unit 340, an output unit 350, a memory 360, an interface unit 370, a controller 380, and a power supply unit 390.

Hereinafter, the respective elements of the mobile device 300 will be described in detail.

The wireless communication unit 310 may include one or more modules which permit wireless communication between the mobile device 300 and a wireless communication system or network within which the mobile device 300 is located. For instance, the wireless communication unit 310 may include a broadcast receiving module 311, a mobile communication module 312, a wireless Internet module 313, a short-range communication module 314, and a position-information module 315.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server which generates and transmits a broadcast signal and/or broadcast associated information or a server which is provided with a previously generated broadcast signal and/or broadcast associated information and then transmits the provided signal or information to a terminal. The broadcast signal may include a TV broadcast signal, a radio broadcast signal, and/or a data broadcast signal, and may further include a data broadcast signal combined with a TV or radio broadcast signal.

The broadcast associated information may mean information associated with a broadcast channel, a broadcast program, or a broadcast service provider. Furthermore, the broadcast associated information may be provided via a mobile communication network. In this case, the broadcast associated information may be received by the mobile communication module 312.

The broadcast associated information may be present in various forms such as an electronic program guide (EPG) and an electronic service guide (ESG).

The broadcast receiving module 311 may receive broadcast signals by using various types of broadcast systems such as ATSC, digital multimedia broadcasting-terrestrial (DMB-T), digital multimedia broadcasting-satellite (DMB-S), digital video broadcast-handheld (DVB-H), and integrated services digital broadcast-terrestrial (ISDB-T). Optionally, the broadcast receiving module 311 may be configured to be suitable for other broadcasting systems as well as the above-noted digital broadcasting systems.

The broadcast signal and/or broadcast associated information received by the broadcast receiving module 311 may be stored in the memory 360.

The mobile communication module 312 transmits and receives wireless signals to/from at least one of a base station, an external terminal, and a server on a mobile communication network. The wireless signals may include various types of data based on transmission and reception of audio signals, video call signals or text/multimedia message.

The wireless Internet module 313 includes a module for wireless Internet connection, and may be built in or outside the mobile device 300. The wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 314 means a module for short-range communications. Suitable technologies for implementing this module include Bluetooth, radio frequency identification (RFID), infrared data association (IrDA), ultra-wideband (UWB), ZigBee, RS-232, RS-485, etc.

The position-information module 315 is a module for acquisition of position information of the mobile device 300. An example of the position-information module 315 may include a global positioning system (GPS) module.

The audio/video (A/V) input unit 320 is configured to provide audio or video signal input to the mobile device 300. Examples of the A/V input unit 320 include a camera 321 and a microphone 322. The camera 321 receives and processes image frames of still pictures or video, which are obtained by an image sensor in a video call mode or a photographing mode. Furthermore, the processed image frames may be displayed on the display unit 351.

The image frames processed by the camera 321 may be stored in the memory 360 or may be transmitted to an external recipient via the wireless communication unit 310. Optionally, at least two cameras 321 may be provided in the mobile device 300 depending on the environment of usage.

The microphone 322 receives an external audio signal in a phone call mode, a recording mode or a voice recognition mode. This audio signal is processed and converted into electronic audio data by the microphone 322. The processed audio data is transformed into a format transmittable to a mobile communication base station via the mobile communication module 312 in a call mode. The microphone 322 may include assorted noise removing algorithms to remove noise generated in the course of receiving the external audio signal.

The user input unit 330 generates input data responsive to user manipulation of an associated input device or devices. Examples of the user input unit 330 include a keypad, a dome switch, a touchpad (e.g., static pressure/capacitance), a jog wheel, and a jog switch.

The sensing unit 340 provides sensing signals for controlling operations of the mobile device 300 by sensing the current status of the mobile device 300, such as an open/closed status of the mobile device 300, the relative positioning of the mobile device 300, a presence or absence of user contact with the mobile device 300, an orientation of the mobile device 300, or acceleration/deceleration of the mobile device 300. For example, if the mobile device 300 moves or is inclined, the sensing unit 340 may sense the position or inclination of the mobile device 300. Also, the sensing unit 340 may sense the presence or absence of power provided by the power supply unit 390, and the presence or absence of a coupling or other connection between the interface unit 370 and an external device. Meanwhile, the sensing unit 340 may include a proximity sensor 341 including NFC (Near Field Communication).

The output unit 350 generates output relevant to the senses of sight, hearing, and touch. Furthermore, the output unit 350 may include the display unit 351, an audio output module 352, an alarm unit 353, and a haptic module 354.

The display unit 351 displays (outputs) information processed by the mobile device 300. For example, if the mobile device is operating in a phone call mode, the display unit 351 displays a user interface (UI) or graphical user interface (GUI) related to call. If the mobile device 300 is in a video call mode or a photographing mode, the display unit 351 displays images which are associated with these modes, the UI or the GUI.

The display unit 351 may include at least one of a liquid crystal display (LCD), a thin film transistor-liquid crystal display (TFT-LCD), an organic light-emitting diode display (OLED), a flexible display and a three-dimensional display. Some of the displays may be implemented in a transparent or optical transmittive type, i.e., a transparent display. A representative example of the transparent display is the TOLED (transparent OLED). A rear configuration of the display unit 351 may be implemented as the optical transmittive type as well. In this configuration, a user may see an object located at the rear of a terminal body through a portion of the display unit 351 of the terminal body.

At least two display units 351 may be provided in the mobile device 300 in accordance with one embodiment of the mobile device 300. For example, a plurality of display units may be arranged to be spaced apart from each other or to form a single body on a single face of the mobile device 300. Alternatively, a plurality of display units may be arranged on different faces of the mobile device 300.

If the display unit 351 and a sensor for detecting a touch action (hereinafter, referred to as 'touch sensor') are configured as a mutual layer structure (hereinafter, referred to as 'touch screen'), the display unit 351 is usable as an input device as well as an output device. In this case, the touch sensor may be configured as a touch film, a touch sheet, or a touchpad.

The touch sensor may be configured to convert a pressure applied to a specific portion of the display unit 351 or a variation of capacitance generated from a specific portion of the display unit 351 to an electronic input signal. Moreover, the touch sensor may be configured to detect a pressure of a touch as well as a touched position or area.

If a touch input is made to the touch sensor, a signal(s) corresponding to the touch input is transferred to a touch controller. The touch controller processes the signal(s) and then transfers the processed signal(s) to the controller 380. Therefore, the controller 380 may identify the touched area of the display unit 351.

The proximity sensor 341 may be arranged at an internal area of the mobile device 300 enclosed by the touch screen or around the touch screen. The proximity sensor is a sensor that detects a presence or non-presence of an object approaching a predetermined detecting surface or an object existing around the proximity sensor using an electromagnetic field strength or infrared ray without mechanical contact. Hence, the proximity sensor 341 is more durable than a contact type sensor and also has utility broader than the contact type sensor.

Examples of the proximity sensor 341 include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) may be considered as the proximity sensor.

For clarity and convenience of description, an action for enabling the pointer approaching the touch screen to be recognized as placed on the touch screen without contacting the pointer on the touch screen may be referred to as 'proximity touch' and an action of enabling the pointer to actually come into contact with the touch screen may be referred to as 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch direction, a proximity touch speed, a proximity touch time, a proximity touch position, and a proximity touch shift state). Information corresponding to the detected proximity touch action and the detected proximity touch pattern may be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. The audio output module 352 outputs audio related to a particular function (e.g., call received sound, message received sound) performed in the mobile device 300. The audio output module 352 may include receivers, speakers, buzzers, etc.

The alarm unit 353 outputs a signal for announcing the occurrence of a particular event associated with the mobile device 300. Examples of the event generated in the mobile device include a call signal reception, a message reception, a key signal input, and a touch input. The alarm unit 353 is able to output a signal for announcing the event occurrence by way of vibration as well as video or audio signal. The video or audio signal may be output via the display unit 351 or the audio output module 352. Hence, the display unit 351 or the audio output module 352 may be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations may be output in a manner of being synthesized together or may be output in sequence. The haptic module 354 is able to generate various tactile effects as well as the vibration, such as an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 may be implemented to enable a user to sense the tactile effect through a muscle sense of a finger or an arm as well as to transfer the tactile effect through direct contact. Optionally, at least two haptic modules 354 may be provided in the mobile device 300 in accordance with an embodiment of the mobile device 300.

The memory 360 may store a program for the operation of the controller 380, and temporarily store input and output data (e.g., phone book, message, still image, video, etc.). The memory 360 may store data related to vibration and audio of various patterns output during a touch input on the touch screen.

The memory 360 may include at least one of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disk. The mobile device 300 is able to operate in association with a web storage for performing a storage function of the memory 360 on the Internet.

The interface unit 370 serves to couple the mobile device 300 with all external devices. The interface unit 370 receives data from the external devices or is supplied with power and then transfers the data or power to the respective elements of the mobile device 300 or enables data within the mobile device 300 to be transferred to the external devices. For example, the interface unit 370 may include a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile device 300 and may include a User Identify Module (UIM), a Subscriber Identity Module (SIM), and a Universal Subscriber Identity Module (USIM). A device having the identity module (hereinafter, referred to as 'identity device') may be manufactured as a smart card. Therefore, the identity device may be connected to the mobile device 300 via the corresponding port.

When the mobile device 300 is connected to an external cradle, the interface unit 370 becomes a passage for supplying the mobile device 300 with a power from the cradle or a passage for delivering various command signals input from the cradle by a user to the mobile device 300. Each of the various command signals input from the cradle or the power may be operated as a signal enabling the mobile device 300 to recognize that it is correctly loaded in the cradle.

The controller 380 controls the overall operations of the mobile device 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 is able to perform a pattern recognition process for recognizing a writing input and a picture drawing input carried out on the touch screen as characters or images, respectively.

The power supply unit 390 provides external power or internal power required by various components of the mobile device 300 under the control of the controller 380.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 380.

For a software implementation, the embodiments described herein may be implemented with separate software modules, such as procedures and functions, each of which performs one or more of the functions and operations described herein. The software codes can be implemented with a software application written in any suitable programming language and can be stored in the memory 160, and executed by the controller 380.

Figure 4:
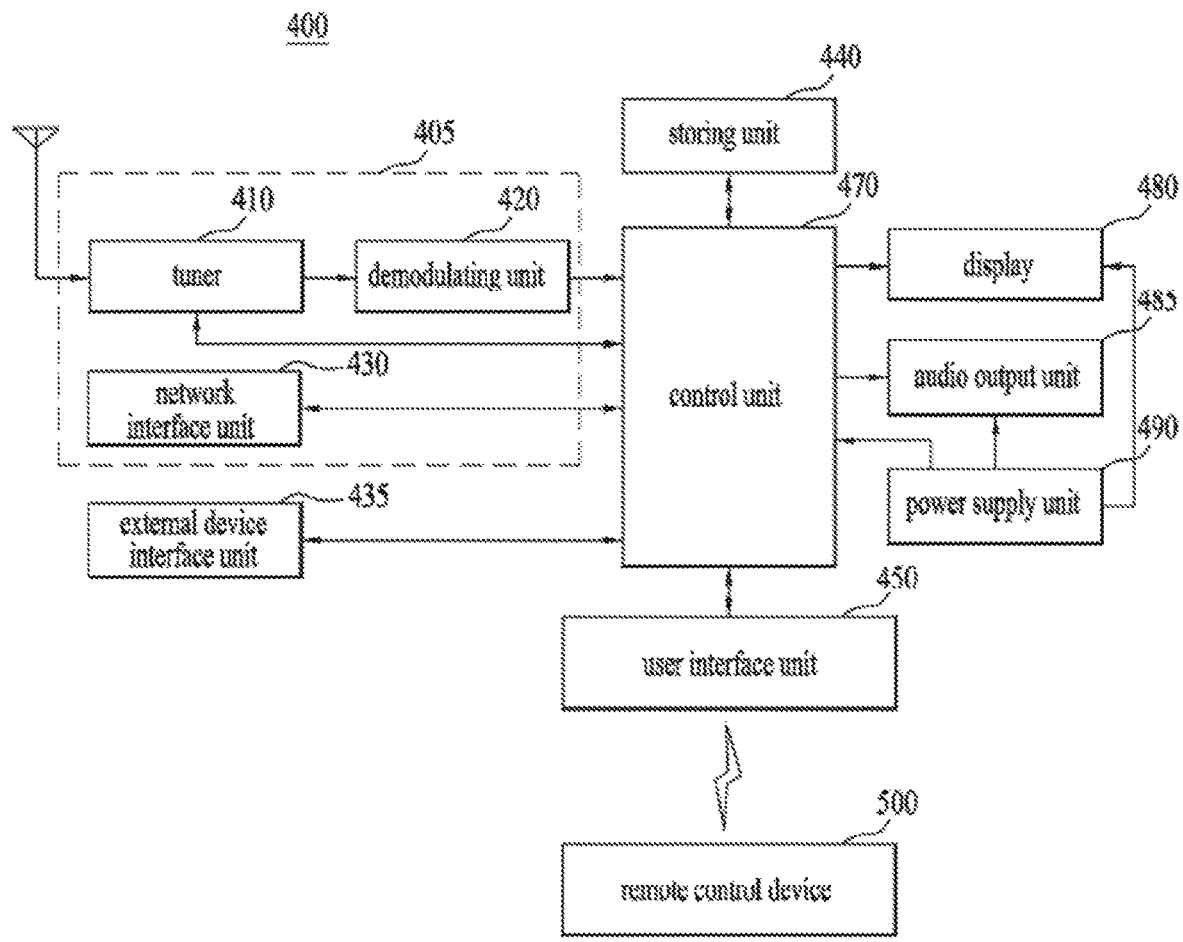
FIG. 4 is a block diagram illustrating a digital device according to other embodiment of the present invention.

FIG. 4 is a block diagram illustrating a digital device according to other embodiment of the present invention.

Other example of the digital device may include a broadcast reception unit 405, an external device interface 435, a storage unit 440, a user input interface 450, a controller 470, a display unit 480, an audio output unit 485, a power supply unit 490, and a photographing unit (not shown). The broadcast reception unit 305 may include at least one tuner 140, a demodulator 420, and a network interface 430. However, as the case may be, the broadcast reception unit 405 may include the tuner 410 and the demodulator 420 without the network interface 430, or may include the network interface 430 without the tuner 410 and the demodulator 420. The broadcast reception unit 405 may include a multiplexer (not shown) to multiplex a signal, which is subjected to the tuner 410 and demodulated by the demodulator 420, and a signal received through the network interface 430. In addition, the broadcast reception unit 405 may include a demultiplexer (not shown) that demultiplexes the multiplexed signal, the demodulated signal, or the signal received through the network interface 430.

The tuner 410 may receive a radio frequency (RF) broadcast signal by tuning to a channel selected by the user from among RF broadcast signals received through an antenna or all previously stored channels. Also, the tuner 410 converts the received RF broadcast signal to a digital intermediate frequency (IF) signal or a baseband signal.

For example, if the received RF broadcast signal is a digital broadcast signal, the tuner 410 converts the received RF broadcast signal to a digital IF (DIF) signal, and if the received RF broadcast signal is an analog broadcast signal, the tuner 410 converts the received RF broadcast signal to an analog baseband video or audio signal (CVBS/SIF). That is, the tuner 410 may process both the digital broadcast signal and the analog broadcast signal. The analog baseband video or audio signal (CVBS/SIF) output from the tuner 410 may directly be input to the controller 470.

Also, the tuner 410 may receive a single-carrier RF broadcast signal or a multiple-carrier RF broadcast signal. Meanwhile, the tuner 410 may sequentially tune to the RF broadcast signals of all the broadcast channels stored through a channel storage function from among the RF broadcast signals received through the antenna, and may convert the signals into IF signals or baseband signals (DIF: Digital Intermediate Frequency or baseband signals).

The demodulator 420 may receive the converted digital IF (DIF) signal from the tuner 410 and demodulate the received DIF signal, and may perform channel decoding. To this end, the demodulator 420 may include a trellis decoder, a deinterleaver, and a Reed-Solomon decoder or may include a convolutional decoder, a deinterleaver, and a Reed-Solomon decoder.

The demodulator 420 may perform demodulation and channel decoding and then output a Transport Stream (TS) signal. The TS signal may be a signal in which a video signal, an audio signal and a data signal are multiplexed. For example, the TS signal may be an MPEG-2 TS in which an MPEG-2 video signal, a Dolby AC-3 audio signal and/or the like are multiplexed.

The TS signal output from the demodulator 420 may be input to the controller 470. The controller 470 may control demultiplexing, video/audio signal processing and/or the like and then control output of a video through the display unit 480 and control output of an audio through the audio output unit 485.

The external device interface 435 provides an environment for interfacing external devices with the digital device 300. To this end, the external device interface 435 may include an A/V input/output unit (not shown) or an RF communication unit (not shown).

The external device interface 435 may be connected with external devices such as a digital versatile disk (DVD), a Blu-ray player, a game device, a camera, a camcorder, a computer (notebook computer), tablet PC, a smart phone, a Bluetooth device, a Cloud in a wired/wireless manner. The external device interface 435 transfers a signal including data such as image, video, and audio input through a connected external device to the controller 470 of the digital device. The controller 470 may control the data signal such as the processed image, video and audio to be output to the connected external device. To this end, the external device interface 435 may include an A/V input/output unit (not shown) or an RF communication unit (not shown).

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc., to input the video and audio signals of the external device to the digital device 400.

The RF communication unit may perform near field communication. The digital device 400 may be networked with other digital devices in accordance with communication protocols such as Bluetooth, radio frequency identification (RFID), infrared data association (IrDA), ultra wideband (UWB), ZigBee, and digital living network alliance (DLNA), for example.

Also, the external device interface 435 may be connected to a set-top box (STB) through at least one of the above-described various terminals so as to perform an input/output operation with the set-top box (STB).

Meanwhile, the external device interface 435 may receive an application or application list within its adjacent external device and then transfer the received application or application list to the controller 470 or the storage unit 440.

The network interface 430 provides an interface for connecting the digital device 400 to wired/wireless networks. The network interface 430 may include an Ethernet terminal, for example, for wire network connection. For wireless network connection, Wireless LAN (WLAN) (Wi-Fi), Wireless Broadband (WiBro), Worldwide Interoperability for Microwave Access (WiMAX), and High Speed Downlink Packet Access (HSDPA) communication specifications may be used.

The network interface 430 may transmit or receive data to or from other user or other digital device through a connected network or other network linked with the connected network. Particularly, the network interface 430 may transmit some of content data stored in the digital device 400 to other user previously registered in the digital device 400, a selected user of other digital device, or a selected device.

Meanwhile, the network interface 430 may be connected to a predetermined web page through a connected network or other network linked with the connected network. That is, the network interface 430 may be connected to a predetermined web page through a network to transmit or receive data to or from a corresponding server. In addition, the network interface 430 may receive content or data provided by a content provider or a network manager. That is, the network interface 430 may receive content such as movies, advertisements, games, VOD, or broadcast signals and information associated with the content, which are provided by the content provider or the network provider over a network. The network interface 430 may also receive update information and update files of firmware provided by the network manager. The network interface 430 may transmit data to the Internet or content provider or the network manager.

The network interface 430 may selectively receive a desired application from among publicly open applications through a network.

The storage unit 440 may store programs for signal processing and control within the controller 470 and store a processed video, audio or data signal.

In addition, the storage unit 440 can execute a function of temporarily storing a video, audio or data signal input from the external device interface 435 or the network interface 430. The storage unit 440 may store information on a predetermined broadcast channel through a channel memory function.

The storage unit 440 may store an application or a list of applications input from the external device interface 435 or the network interface 430.

Also, the storage unit 440 may store various platforms which will be described later.

The storage unit 440 may include at least one of a flash memory type, a hard disk type, a multimedia card micro type, a card type memory (e.g., SD or XD memory), RAM, EEPROM, etc. The digital device 400 may reproduce content files (a video file, a still image file, a music file, a text file, an application file, etc.) stored in the storage unit 440 and provide them to the user.

While FIG. 4 illustrates an embodiment in which the storage unit 440 is provided separately from the controller 470, the configuration of the digital device 400 is not limited thereto. In other words, the storage unit 440 may be included in the controller 470.

The user input interface 450 may transmit a signal input by the user to the controller 470 or deliver a signal output from the controller 470 to the user.

For example, the user input interface 450 may receive control signals such as a power on/off signal, a channel selection signal, an image setting signal, etc. from a remote controller 500 or transmit control signals of the controller 470 to the remote controller 500 in accordance with various communication schemes such as RF communication, IR communication, and the like.

The user input interface 450 may transmit control signals input through a power key, a channel key, a volume key, and a local key (not shown) of a set value to the controller 470.

The user input interface 450 may transmit a control signal input from a sensing unit (not shown) which senses a gesture of the user or deliver a signal of the controller 470 to the sensing unit (not shown). In this case, the sensing unit (not shown) may include a touch sensor, a voice sensor, a position sensor, an action sensor, etc.

The controller 470 may generate and output a signal for video or audio output by demultiplexing streams input through the tuner 410, the demodulator 420 or the external device interface 435 or processing the demultiplexed signals.

A video signal processed by the controller 470 may be input to the display unit 480 and displayed as an image corresponding to the corresponding video signal through the display unit 480. In addition, the video signal processed by the controller 470 may be input to an external output device through the external device interface 435.

An audio signal processed by the controller 470 may be output to the audio output unit 485. Otherwise, the audio signal processed by the controller 470 may be output to an external output device through the external device interface 435.

Although not shown in FIG. 4, the controller 470 may include a demultiplexer and a video processor.

The controller 470 may control the overall operation of the digital device 400. For example, the controller 470 may control the tuner 410 to tune to an RF broadcast corresponding to a channel selected by the user or a previously stored channel.

The controller 470 may control the digital device 400 in accordance with a user command input through the user input interface 450 or an internal program. Particularly, the controller 470 may control the digital device 400 to be linked to a network to download an application or application list that the user desires, to the digital device 400.

For example, the controller 470 controls the tuner 410 to receive a signal of a channel selected in response to a predetermined channel selection command received through the user input interface 450. In addition, the controller 470 processes a video, audio or data signal corresponding to the selected channel. The controller 470 may control information on a channel selected by the user to be output with a processed video or audio signal through the display unit 480 or the audio output unit 485.

Alternatively, the controller 470 controls a video signal or an audio signal received from an external device, for example, a camera or a camcorder through the external device interface 435 to be output through the display unit 480 or the audio output unit 485 in accordance with an external device image reproduction command received through the user input interface 450.

Meanwhile, the controller 470 may control the display unit 480 to display images. For example, the controller 470 may control a broadcast image input through the tuner 410, an external input image received through the external device interface 435, an image input through the network interface 430, or an image stored in the storage unit 440 to be displayed on the display unit 480. At this time, an image displayed on the display unit 480 may be a still image or video, and may be a 2D or 3D image.

Also, the controller 470 may control reproduction of content. At this time, the content may be content stored in the digital device 400, received broadcast content, or content input from an external device. The content may include at least one of a broadcast image, an external input image, an audio file, a still image, an image of a linked web, and a text file.

Meanwhile, the controller 470 may control display of applications or a list of applications, which are downloadable from the digital device 400 or an external network, when an application view menu is selected.

The controller 470 may control installation and execution of applications downloaded from the external network in addition to various user interfaces. Furthermore, the controller 470 may control an image related to an application executed by selection of the user to be displayed on the display unit 480.

Meanwhile, although not shown, the digital device 400 may further include a channel browsing processor which generates a thumbnail image corresponding to a channel signal or an external input signal.

The channel browsing processor may receive a stream signal (e.g., TS) output from the demodulator 420 or a stream signal output from the external device interface 435 and extract an image from the received stream signal to generate a thumbnail image. The generated thumbnail image may be directly input to the controller 470 or may be encoded and then input to the controller 470. Also, the thumbnail image may be coded into a stream and then input to the controller 470. The controller 470 may display a thumbnail list including a plurality of thumbnail images on the display unit 480 using thumbnail images input thereto. The thumbnail images included in the thumbnail list may be updated sequentially or simultaneously. Accordingly, the user may conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 may be configured as one of various speakers.

The digital device 400 may further include the sensing unit (not shown) for sensing a gesture of the user, which includes at least one of a touch sensor, a voice sensor, a position sensor, and an action sensor, as described above. A signal sensed by the sensing unit (not shown) may be delivered to the controller 470 through the user input interface 450.

Meanwhile, the digital device 400 may further include the photographing unit (not shown) for photographing the user.

The controller 470 may sense a gesture of the user from an image captured by the photographing unit (not shown) or a signal sensed by the sensing unit (not shown), or by combining the image and the signal.

The power supply unit 490 supplies a corresponding power to the digital device 400.

Particularly, the power supply unit 490 may supply the power to the controller 470 which may be implemented as a system-on-chip (SoC), the display unit 480 for displaying images, and the audio output unit 485 for audio output.

To this end, the power supply unit 490 may include a converter (not shown) for converting an alternating current power to a direct current power. Meanwhile, if the display unit 480 is implemented as a liquid crystal panel that includes a plurality of backlight lamps, the power supply unit 490 may further include an inverter (not shown) that enables pulse width modulation (PWM) operation for luminance variable or dimming driving.

The remote controller 500 transmits a user input to the user input interface 450. To this end, the remote controller 500 may use Bluetooth, RF communication, IR communication, UWB, ZigBee, etc.

In addition, the remote controller 500 may receive audio, video or data signal output from the user input interface 350 and display the received signal or output the same as audio or vibration.

The aforementioned digital device 400 may be a digital broadcast receiver that may process a digital broadcast signal of a standing or mobile type ATSC or DVB type.

In addition, in the digital device according to the present invention, some of the shown components may be omitted or a component (not shown) may be added as required. Meanwhile, the digital device may not include the tuner and the demodulator, differently from the aforementioned digital device, and may receive content through the network interface or the external device interface and reproduce the content.

Figure 5:
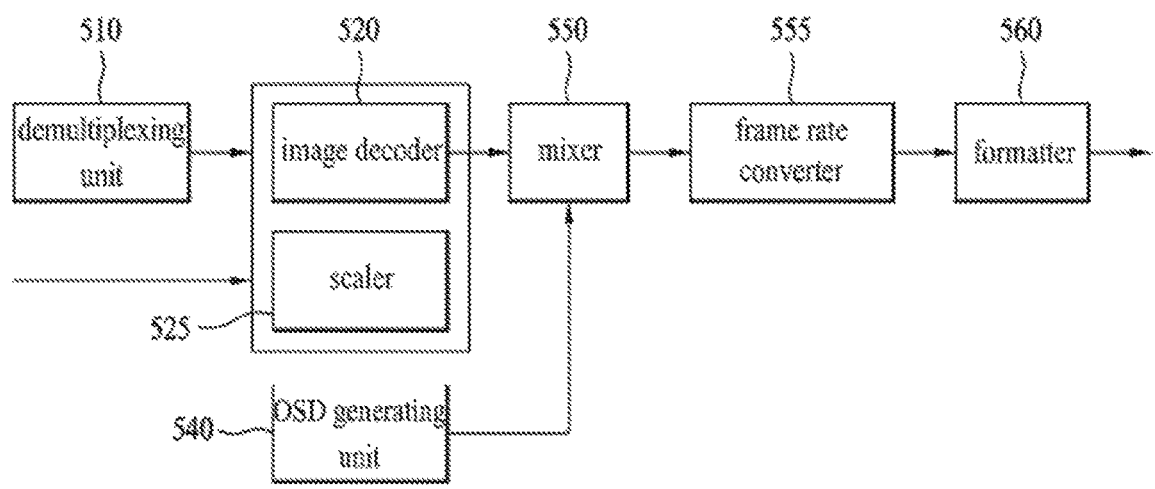
FIG. 5 is a block diagram illustrating a detailed configuration of each of controllers of FIGS. 2 to 4 according to one embodiment of the present invention.

FIG. 5 is a block diagram illustrating a detailed configuration of each of controllers of FIGS. 2 to 4 according to one embodiment of the present invention.

One example of the controller may include a demultiplexer 510, a video processor 520, an OSD generator 540, a mixer 550, a frame rate converter (FRC) 555, and a 3D formatter 560.

The demultiplexer 510 demultiplexes an input stream. For example, the demultiplexer 510 may demultiplex an input stream into an MPEG-2 TS image, an audio signal and a data signal. In this case, the stream signal input to the demultiplexer 510 may be a stream signal output from the tuner, the demodulator or the external device interface.

The video processor 520 may process a demultiplexed image signal. To this end, the video processor 420 may include a video decoder 525 and a scaler 535.

The video decoder 525 may decode the demultiplexed image signal and the scaler 535 may scale the resolution of the decoded image signal such that the image signal may be displayed through the display unit.

The video decoder may support various specifications. For example, the video decoder 525 may perform a function of an MPEG-2 decoder if the image signal is encoded by the MPEG-2 specification, and may perform a function of an H.264 decoder if the image signal is encoded by DMB (Digital Multimedia Broadcasting) mode or H.264 specification.

Meanwhile, the image signal decoded by the video processor 520 may be input to the mixer 550.

The OSD generator 540 generates OSD data automatically or according to user input. For example, the OSD generator 540 generates data to be displayed on the screen of the display unit 380 in the form of graphic or text on the basis of a control signal of the user input interface. The OSD data generated by the OSD generator 540 may include various data such as a user interface image of the digital device, various menu screens, widget, icons, and viewing rate information. The OSD generator 540 may generate a caption of a broadcast image or data for displaying EPG based broadcast information.

The mixer 550 mixes the OSD data generated by the OSD generator 540 with the image signal processed by the video processor 520 and then provides the mixed signal to the formatter 560. By mixing the decoded image signal with the OSD data, OSD may be overlaid on a broadcast image or external input image.

The frame rate converter (FRC) 555 converts a frame rate of input video. For example, the frame rate converter 555 may convert the frame rate of an input video of 60 Hz to a frame rate of 120 Hz or 240 Hz in accordance with an output frequency of the display unit. There may be various methods for converting the frame rate as above. For example, the frame rate converter 555 may convert the frame rate by inserting a first frame between the same first frame and a second frame or inserting a third frame predicted from the first frame and the second frame between the first frame and the second frame if the frame rate is converted from 60 Hz to 120 Hz. For another example, the frame rate converter 555 may convert the frame rate by further inserting three frames of the same frame or the predicted frame between the existing frames if the frame rate is converted from 60 Hz to 240 Hz. Meanwhile, the frame rate converter 555 may be bypassed when separate frame conversion is not executed.

The formatter 560 changes the output of the frame rate converter 555, which is input thereto, into a form suitable for the output format of the display unit. For example, the formatter 560 may output an RGB data signal. In this case, this RGB data signal may be output as a low voltage differential signal (LVDS) or mini-LVDS. When a 3D image signal output from the frame rate converter 555 is input to the formatter 560, the formatter 560 may format the 3D image signal such that the 3D image signal is matched with the output format of the display unit, to thereby support a 3D service through the display unit.

Meanwhile, an audio processor (not shown) within the controller may audio-process a demultiplexed audio signal. The audio processor (not shown) may support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) may include decoders corresponding to the formats to process the audio signals.

Furthermore, the audio processor (not shown) within the controller may control base, treble and volume.

A data processor (not shown) within the controller may process a demultiplexed data signal. For example, when a demultiplexed data signal is encoded, the data processor may decode the encoded demultiplexed data signal. In this case, the encoded data signal may be EPG information including broadcast information such as the start time and end time of a broadcast program which is broadcast through each channel.

The aforementioned digital devices are examples according to the present invention and components thereof may be integrated, added or omitted in accordance with specifications thereof. That is, two or more components may be integrated into one component or one component may be subdivided into two or more components as required. The function executed by each block is exemplified to describe the embodiments of the present invention and detailed operations or devices do not limit the scope of the present invention.

Meanwhile, the digital device may be an example of image signal processors which process an image stored therein or an input image. Other examples of the image signal processors may include a set-top box (STB) which does not include the display unit 480 and the audio output unit 485 shown in FIG. 4, a DVD player, a Blu-ray player, a game device, a computer, etc.

Figure 6:
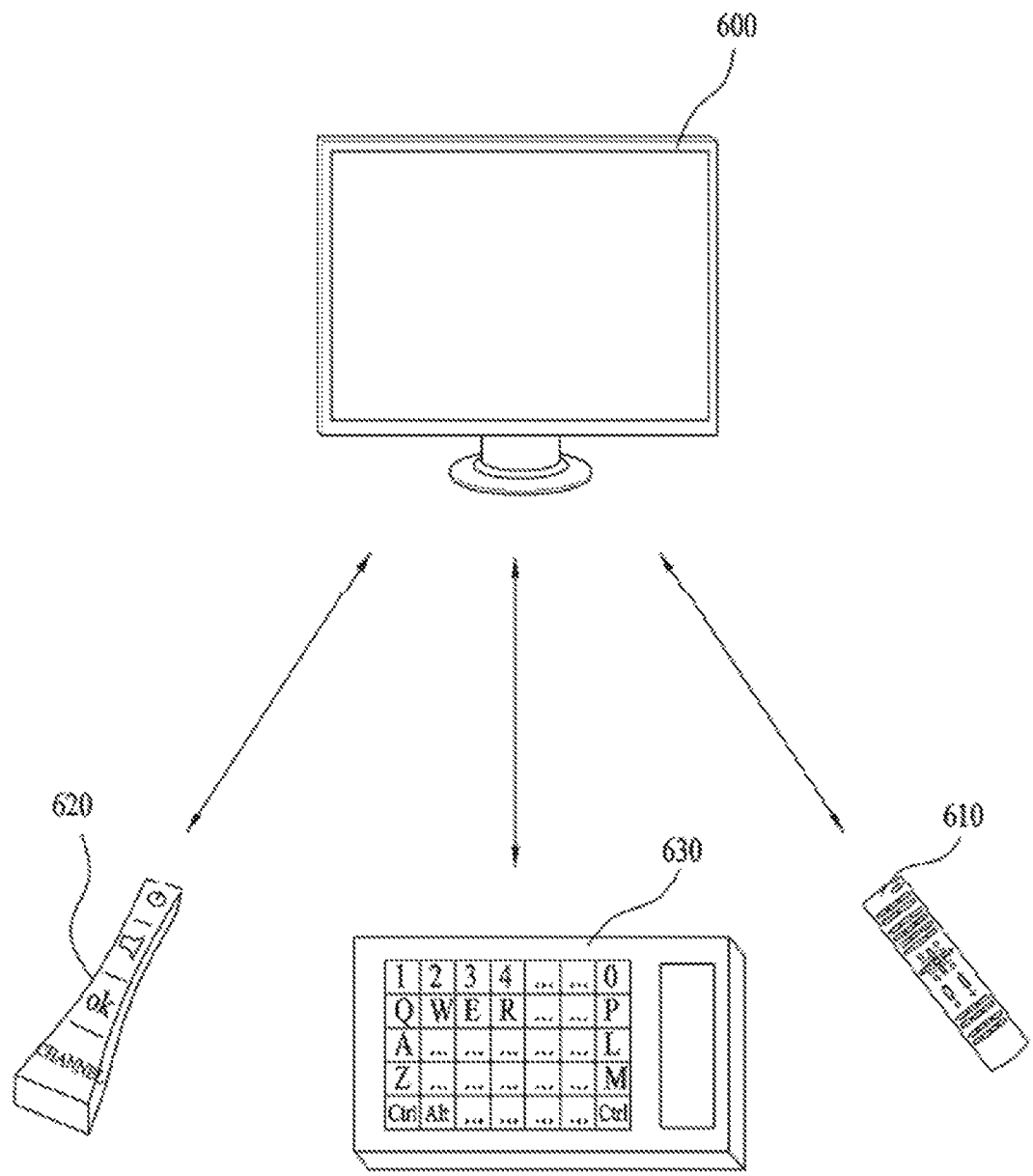
FIG. 6 is a diagram illustrating an input means connected to each of the digital devices of FIGS. 2 to 4 according to one embodiment of the present invention.

FIG. 6 is a diagram illustrating an input means connected to each of the digital devices of FIGS. 2 to 4 according to one embodiment of the present invention.

A front panel (not shown) or a control means (input means) provided on a digital device 600 is used to control the digital device 600.

Meanwhile, the control means is a user interface device (UID) that enables wired/wireless communication, and its examples may include a remote controller 610, a keyboard 630, a pointing device 620, and a touch pad, which are intended to control the digital device 600. A control means dedicated for external input, which is connected to the digital device 600, may also be used. In addition, a mobile device such as a smart phone and a tablet PC, which controls the digital device 600 through mode switching, is included in the control means. However, in this specification, a pointing device will be described as an embodiment for convenience of description, but the control means is not limited to the pointing device.

The input means may use at least one or more various communication protocols such as Bluetooth, RFID, IrDA, UWB, ZigBee, DLNA, RS, etc., if necessary, to perform communication with the digital device.

The remote controller 610 means a general input means provided with various key buttons required to control the digital device 600.

The pointing device 620 includes a gyro sensor mounted therein to implement a pointer on the screen of the digital device 600 on the basis of a user's movement, pressure and rotation, and delivers a predetermined command to the digital device 600. This pointing device 620 may be referred to as various titles such as a magic remote controller and a magic controller.

As the digital device 600 serves as an intelligent type integrated digital device that provides various services such as web browser, application and SNS (Social Network Service) in addition to a general digital device that provides broadcast services only, it is not easy to control the digital device 600 using a conventional remote controller 610 only, whereby the keyboard 630 has been implemented to facilitate text input similarly to a keyboard of a PC.

Meanwhile, the control means such as the remote controller 610, the pointing device 620, and the keyboard 630 includes a touch pad if necessary to be used for more convenient and various controls such as text input, movement of a pointer and magnification and reduction of a picture or video.

The digital device described in the present specification uses Web OS as an OS and/or a platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to as a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multitasking.

Meanwhile, the Web OS platform described in the present specification may be available not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems and depends on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
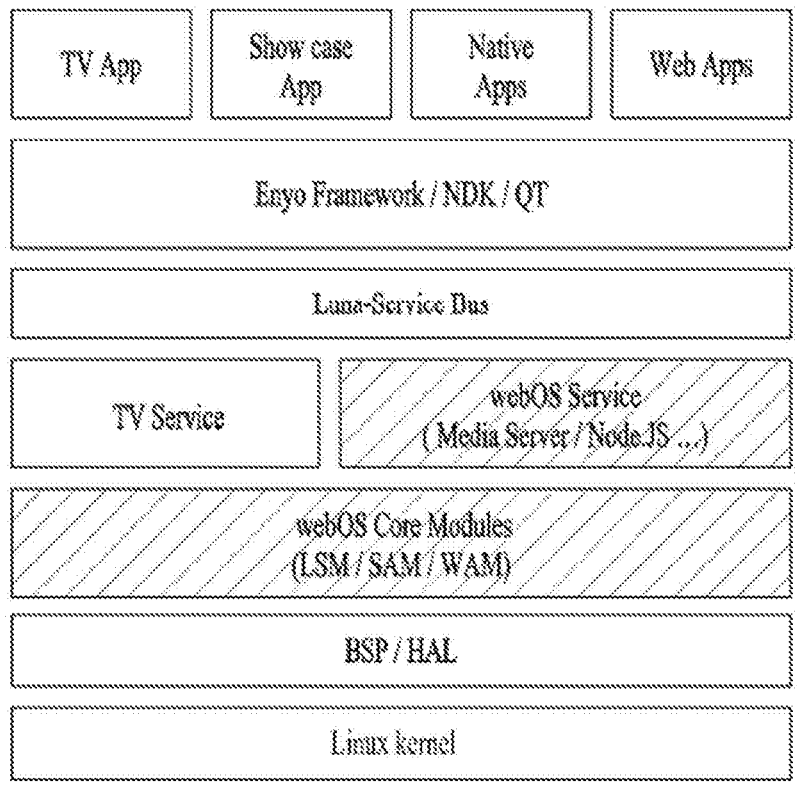
FIG. 7 is a diagram illustrating Web OS architecture according to one embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a system library based Web OS core platform, an application, and a service.

The architecture of the Web OS platform has a layered structure. OSs are provided at a lowest layer, system library (s) are provided at a next layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

Some layers of the above-described Web OS layered structure may be omitted, and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and JavaScripts, and is composed of the Node.js service used via Node.js.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. depending on implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a Qt based native application and includes basic applications provided along with the Web OS platform, such as card view, home dashboard, virtual keyboard, etc. In this case, QML is a markup language of a script format, not C++.

The native application is an application which is developed and compiled using C/C++ and is executed in the binary form and has an advantage such as high execution speed.

Figure 8:
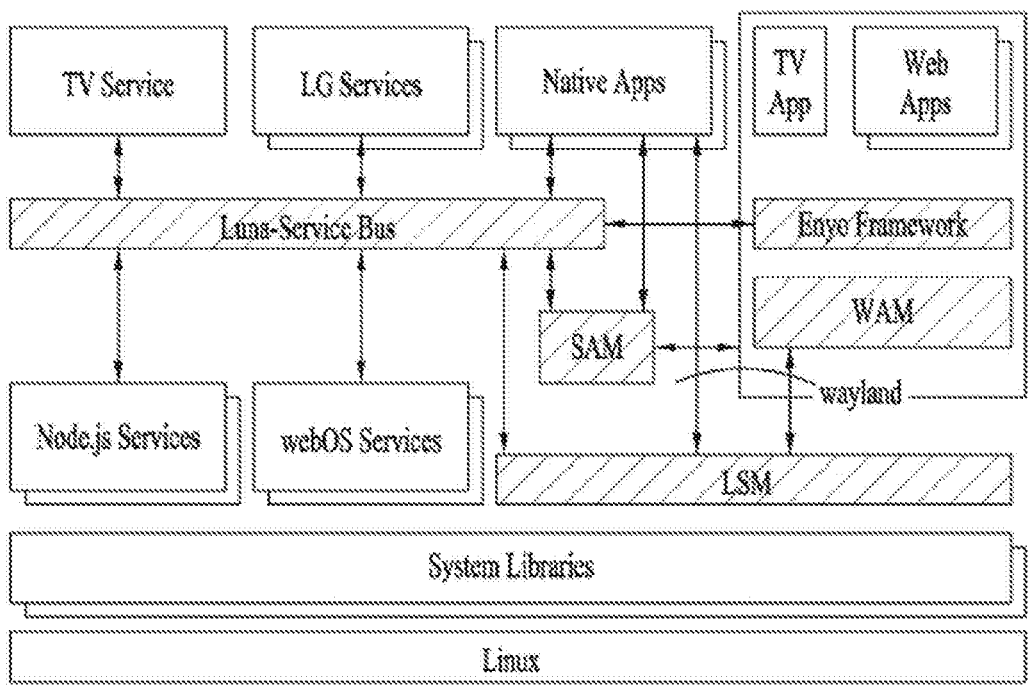
FIG. 8 is a diagram illustrating architecture of a Web OS device according to one embodiment of the present invention.

FIG. 8 is a diagram illustrating the architecture of a Web OS device according to one embodiment of the present invention.

FIG. 8 is a block diagram based on a runtime of a Web OS device and will be understood with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween may be performed via a Luna-service bus.

Node.js services based on HTML5 such as e-mail, contact or calendar, CSS, and JavaScript, Web OS services such as logging, backup, file notify, database (DB), activity manager, system policy, audio daemon (AudioD), update, and media server, TV services such as electronic program guide (EPG), personal video recorder (PVR), and data broadcasting, CP services such as voice recognition, now on, notification, search, auto content recognition (ACR), contents list browser (CBOX), wfdd, DMR, remote application, download, and Sony Philips digital interface format (SDPIF), native applications such as PDK applications, browsers, and QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices, such as USB, DLNA and Cloud, connected to a TV. The CBOX may output content listing of various content containers such as USB, DMS, DVR, and Cloud as an integrated view. The CBOX may display various types of content listings such as pictures, music or video and manage metadata thereof. In addition, the CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens are composed using an app-on-app method, and may provide a window management mechanism for 21:9 and a multi-window.

The LSM supports implementation of a system UI based on a QML and improves development productivity. QML UX may easily configure a view using a screen layout and UI components based on MVC and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recents applications, showcase applications or launcher applications render their respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (sound to text (STT), text to sound (TTS), natural language processing (NLP), etc.), pattern gesture (camera or mobile radio control unit (MRCU)), live menu, auto content recognition (ACR), etc.

Figure 9:
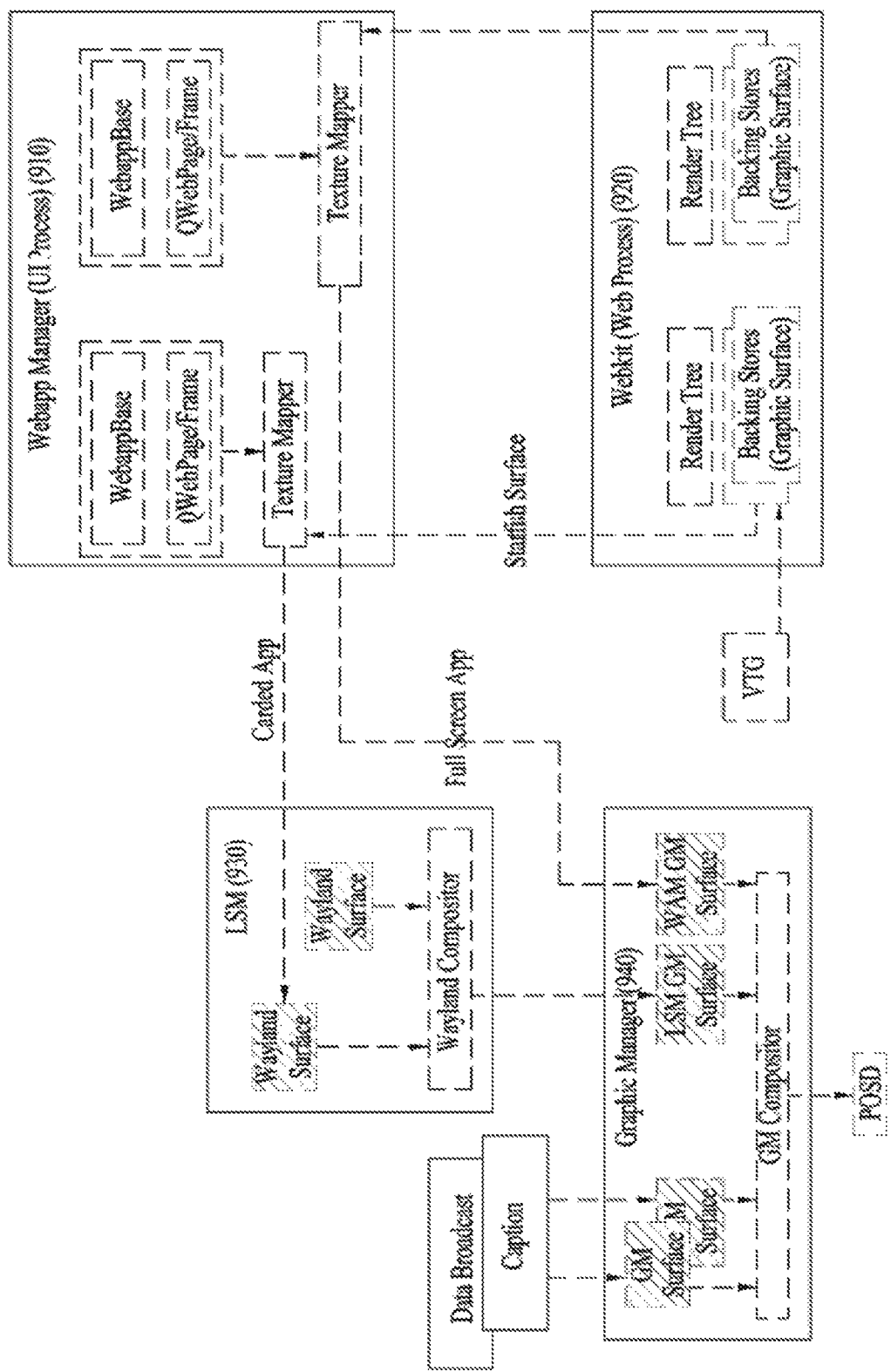
FIG. 9 is a diagram illustrating a graphic composition flow in a Web OS device according to one embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphic manager (GM) 940.

When the web application manager 910 generates web application based graphic data (or application) as a UI process, the generated graphic data is delivered to the LSM 930 if the graphic data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 may bypass the application. In this case, the application is directly delivered to the graphic manager 940.

The LSM 930 transmits the received UI application to a Wayland compositor via a Wayland surface and the Wayland compositor appropriately processes the UI application and delivers the processed UI application to the graphic manager. The graphic data received from the LSM 930 is delivered to the graphic manager compositor via the LSM GM surface of the graphic manager 940, for example.

Meanwhile, the full-screen application is directly delivered to the graphic manager 940 without passing through the LSM 930 as described above and is processed in the graphic manager compositor via the WAM GM surface.

The graphic manager processes and outputs all graphic data in the Web OS device and receives and outputs data passing through the above-described LSM GM surface, data passing through a WAM GM surface, and graphic data passing through a GM surface, such as a data broadcasting application or a caption application, on a screen. The function of the GM compositor is equal or similar to the above-described compositor.

Figure 10:
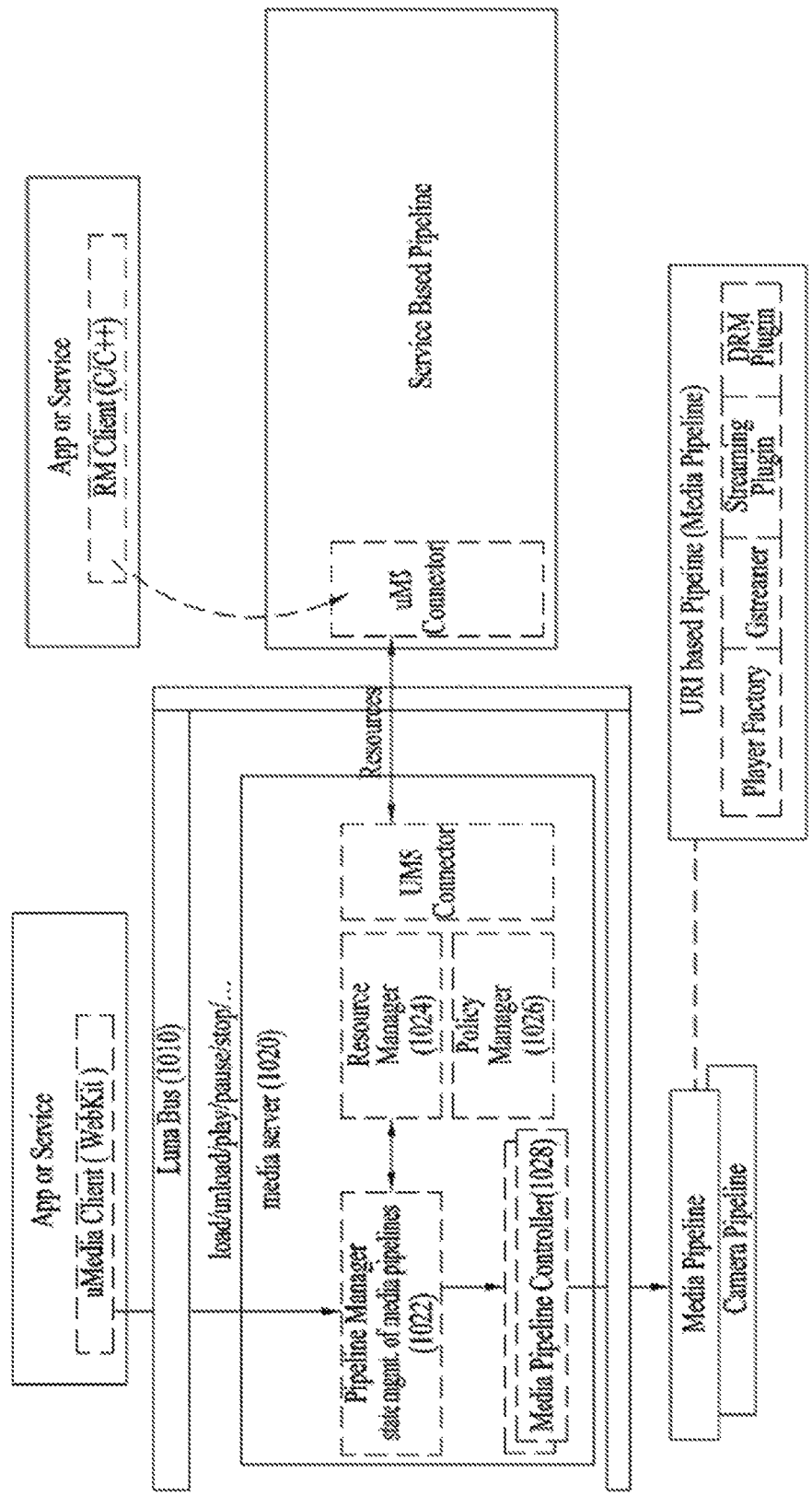
FIG. 10 is a diagram illustrating a media server according to one embodiment of the present invention.
Figure 11:
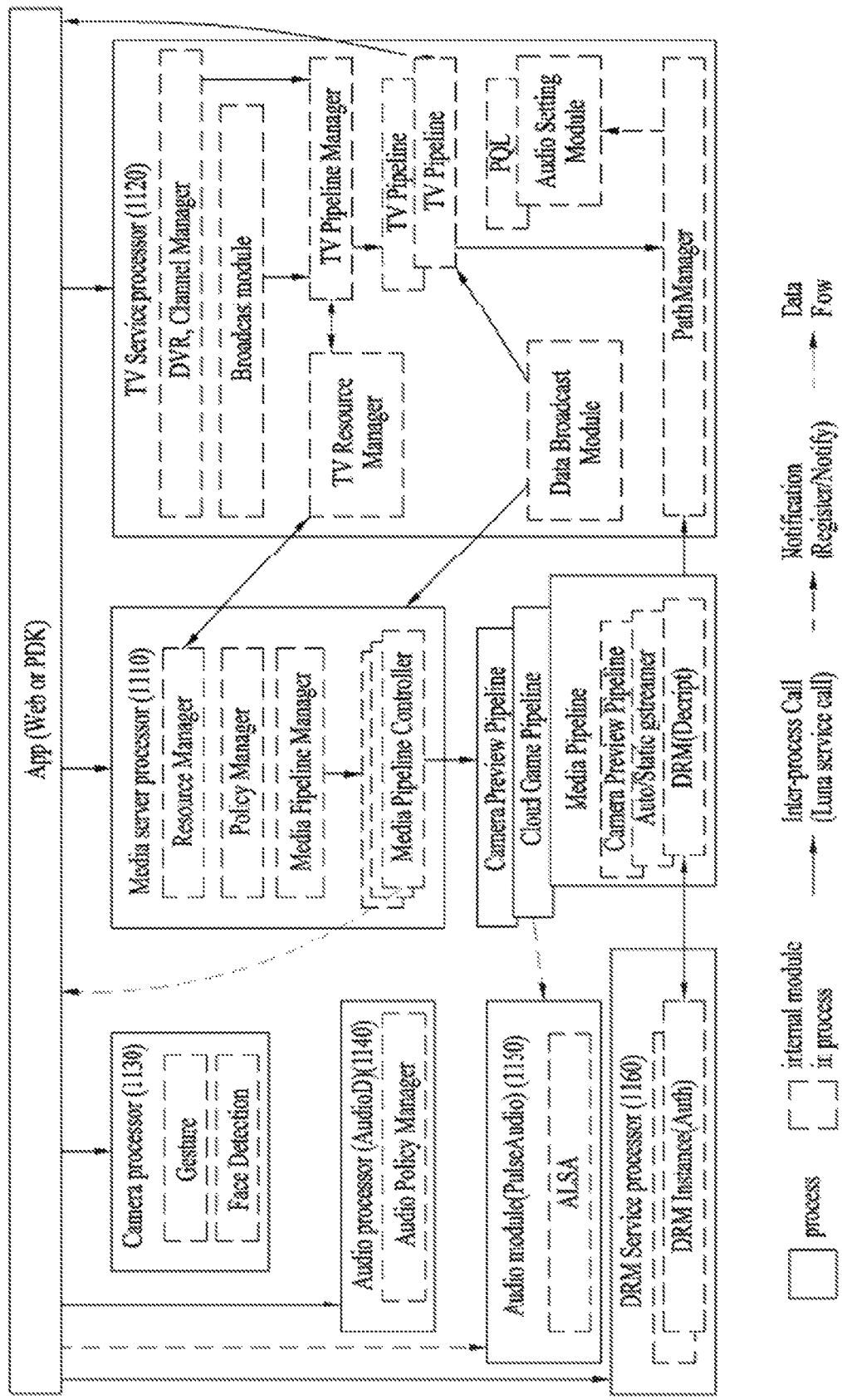
FIG. 11 is a schematic block diagram illustrating a media server according to one embodiment of the present invention.
Figure 12:
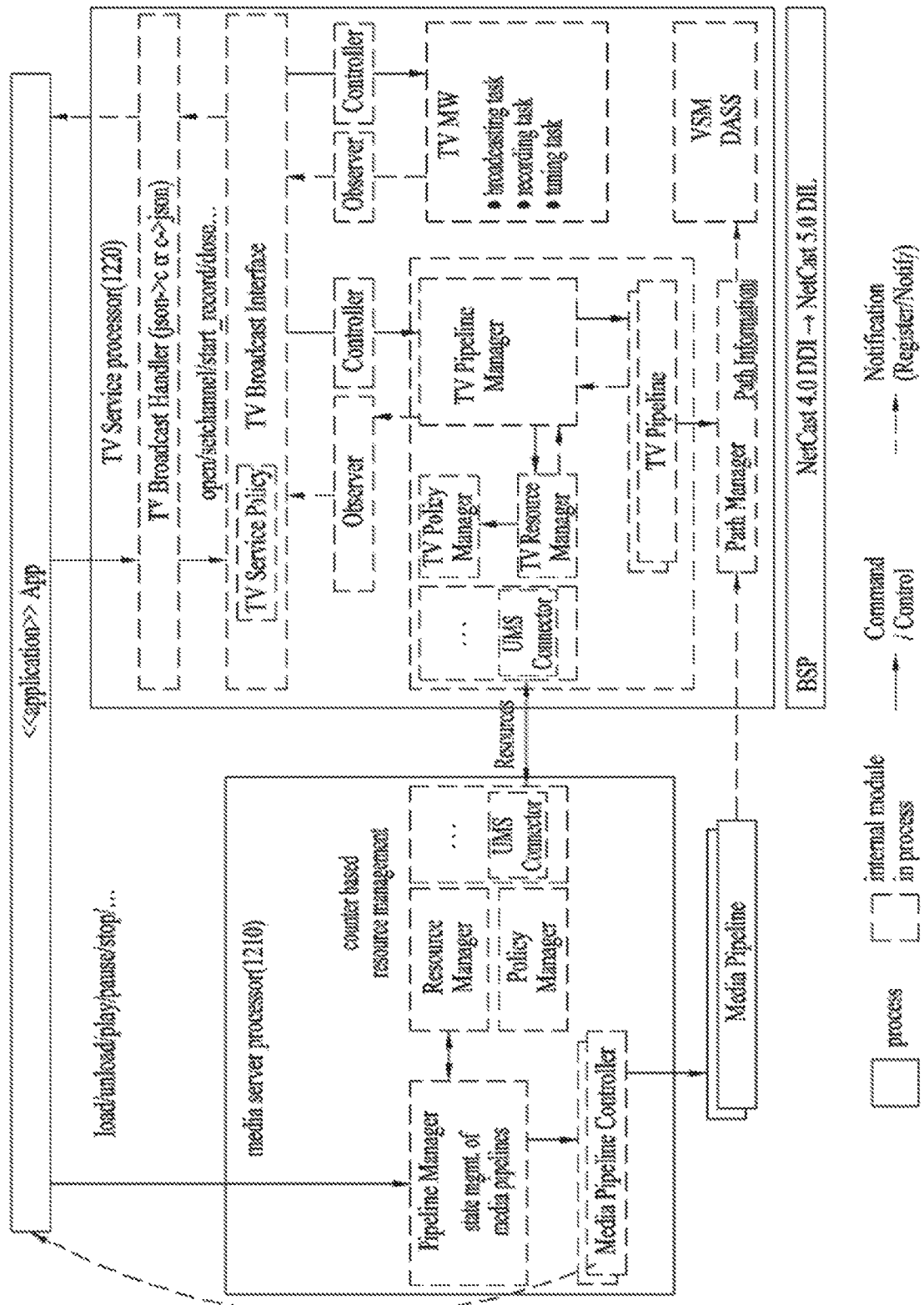
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphic data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robustness, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed depending on to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever each of media is executed, allows media execution based on priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back HTML5 standard media.

In addition, the media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as μMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. In this regard, the media server may manage pipeline controller resources.

The media server supports extensibility, reliability, efficient resource usage, etc., for example.

In other words, the μMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

In this case, the pipeline may be generated when a media related to a task starts a sequence of request, decoding streaming and parsing such as video output. For example, in association with a TV service and an application, watching, recording, channel tuning, etc. are controlled and performed via pipelines individually generated in accordance with requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients in accordance with properties thereof and may exchange data with the media server 1020 or the pipeline via the clients.

The clients include a Media client (WebKit) for connection with the media server 1020 and a resource manager (RM) client (C/C++), for example.

The application including the μMedia client is connected to the media server 1020 as described above. More specifically, the μMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the µMedia client transmits status data related to the video operation to the pipeline manager 1022 in the media server.

The pipeline manager 1022 acquires information about resources of the current device via data communication with the resource manager 1024 and requests assignment of resources corresponding to the status data of the µMedia client. At this time, the pipeline manager 1022 or the resource manager 1024 controls resource assignment via data communication with the policy manager 1026 if necessary. For example, if resources to be assigned in accordance with the request of the pipeline manager 1022 are not present or are lacking in the resource manager 1024, resource assignment may be appropriately performed in accordance with priority comparison of the policy manager 1026.

The pipeline manager 1022 requests the media pipeline controller 1028 to generate a pipeline for operation according to the request of the µMedia client with respect to resources assigned in accordance with resource assignment of the resource manager 1024.

The media pipeline controller 1028 generates a necessary pipeline under the control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

In addition, the pipeline may include a service-based pipeline and a URI based pipeline (media pipeline), for example.

Referring to FIG. 10, the application or service including the RM client cannot be directly connected to the media server 1020, because the application or service may directly process a media. In other words, if the application or service directly processes a media, the media server cannot be used. At this time, for pipeline generation and usage, resource management is necessary and thus a µMS connector is used. When a resource management request for direct media processing of the application or service is received, the µMS connector communicates with the media server 1020 including the resource manager 1024. The media server 1020 should also include a µMS connector.

Accordingly, the application or service may cope with the request of the RM client via resource management of the resource manager 1024 via the µMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

An interface method of using a service in PDK may be used.

Alternatively, a method of using in existing CP may be used. For backward compatibility, plug-in of an existing platform may be extended and used based on Luna.

Finally, an interface method using a non-Web OS may be used. In this case, a Luna bus may be directly called to perform interfacing.

Seamless change is processed by a separate module (e.g., TVWIN) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed depending on application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1160. The application or a pipeline related thereto may notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines in accordance with a request for generation of a TV pipeline from the processing module or manager of the TV service processor, under the control of the TV resource manager. The TV resource manager may be controlled by the TV policy manager, in order to request a status and assignment of a resource assigned for a TV service in accordance with a request for generation of a TV pipeline of the TV pipeline manager, and may perform data communication with the media server processor 1110/1210 via a μMS connector. The resource manager in the media server processor 1110/1210 sends the resource status and assignment for the TV service in accordance with the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline in accordance with a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline in accordance with a status report of the resource manager in the media server processor 1110/1210.

Meanwhile, the BSP supports backward compatibility with an existing digital device.

The generated TV pipelines may appropriately operate under the control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under the control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under the control of the path manager. For a detailed description of the processing procedure of the media server processor 1110/1210, refer to the description of FIG. 10 and a repeated description will be omitted.

In the present specification, the resource manager in the media server processor 1110/1210 may perform resource management on a counter base, for example.

Hereinafter, the embodiments of the present invention will be described in detail with reference to FIGS. 13 to 28. The following embodiments of the present invention will be described and understood with reference to the description made with reference to FIGS. 1 to 12. Also, the aforementioned display device or digital device may be a multimedia device according to one embodiment of the present invention.

The multimedia device described in this specification may include a TV, a smart TV, a hybrid broadcast broadband television (HBBTV), a network TV, a web TV, an Internet protocol television (IPTV), a personal computer, a tablet PC, a notebook computer, netbook computer, a PMP, a smart phone, smart watches, smart glasses, a navigator, etc.

Figure 13:
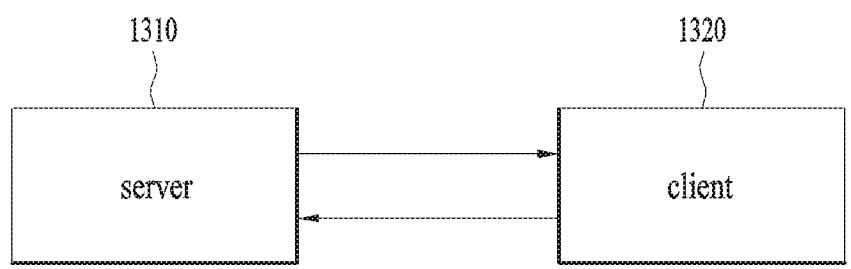
FIG. 13 is a diagram illustrating an example of a method for transmitting and receiving a content in an adaptive bitrate streaming mode.

FIG. 13 is a diagram illustrating an example of a method for transmitting and receiving a content in an adaptive bitrate streaming mode.

Adaptive bitrate streaming means that a partial content having picture quality that may be handled by a bandwidth of a client 1320 (e.g., receiving side) is transmitted based on network status or transmission rate. A server 1310 proactively performs a procedure of encoding a content for variable bitrate streaming to stream segments of several bitrates. For example, if the server 1310 desires to serve a one-minute sized content in an adaptive bitrate streaming mode, the server 1310 may divide a stream of a whole length into stream segments on a basis of 2 seconds to 10 seconds and encode the divided stream segments at three different bitrates, thereby storing the encoded result therein. Each bitrate may correspond to resolution of the content. That is, the stream segments encoded at a high bitrate may mean that resolution of video data within the stream segments is high.

The client 1320 may receive meta data (e.g., manifest file), which includes information of the encoded stream segments, from the server 1310. The manifest file may include information on types of bitrates of the stream segments, an identification method of the stream segments, and a position of the stream segments on the network. For example, the client 1320 may request the server 1310 of the stream segments of the lowest bitrate to receive them when starting to receive a content. The client 1320 may request the server 1310 of stream segments of an appropriate bitrate on the basis of the manifest file if a current transmission rate is greater than the bitrate of the received stream segments in accordance with a current bandwidth.

Types of such adaptive bitrate streaming protocols include MPEG-DASH (Dynamic Adaptive Streaming over HTTP), Adobe Dynamic Streaming for Flash (HDS), QuavStreams Adaptive Streaming over HTTP, Apple HTTP Adaptive Streaming for iPhone/iPad/STB (HLS), Microsoft Smooth Streaming, upLynk, etc.

Figure 14:
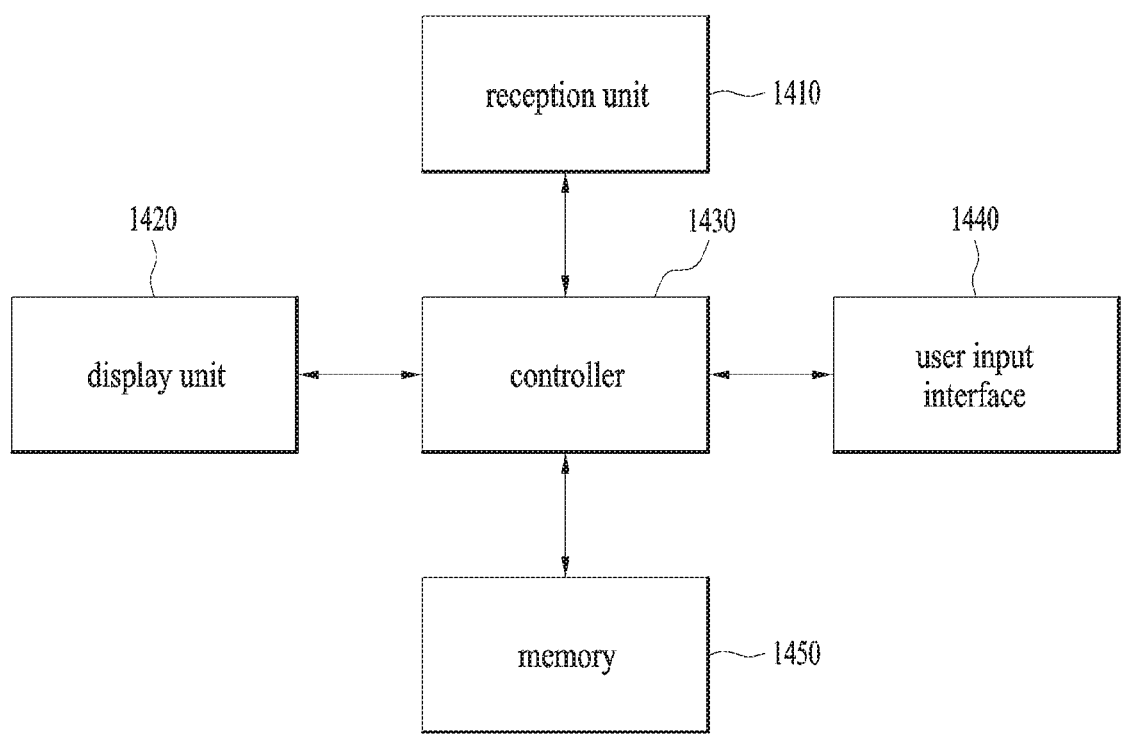
FIG. 14 is a block diagram illustrating component modules of a multimedia device according to one embodiment of the present invention.

FIG. 14 is a block diagram illustrating component modules of a multimedia device according to one embodiment of the present invention. Some of the component modules may be added to the multimedia device shown in FIG. 14 or may be modified, with reference to FIGS. 1 to 12, and the scope of the present invention should be construed in accordance with the disclosure in claims not the elements disclosed in the drawings.

The multimedia device according to one embodiment of the present invention may include a reception unit 1410, a display unit 1420, a controller 1430, a user input interface 1440, and a memory 1450.

The reception unit 1410 may receive a broadcast signal including broadcast program data, content, etc. from a broadcasting station or content provider (CP), or may receive service, application, content, etc. from an external server through a network. The reception unit 1410 may be implemented as at least one of the network interface 201 of FIG. 2, the wireless communication unit 310 of FIG. 3, or the reception unit 405 of FIG. 4.

The display unit 1420 may display video data, graphic data, image data, etc., which correspond to the content received from the reception unit 1410. Also, the display unit 1420 may display video data, graphic data and image data, which are previously stored in the memory 1450. The display unit 1420 may be implemented as at least one of the display unit 208 of FIG. 2, the display unit 351 of FIG. 3, and the display unit 480 of FIG. 4.

The user input interface 1440 may receive a specific command from a user. The user input interface 1440 may receive a control signal for controlling the multimedia device from the aforementioned remote control devices 610, 620 and 630, or may receive a control signal for controlling the multimedia device through a touch screen if the display unit 1420 includes the touch screen. The user input interface 1440 may be implemented as at least one of the UI manager 214 of FIG. 2, the user input unit 330 of FIG. 3 and the user interface 450 of FIG. 4.

The memory 1450 may store various programs, applications, algorithms, etc., which are required for the operation of the multimedia device. The memory 1450 may store the content, program, data, application, etc. received through the reception unit 1410. The memory 1450 may be implemented as at least one of the SI & meta data database 211 of FIG. 2, the memory 360 of FIG. 3, and the storage unit 440 of FIG. 4.

The controller 1430 controls the operation of the multimedia device, and manages whole functions of the reception unit 1410, the display unit 1420, the user input interface 1440 and the memory 1450. The controller 1430 may include a decoder for processing video data and audio data of the content received in the reception unit 1410. In accordance with the embodiment, the controller 1430 may include a plurality of video decoders, at least one of which may be a hardware decoder or a software decoder. The video decoder included in the controller 1430 may process video data of resolution corresponding to maximum 4K grade (e.g., 4,096*2,096) or video data of resolution higher or lower than 4K grade in accordance with specifications of the multimedia device. For example, if the controller 1430 includes a plurality of video decoders and cannot process video data of a specific content using only one of the plurality of video decoders, the controller 1430 may divide the video data of the specific content, process the divided data through two or more of the video decoders and then merge the processed video data through the mixer.

The controller 1430 may be implemented as at least one of the TCP/IP manager 201, the service delivery manager 203, the SI decoder 204, the demultiplexer 205, the audio decoder 206, the video decoder 207, the service control manager 209, the service discovery manager 210 and the service manager 213 of FIG. 2, the controller 380 of FIG. 3, the controller 470 of FIG. 4, the media server 1020 of FIG. 10, the media server processor 1110 and the TV service processor 1120 of FIG. 11, and the media server processor 1210 and the TV service processor 1220 of FIG. 12.

Hereinafter, the respective component modules included in the multimedia device of FIG. 14 according to the embodiment of the present invention will be described in more detail with reference to FIGS. 14 and 15.

Figure 15:
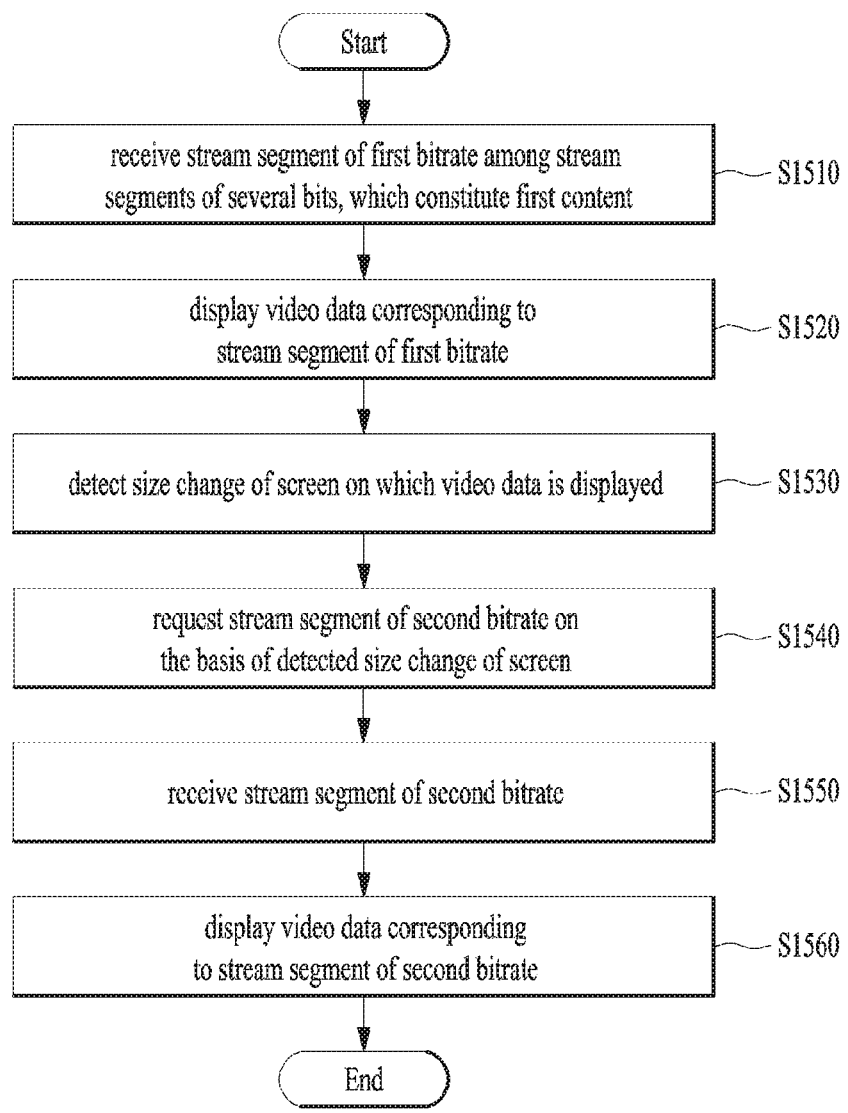
FIG. 15 is a flow chart illustrating an example of a method for receiving a content in an adaptive bitrate streaming mode in a multimedia device according to one embodiment of the present invention.

FIG. 15 is a flow chart illustrating an example of a method for receiving a content in an adaptive bitrate streaming mode in a multimedia device according to one embodiment of the present invention. Hereinafter, an example of a method for receiving a content in a multimedia device according to one embodiment of the present invention will be described with reference to FIGS. 14 and 15. In this embodiment, it is assumed that a user selects playback of a first content.

The controller 1430 of the multimedia device controls the first reception unit 1410 to receive a stream segment of a first bitrate among stream segments of several bitrates, which constitute a first content (S1510). The reception unit 1410 may receive the stream segment of the first bitrate through a network.

The reception unit 1410 may receive meta data for the first content from the server, request the server of the stream segment of the first bitrate among the stream segments of several bits, which constitute the first content based on the received meta data, and receive the requested stream segment of the first bitrate from the server, under the control of the controller 1430. The meta data may include information on types of bitrates of the stream segments, which constitute the first content, an identification method of the stream segments, and a position of the stream segments on the network.

In accordance with the embodiment, the reception unit 110 may first request the server of the stream segment of the lowest bitrate, or may request the server of the stream segment of an appropriate bitrate on the basis of at least one of a screen size of the display unit 1420 and a current bandwidth. The controller 1430 may measure the current bandwidth on the basis of a size of data received through the reception unit 1410 just before the first content is received when the first content starts to be received and time required to receive the data, or may measure the current bandwidth on the basis of a size of a previously received stream segment if the first content is being received and time required to receive the previously received segment. For example, the controller 1430 may control the reception unit 1410 to request the server of the stream segment of the bitrate corresponding to resolution less than a predetermined level even though the current bandwidth is sufficient if the screen size of the display unit 1420 is smaller than a predetermined size. This is to allow the user to efficiently use resource and bandwidth without any disturbance in viewing the screen as it is difficult for the user to identify a delicate difference of resolution if the screen size of the display unit 1420 is small. The memory 1450 may previously store information (e.g., at least one of information on screen size of the display unit 1420 and information on model name and specifications of the multimedia device) required to identify the size of the display unit 1420.

The controller 1430 displays video data corresponding to the received stream segment of the first bitrate in the display unit 1420 (S1520). If the stream segment of the first bitrate is received through the reception unit 1410, the controller 1430 may assign a resource for processing the received stream segment of the first bitrate. In accordance with the embodiment, the controller 1430 may assign the resource for processing the stream segment of the first bitrate when requesting the server of the stream segment of the first bitrate or may assign a resource required for processing of the first content selected when playback of the first content is selected. The resource for processing the stream segment of the first bitrate may include a video decoder, an audio decoder, a memory space, a display engine area, etc., which are required to output video and audio data included in the stream segment of the first bitrate. The controller 1430 may process the stream segment of the first bitrate on the basis of the assigned resource and display the video data included in the stream segment of the first bitrate on the display unit 1420.

The controller 1430 detects a size change of a screen on which the video data is displayed (S1530). The user may decrease or increase the size of the screen on which the video data is displayed in the course of viewing the first content, virtually split the screen of the display unit 1420 into at least two areas, virtually split the screen of the display unit 1420 virtually split into at least two areas into areas smaller than the current areas, or change the screen of the display unit 1420 virtually split into at least two areas to a full screen.

The controller 1430 controls the reception unit 1410 to request the server of a stream segment of a second bitrate on the basis of the detected size change of the screen (S1540).

For example, if the size of the screen on which the video data is displayed is increased, the controller 1430 may control the reception unit 1410 to request the server of the stream segment of the second bitrate on the basis of the increased size of the screen. If the size of the screen on which the video data is displayed is increased, since a content of higher picture quality should be provided to a user, the controller 1430 may control the reception unit 1410 to request the server of the stream segment of the second bitrate greater than the first bitrate in consideration of the remaining resource. At this time, the controller 1430 may determine the second bitrate in consideration of at least one of information on a size of a full screen of the display unit 1420, a current bandwidth, and media services (e.g., the number of media services) currently processed by the multimedia device at the same time in addition to the detected size change of the screen. For example, the controller 1430 may request the server of the stream segment of the second bitrate the same as or smaller than the first bitrate in spite of increase of the size of the screen on which the video data is displayed if a current transmission rate corresponds to or is lower than the first bitrate as a result of measurement of the current bandwidth, or if another content processed by the multimedia device is present in addition to the first content.

As another example, if the size of the screen on which the video data is displayed is decreased, the controller 1430 may control the reception unit 1410 to request the server of the stream segment of the second bitrate on the basis of the decreased size of the screen. If the size of the screen on which the video data is displayed is decreased, since there is little difference in resolution sensed by the naked eye of a user even though a content of lower picture quality is provided to the user, the controller 1430 may control the reception unit 1410 to request the server of the stream segment of the second bitrate lower than the first bitrate to efficiently use a resource. At this time, the controller 1430 may determine the second bitrate in consideration of at least one of information on a size of a full screen of the display unit 1420, a current bandwidth, and media services currently processed by the multimedia device at the same time in addition to the detected size change of the screen. For example, the controller 1430 may request the server of the stream segment of the second bitrate the same as or greater than the first bitrate in spite of decrease of the size of the screen on which the video data is displayed if a current transmission rate corresponds to or is higher than the first bitrate as a result of measurement of the current bandwidth, or if another content processed by the multimedia device is present in addition to the first content.

As other example, if the screen of the display unit 1420 is split into at least two areas, that is, a first area and a second area, the controller 1430 may detect whether video data corresponding to the first content is output through which one of the first area and the second area, and if the video data corresponding to the first content is output through the first area, may control the reception unit 1410 to request the server of the stream segment of the second bitrate on the basis of the size of the first area. If the size of the screen on which the video data is displayed is decreased due to the screen split of the display unit 1420, since there is little difference in resolution sensed by the naked eye of a user even though a content of lower picture quality is provided to the user, the controller 1430 may control the reception unit 1410 to request the server of the stream segment of the second bitrate lower than the first bitrate to efficiently use a resource. At this time, the controller 1430 may determine the second bitrate in consideration of at least one of information on a size of a full screen of the display unit 1420, a current bandwidth, and media services currently processed by the multimedia device at the same time in addition to the detected size change of the screen. For example, if the user desires to view a second content different from the first content, the controller 1430 may request the server of the stream segment of the second bitrate lower than the current bandwidth even though the current bandwidth is sufficient, thereby obtaining a resource required for processing of the second content.

The controller 1430 displays video data corresponding to the received stream segment of the second bitrate on the display unit 1420 (S1560). Since the bitrate of the received stream segment has been changed, the controller 1430 may adjust a range of the resource assigned for processing of the first content. If the second bitrate is greater than the first bitrate, the controller 1430 may assign more resources than the resource assigned for processing of the stream segment of the first bitrate to process the stream segment of the second bitrate. If the second bitrate is smaller than the first bitrate, the controller 1430 may recover some of the resources assigned for processing of the first content. The controller 1430 may process the stream segment of the second bitrate on the basis of the adjusted resource and display the video data included in the stream segment of the second bitrate on the display unit 1420.

According to this embodiment, the bitrate of the stream segment which will be received from the server may be determined in consideration of the screen size of the display unit 1420, size change of the screen, and the number of media services which should be processed at the same time as well as a network environment of the multimedia device, whereby a problem that the resource is wasted may be solved, and the resource may be managed efficiently.

Figure 16:
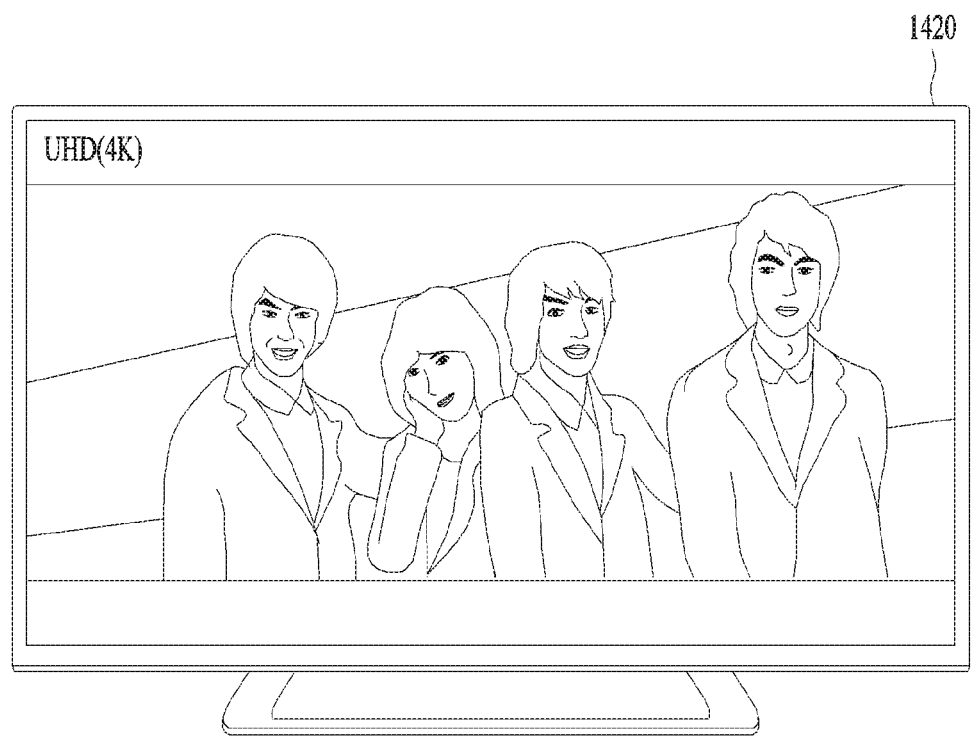
FIG. 16 is a diagram illustrating an example of a method for displaying a content by receiving the content in an adaptive bitrate streaming mode in a multimedia device according to one embodiment of the present invention.

FIG. 16 is a diagram illustrating an example of a method for displaying a content by receiving the content in an adaptive bitrate streaming mode in a multimedia device according to one embodiment of the present invention. It is assumed that the multimedia device according to one embodiment of the present invention, which is shown in FIG. 16, is a stationary type display device that includes the display unit 1420 having a screen size of a predetermined level or more. Also, it is assumed that a user selects playback of a first content in this embodiment.

The controller 1430 of the multimedia device may receive meta data, which includes information on stream segments of several bitrates, which constitute the first content, from the server.

The controller 1430 controls the reception unit 1410 to request the server of a stream segment of an appropriate bitrate on the basis of the meta data and receive the requested stream segment from the server, in consideration of at least one of a screen size of the display unit 1420 and a current bandwidth. The controller 1430 may consider a currently available resource in determining the appropriate bitrate.

For example, if a video decoder included in the controller 1430 may process video data having resolution of UHD and a current bandwidth which is measured is sufficient to receive a stream segment having resolution of UHD, the controller 1430 may control the reception unit 1410 to request the server of the first stream segment having resolution of UHD and receive the requested first stream segment from the server. The controller 1430 may process the video data included in the received first stream segment and output the processed video data on the display unit 1420.

In accordance with the embodiment, if another media service is executed in a background of the multimedia device in addition to playback of the first content and the video decoder included in the controller 1430 may process video data having resolution of maximum UHD, the controller 1430 may request the server of the first stream segment having resolution of UHD and recover a resource assigned to the media service executed in the background. The controller 1430 may assign the recovered resource in processing the received first stream segment having resolution of UHD. In this case, the expression that the media service is executed in the background may mean that the media service has been executed by the user's selection but the execution screen is not output to the display unit 1420, or may mean that a previously set media service is executed automatically in the background in accordance with execution of another media service or another function.

In accordance with the embodiment, even though the video decoder included in the controller 1430 may process video data having resolution of UHD and the current bandwidth which is measured is sufficient to receive a stream segment having resolution of UHD, if the size of the display unit 1420 is smaller than a previously set size, the controller 1430 may request the server of a stream segment having resolution lower than UHD to efficiently use the resource.

The controller 1430 may store the first stream segment in a refresh buffer and measure a current bandwidth before playback of the first stream segment starts or in the course of playing back the first stream segment. If the current bandwidth which is measured is sufficient to receive a stream segment having resolution of UHD, the controller 1430 may control the reception unit 1410 to request the server of a second stream segment having resolution of UHD and receive the requested second stream segment from the server. After playback of the video data corresponding to the first stream segment is completed, the controller 1430 may process the video data included in the received second stream segment and output the processed video data to the display unit 1420. On the other hand, if the current bandwidth which is measured is not sufficient to receive a stream segment having resolution of UHD, the controller 1430 may control the reception unit 1410 to request the server of a second stream segment having resolution lower than that of UHD on the basis of the meta data and receive the requested second stream segment from the server.

Figure 17:
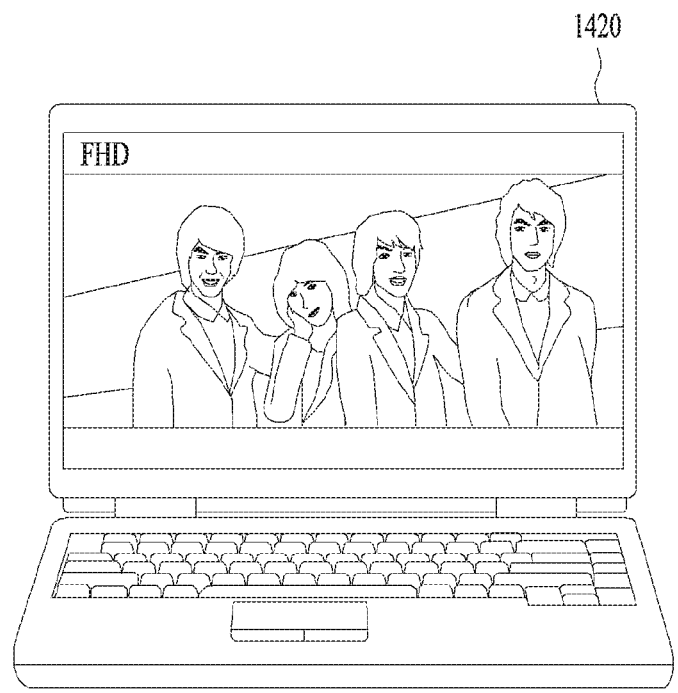
FIG. 17 is a diagram illustrating another example of a method for displaying a content by receiving the content in an adaptive bitrate streaming mode in a multimedia device according to one embodiment of the present invention.

FIG. 17 is a diagram illustrating another example of a method for displaying a content by receiving the content in an adaptive bitrate streaming mode in a multimedia device according to one embodiment of the present invention. It is assumed that the multimedia device according to one embodiment of the present invention, which is shown in FIG. 17, is a mobile computer that includes the display unit 1420 having a screen size within a predetermined range. Also, it is assumed that a user selects playback of a first content in this embodiment.

The controller 1430 of the multimedia device may receive meta data, which includes information on stream segments of several bitrates, which constitute the first content, from the server.

The controller 1430 controls the reception unit 1410 to request the server of a stream segment of an appropriate bitrate on the basis of the meta data and receive the requested stream segment from the server, in consideration of at least one of a screen size of the display unit 1420 and a current bandwidth. The controller 1430 may consider a currently available resource in determining the appropriate bitrate.

For example, if a video decoder included in the controller 1430 may process video data having resolution of FHD but cannot process video data having resolution of UHD and a current bandwidth which is measured is sufficient to receive a stream segment having resolution of FHD, the controller 1430 may control the reception unit 1410 to request the server of the first stream segment having resolution of FHD and receive the requested first stream segment from the server. Alternatively, even though a video decoder included in the controller 1430 may process video data having resolution of UHD and a current bandwidth which is measured is sufficient to receive a stream segment having resolution of UHD, if a screen size of the display unit 1420 is smaller than a predetermined size, since there is little difference between resolution of UHD and resolution of FHD sensed by the naked eye of a user, priority is given to efficient usage of the resource. If the video decoder included in the controller 1430 may process video data having resolution of UHD and the current bandwidth which is measured is sufficient to receive a stream segment having resolution of UHD, the controller 1430 may request the server of a stream segment of a bitrate corresponding to resolution of UHD.

In accordance with the embodiment, if another media service is executed in a background of the multimedia device in addition to playback of the first content and the video decoder included in the controller 1430 has a capacity capable of processing video data having resolution of maximum HD using the currently remaining resource, the controller 1430 may request the server of the first stream segment having resolution of FHD and recover a resource assigned to the media service executed in the background. The controller 1430 may assign the recovered resource in processing the received first stream segment having resolution of FHD.

The controller 1430 may store the first stream segment in a refresh buffer and measure a current bandwidth before playback of the first stream segment starts or in the course of playing back the first stream segment. If the current bandwidth which is measured is sufficient to receive a stream segment having resolution of FHD, the controller 1430 may control the reception unit 1410 to request the server of a second stream segment having resolution of FHD and receive the requested second stream segment from the server. The controller 1430 may process the video data included in the received second stream segment and output the processed video data to the display unit 1420. On the other hand, if the current bandwidth which is measured is not sufficient to receive a stream segment having resolution of FHD, the controller 1430 may control the reception unit 1410 to request the server of a second stream segment having resolution lower than that of FHD on the basis of the meta data and receive the requested second stream segment from the server.

Figure 18:
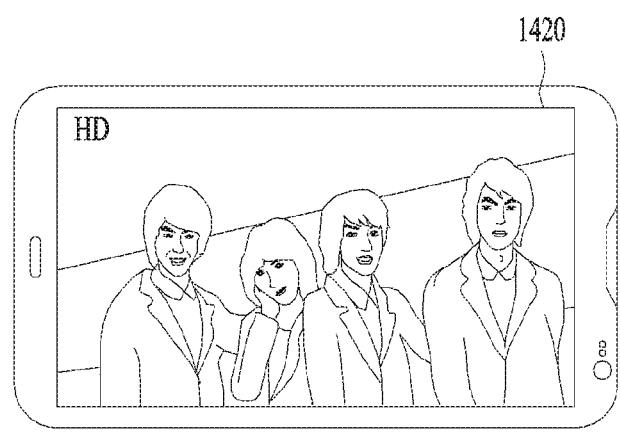
FIG. 18 is a diagram illustrating still another example of a method for displaying a content by receiving the content in an adaptive bitrate streaming mode in a multimedia device according to one embodiment of the present invention.

FIG. 18 is a diagram illustrating still another example of a method for displaying a content by receiving the content in an adaptive bitrate streaming mode in a multimedia device according to one embodiment of the present invention. It is assumed that the multimedia device according to one embodiment of the present invention, which is shown in FIG. 18, is a mobile terminal that includes the display unit 1420 having a screen size of a predetermined level or less. Also, it is assumed that a user selects playback of a first content in this embodiment.

The controller 1430 of the multimedia device may receive meta data, which includes information on stream segments of several bitrates, which constitute the first content, from the server.

The controller 1430 controls the reception unit 1410 to request the server of a stream segment of an appropriate bitrate on the basis of the meta data and receive the requested stream segment from the server, in consideration of at least one of a screen size of the display unit 1420 and a current bandwidth. The controller 1430 may consider a currently available resource in determining the appropriate bitrate.

For example, if a video decoder included in the controller 1430 may process video data having resolution of HD but cannot process video data having resolution of FHD and a current bandwidth which is measured is sufficient to receive a stream segment having resolution of HD, the controller 1430 may control the reception unit 1410 to request the server of the first stream segment having resolution of HD and receive the requested first stream segment from the server. Alternatively, even though a video decoder included in the controller 1430 may process video data having resolution of FHD or UHD and a current bandwidth which is measured is sufficient to receive a stream segment having resolution of FHD or UHD, if a screen size of the display unit 1420 is smaller than a predetermined size, the controller 1430 may request the server of the first stream segment having resolution of HD. If the screen size of the display unit 1420 is smaller than a predetermined size, since it is difficult for a user to identify a difference between resolution of HD and resolution of FHD/UHD by the naked eye, priority is given to efficient usage of the resource. If the video decoder included in the controller 1430 may process video data having resolution of FHD or UHD and the current bandwidth which is measured is sufficient to receive a stream segment having resolution of FHD or UHD, the controller 1430 may request the server of a stream segment of a bitrate corresponding to resolution of FHD or UHD.

In accordance with the embodiment, if another media service is executed in a background of the multimedia device in addition to playback of the first content and the video decoder included in the controller 1430 has a capacity capable of processing video data having resolution of maximum SD using the currently remaining resource, the controller 1430 may request the server of the first stream segment having resolution of HD and recover a resource assigned to the media service executed in the background. The controller 1430 may assign the recovered resource in processing the received first stream segment having resolution of HD.

The controller 1430 may store the first stream segment in a refresh buffer and measure a current bandwidth before playback of the first stream segment starts or in the course of playing back the first stream segment. If the current bandwidth which is measured is sufficient to receive a stream segment having resolution of HD, the controller 1430 may control the reception unit 1410 to request the server of a second stream segment having resolution of HD and receive the requested second stream segment from the server. The controller 1430 may process the video data included in the received second stream segment and output the processed video data to the display unit 1420. On the other hand, if the current bandwidth which is measured is not sufficient to receive a stream segment having resolution of HD, the controller 1430 may control the reception unit 1410 to request the server of a second stream segment having resolution lower than that of HD on the basis of the meta data and receive the requested second stream segment from the server.

Hereinafter, examples corresponding to a case that a size of a screen for outputting the first content is changed while the first content is being displayed in the multimedia device according to one embodiment of the present invention will be described in detail with reference to FIGS. 19 to 27.

FIG. 19 is a diagram illustrating an example of a method for displaying a content by receiving the content in an adaptive bitrate streaming mode in a multimedia device according to one embodiment of the present invention.

Referring to (a) of FIG. 19, the controller 1430 of the multimedia device may receive meta data, which includes information on stream segments of several bitrates, which constitute the first content, from the server. The controller 1430 controls the reception unit 1410 to request the server of a stream segment of a first bitrate on the basis of the meta data and receive the requested stream segment from the server, in consideration of at least one of a screen size of the display unit 1420 and a current bandwidth. The controller 1430 may consider a currently available resource in determining the first bitrate. The controller 1430 may display video data included in the received stream segment of the first bitrate on the display unit 1420. Since (a) of FIG. 19 is similar to the description made with reference to FIGS. 16 to 18, its detailed description will be omitted.

The controller 1430 detects a size change of a screen on which the video data is displayed. Referring to (b) of FIG. 19, the size change of the screen may mean that the screen of the display unit is virtually split from a full screen to a first area 1910 and a second area 1920.

If screen split of the display unit 1420 is detected, the controller 1430 may detect whether video data corresponding to the first content is output through which one of the first area 1910 and the second area 1920. If the user selects screen split of the display unit 1420, the user may select whether to view the first content through which one of the first area 1910 and the second area 1920. Alternatively, as the case may be, if the user selects screen split of the display unit 1420, the first content may continue to be output through a previously set one of the first area 1910 and the second area 1920. In this embodiment, it is assumed that the first content continues to be output through the first area 1910 if the screen of the display unit 1420 is split.

If the video data corresponding to the first content is output through the first area 1910, the controller 1430 may control the reception unit 1410 to request the server of a stream segment of a second bitrate on the basis of the size of the first area. At this time, the controller 1430 may detect whether another media service is executed or needs to be executed in the multimedia device in addition to playback of the first content. In this embodiment, it is assumed that an execution screen of a web browser is output to the second area 1920 as the screen of the display unit 1420 is split.

In accordance with the embodiment, the expression that the controller 1430 determines a bitrate, which will be received, on the basis of the size of the first area 1910 may mean that the controller 1430 determines the bitrate, which will be received, by detecting a total number of areas into which the display unit is split, without meaning that the physical size of the first area 1910 is measured.

The controller 1430 may control the reception unit 1410 to request the server of a stream segment of a second bitrate different from the first bitrate on the basis of the meta data and receive the requested stream segment of the second bitrate from the server, in consideration of at least one of the size of the first area 1910, a current bandwidth and the number of media services to be executed at the same time. In the meantime, the controller 1430 may output video data corresponding to the steam segment of the first bitrate, which is previously received and processed, to the first area 1910.

The second bitrate may be smaller than the first bitrate. If the size of the screen on which the video data is displayed is decreased due to screen split of the display unit 1420, since there is little difference in resolution sensed by the naked eye of a user even though a content of lower picture quality is provided to the user, and another media service should be executed in the second area 1920 in addition to playback of the first content in the multimedia device, it is required to obtain a resource required for execution of another media service.

If a transmission rate based on the current bandwidth is lower than the second bitrate, the controller 1430 may request the server of a stream segment of a third bitrate lower than the second bitrate.

Since the bitrate of the received stream segment has been changed, the controller 1430 may adjust a range of the resource assigned for processing of the first content. The controller 1430 may recover some of the resource assigned for processing of the first content and assign the recovered resource to an operation for processing the execution screen of the web browser and outputting the processed screen to the second area 1920.

In accordance with the embodiment, if a command for playing back another second content by splitting the screen of the display unit 1420 into three or more is detected, the controller 1430 may control the reception unit 1410 to receive the stream segment of the third bitrate lower than the second bitrate from the server in consideration of at least one of the current bandwidth and the number of media services to be executed at the same time.

Figure 20:
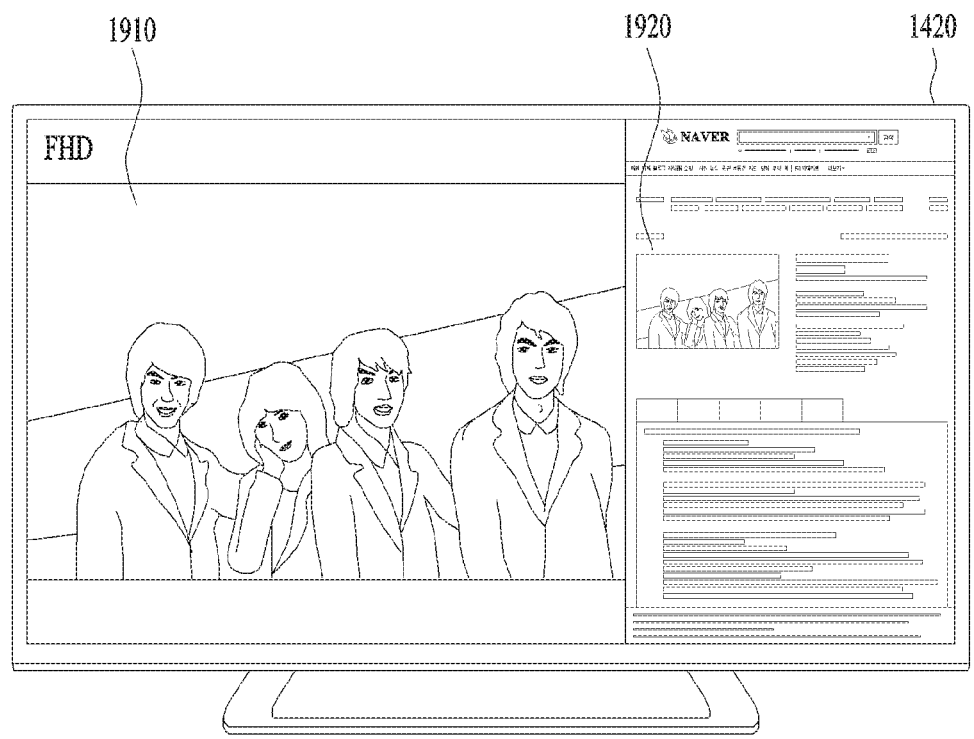
FIG. 20 is a diagram illustrating another example of a method for displaying a content by receiving the content in an adaptive bitrate streaming mode in a multimedia device according to one embodiment of the present invention.

FIG. 20 is a diagram illustrating another example of a method for displaying a content by receiving the content in an adaptive bitrate streaming mode in a multimedia device according to one embodiment of the present invention. FIG. 20 illustrates another example of the screen shown in (b) of FIG. 19, and repeated description of FIG. 19 will be omitted. Hereinafter, description of FIG. 20 will be given based on a difference from FIG. 19.

When outputting the execution screen of the web browser to the second area 1920 of the display unit 1420, the controller 1430 may automatically search for the first content or a content related to the first content from the web browser and output the searched result to the second area 1920, on the basis of the meta data of the first content. This is because that user who intends to execute the web browser by splitting the screen of the display unit 1420 in the course of viewing the first content desires to search for the first content on the web browser. According to this embodiment, user convenience is emphasized.

FIG. 21 is a diagram illustrating still another example of a method for displaying a content by receiving the content in an adaptive bitrate streaming mode in a multimedia device according to one embodiment of the present invention.

Referring to (a) of FIG. 21, the controller 1430 of the multimedia device may receive meta data, which includes information on stream segments of several bitrates, which constitute the first content, from the server. The controller 1430 controls the reception unit 1410 to request the server of a stream segment of a first bitrate on the basis of the meta data and receive the requested stream segment from the server, in consideration of at least one of a screen size of the display unit 1420 and a current bandwidth. The controller 1430 may consider a currently available resource in determining the first bitrate. The controller 1430 may display video data included in the received stream segment of the first bitrate on the display unit 1420. Since (a) of FIG. 21 is similar to the description made with reference to FIGS. 16 to 18, its detailed description will be omitted.

The controller 1430 detects a size change of a screen on which the video data is displayed. Referring to (b) of FIG. 21, the size change of the screen may mean that the screen of the display unit 1420 is virtually split from a full screen to a first area 2110 and a second area 2120.

If screen split of the display unit 1420 is detected, the controller 1430 may detect whether video data corresponding to the first content is output through which one of the first area 2110 and the second area 2120. If the user selects screen split of the display unit 1420, the user may select whether to view the first content through which one of the first area 2110 and the second area 2120. Alternatively, as the case may be, if the user selects screen split of the display unit 1420, the first content may continue to be output through a previously set one of the first area 2110 and the second area 2120. In this embodiment, it is assumed that the first content continues to be output through the first area 2110 if the screen of the display unit 1420 is split.

If the video data corresponding to the first content is output through the first area 2110, the controller 1430 may control the reception unit 1410 to request the server of a stream segment of a second bitrate on the basis of the size of the first area 2110. At this time, the controller 1430 may detect whether another media service is executed or needs to be executed in the multimedia device in addition to playback of the first content. In this embodiment, it is assumed that a second content is displayed on the second area 2120 as the screen of the display unit 1420 is split. The second content may be a content received from an external server through a network, or may be a content corresponding to a broadcast program received from a broadcasting station through a tuner.

In accordance with the embodiment, the expression that the controller 1430 determines a bitrate, which will be received, on the basis of the size of the first area 2110 may mean that the controller 1430 determines the bitrate, which will be received, by detecting a total number of areas into which the display unit is split, without meaning that the physical size of the first area 2110 is measured.

The controller 1430 may control the reception unit 1410 to request the server of a stream segment of a second bitrate different from the first bitrate on the basis of the meta data and receive the requested stream segment of the second bitrate from the server, in consideration of at least one of the size of the first area 2110, a current bandwidth and the number of media services to be executed at the same time. In the meantime, the controller 1430 may output video data corresponding to the steam segment of the first bitrate, which is previously received and processed, to the first area 2110.

The second bitrate may be smaller than the first bitrate. If the size of the screen on which the video data is displayed is decreased due to screen split of the display unit 1420, since there is little difference in resolution sensed by the naked eye of a user even though a content of lower picture quality is provided to the user, and another media service should be executed in the second area 2120 in addition to playback of the first content in the multimedia device, it is required to obtain a resource required for execution of another media service.

If a transmission rate based on the current bandwidth is lower than the second bitrate, the controller 1430 may request the server of a stream segment of a third bitrate lower than the second bitrate.

Since the bitrate of the received stream segment has been changed, the controller 1430 may adjust a range of the resource assigned for processing of the first content. The controller 1430 may recover some of the resource assigned for processing of the first content and assign the recovered resource to an operation for processing the video data of the second content and outputting the processed data to the second area 2120. The video data displayed through the first area 2110 and the video data displayed through the second area 2120 may have the same resolution as each other or may be located within a predetermined range.

For example, if the second content may be received through the network in an adaptive bitrate streaming mode, the controller 1430 may receive meta data related to the second content, and may receive a stream segment of a fourth bitrate related to the second content from the server in consideration of at least one of the size of the second area 2120, the current bandwidth and the number of media services to be executed at the same time. The controller 1430 may display the received stream segment of the fourth bitrate on the second area 2120 of the display unit 1420 by processing the received stream segment of the fourth bitrate. Each of the second bitrate and the fourth bitrate may be smaller than the first bitrate. In accordance with the embodiment, the second bitrate and the fourth bitrate may be the same as or different from each other.

In accordance with the embodiment, if a command for playing back another second content by splitting the screen of the display unit 1420 into three or more is detected, the controller 1430 may control the reception unit 1410 to receive a stream segment of a fifth bitrate lower than the second bitrate from the server with respect to the first content in consideration of at least one of the current bandwidth and the number of media services to be executed at the same time. Likewise, the controller 1430 may control the reception unit 1410 to receive a stream segment of a sixth bitrate lower than the fourth bitrate from the server with respect to the second content.

Although it has been described in FIGS. 19 to 21 on the assumption that the screen of the display unit 1420 is split into two areas, the screen of the display unit 1420 may be split from a full screen into three or more areas, or the screen of the display unit 1420 may be split into three or more areas in a state that the screen of the display unit 1420 is split into two areas.

Figure 22:
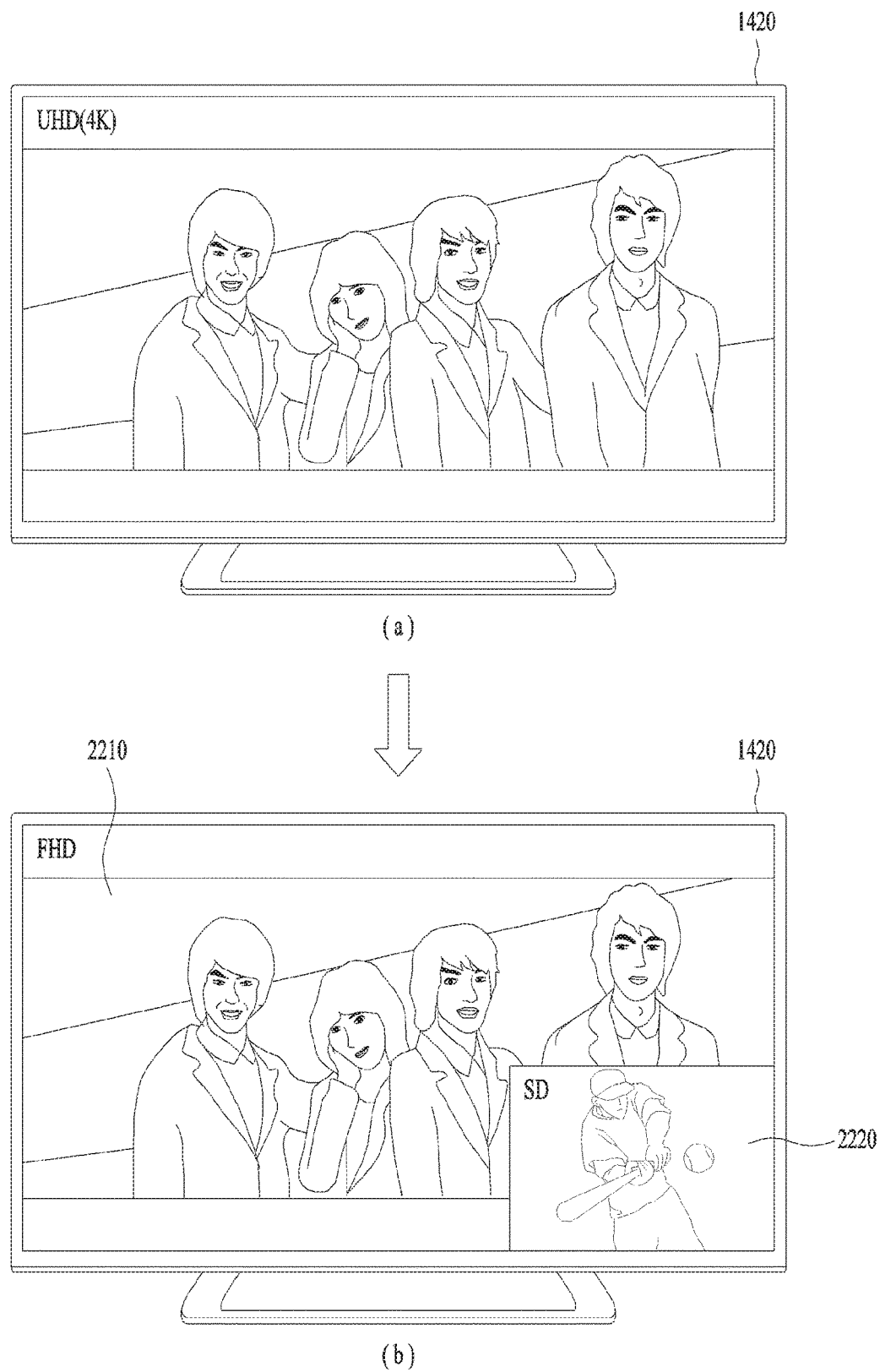
FIG. 22 is a diagram illustrating further still another example of a method for displaying a content by receiving the content in an adaptive bitrate streaming mode in a multimedia device according to one embodiment of the present invention.

FIG. 22 is a diagram illustrating further still another example of a method for displaying a content by receiving the content in an adaptive bitrate streaming mode in a multimedia device according to one embodiment of the present invention.

Referring to (a) of FIG. 22, the controller 1430 of the multimedia device may receive meta data, which includes information on stream segments of several bitrates, which constitute the first content, from the server. The controller 1430 controls the reception unit 1410 to request the server of a stream segment of a first bitrate on the basis of the meta data and receive the requested stream segment from the server, in consideration of at least one of a screen size of the display unit 1420 and a current bandwidth. The controller 1430 may consider a currently available resource in determining the first bitrate. The controller 1430 may display video data included in the received stream segment of the first bitrate on the display unit 1420. Since (a) of FIG. 22 is similar to the description made with reference to FIGS. 16 to 18, its detailed description will be omitted.

The controller 1430 detects a size change of a screen on which the video data is displayed. Referring to (b) of FIG. 22, the size change of the screen may mean that the screen of the display unit 1420 is split into a main area 2210 and a sub area 2220 in accordance with a PIP (Picture in Picture) function. For example, the PIP function may be executed automatically by execution of another function that may be implemented by the multimedia device.

If screen split of the display unit 1420 is detected, the controller 1430 may detect whether video data corresponding to the first content is output through which one of the main area 2210 and the sub area 2220. If the user selects execution of the PIP function, the user may select whether to view the first content through which one of the main area 2210 and the sub area 2220. Alternatively, as the case may be, if the screen of the display unit 1420 is split, the first content may continue to be output through a previously set one of the main area 2210 and the sub area 2220. In this embodiment, it is assumed that the first content continues to be output through the main area 2210 if the screen of the display unit 1420 is split.

As the PIP function is executed, the controller 1430 may control the reception unit 1410 to request the server of a stream segment of a second bitrate based on that the first content is output through which one of the main area 2210 and the sub area 2220. In this case, the controller 1430 may consider the number of the sub areas 2220 and a size of each sub area 2220 in determining the second bitrate. Also, the controller 1430 may detect whether another media service is executed or needs to be executed in the multimedia device in addition to playback of the first content. In this embodiment, it is assumed that a second content is displayed on the sub area 2220 as the screen of the display unit 1420 is split. The second content may be a content received from an external server through a network, or may be a content corresponding to a broadcast program received from a broadcasting station through a tuner.

The second bitrate may be smaller than the first bitrate. This is because that another media service should be executed in the sub area 2220 in addition to playback of the first content in accordance with screen split of the display unit 1420 and thus it is required to obtain a resource required for execution of another media service.

If a transmission rate based on the current bandwidth is lower than the second bitrate, the controller 1430 may request the server of a stream segment of a third bitrate lower than the second bitrate.

Since the bitrate of the received stream segment has been changed, the controller 1430 may adjust a range of the resource assigned for processing of the first content. The controller 1430 may recover some of the resource assigned for processing of the first content and assign the recovered resource to an operation for processing the video data of the second content and outputting the processed data to the sub area 2220. The video data displayed through the main area 2210 may have resolution higher than that of the video data displayed through the sub area 2220.

For example, if the second content may be received through the network in an adaptive bitrate streaming mode, the controller 1430 may receive meta data related to the second content, and may receive a stream segment of a fourth bitrate related to the second content from the server in consideration of at least one of the size of the sub area 2220, the current bandwidth and the number of media services to be executed at the same time. The controller 1430 may display the received stream segment of the fourth bitrate on the sub area 2220 of the display unit 1420 by processing the received stream segment of the fourth bitrate. Each of the second bitrate and the fourth bitrate may be smaller than the first bitrate, and the second bitrate may be greater than the fourth rate.

Although it has been described in FIG. 22 that size change of the screen on which the video data is displayed is performed in accordance with execution of the PIP function, the embodiment of FIG. 22 may similarly be applied to even the case that the video data corresponding to the second content are overlapped as a small screen on the video data corresponding to the first content while the user is viewing the first content as shown in (a) of FIG. 22.

FIG. 23 is a diagram illustrating further still another example of a method for displaying a content by receiving the content in an adaptive bitrate streaming mode in a multimedia device according to one embodiment of the present invention. FIG. 23 illustrates another example of the screen shown in (b) of FIG. 22, and repeated description of FIG. 22 will be omitted. Hereinafter, description of FIG. 23 will be given based on a difference from FIG. 22.

In this embodiment, as the PIP function is executed, the first content may be output through the sub area 2220 and a new second content may be output through the main area 2210. The controller 1430 may control the reception unit 1410 to request the server of a stream segment of a fifth bitrate based on meta data received with respect to the first content in consideration of a size of the sub area 2220 and the current bandwidth and considering whether another media service is executed or needs to be executed in the multimedia device in addition to playback of the first content. The controller 1430 may control the reception unit 1410 to request the server of a stream segment of a sixth bitrate based on meta data received with respect to the second content in consideration of the number of the sub areas 2220 and a size of each sub area 2220. In this case, each of the fifth bitrate and the sixth bitrate may be lower than the first bitrate, and the fifth bitrate may be lower than the sixth bitrate.

Although it has been described in FIGS. 22 and 23 on the assumption that one sub area 2220 is provided, two or more sub areas 2220 may be provided, or the number of sub areas in FIG. 22 may be different from the number of sub areas in FIG. 23. If the number of the sub areas 2220 is increased, the controller 1430 may request the server of a stream segment of bitrate corresponding to lower resolution among the stream segments of several bitrates, which constitute the first content.

FIG. 24 is a diagram illustrating an example of a method for displaying a content by receiving the content in an adaptive bitrate streaming mode in a multimedia device according to one embodiment of the present invention.

Referring to (a) FIG. 24, the controller 1430 may display a first screen 2410 related to a first media service on the display unit 1420. For example, the first screen 2410 related to the first media service may be an execution screen of a web browser. The controller 1430 may control the display unit 1420 to overlay a second screen 2420 related to a second media service on the first screen 2410. For example, the second screen 2420 related to the second media service may be a screen for outputting the video data related to the first content. In accordance with the embodiment, the screen shown in (a) of FIG. 24 may be a screen that playback of the first content is selected in a state that the web browser is executed, or may be a screen that the web browser is executed while the first content is being played back. In this embodiment, it is assumed that the first screen 2410 is output to a full screen of the display unit 1420 and the second screen 2420 is overlaid on the first screen 2410 as a partial area of the display unit 1420.

The controller 1430 may receive meta data, which includes information on stream segments of several bitrates, which constitute the first content, from the server, if playback of the first content is selected.

The controller 1430 controls the reception unit 1410 to request the server of a stream segment of a first bitrate on the basis of the meta data and receive the requested stream segment from the server, in consideration of at least one of a size of the second screen 2420, a current bandwidth and a currently available resource. For example, the currently available resource may mean a capacity excluding a resource assigned for processing and output of the first screen 1410 from among capacities of the available resource in the multimedia device. If playback of the first content is selected and a stream segment is first requested to the server, the controller 1430 may receive a stream segment of the lowest bitrate from the server and then request the server of the stream segment of the first bitrate in consideration of at least one of the size of the second screen 2420, the current bandwidth and the currently available resource. For example, the first bitrate may correspond to resolution of HD.

In accordance with the embodiment, even though the currently available resource may process video data having resolution of FHD and the current bandwidth is sufficient to receive a stream segment having resolution of FHD, if the size of second screen 2420 is smaller than a predetermined size, the controller 1430 may request the server of a stream segment of resolution lower than that of FHD to efficiently use the resource.

The controller 1430 detects a size change of the second screen 2420 on which the video data related to the first content is displayed. Referring to (b) of FIG. 24, the size change of the second screen 2420 may mean that the size of the second screen 2420 is increased in a state that the second screen 2420 is overlaid on the first screen 2410.

The controller 1430 may control the reception unit 1410 to request the server of a stream segment of a second bitrate on the basis of the meta data in consideration of at least one of the increased size of the second screen 2420, the current bandwidth and the currently available resource. If the size of the second screen 2420 is increased, since a content of higher picture quality should be provided to a user, the controller may control the reception unit 1410 to request the server of the stream segment of the second bitrate greater than the first bitrate in consideration of the remaining resource. The controller 1430 may output video data corresponding to the steam segment of the first bitrate, which is previously received and processed, to the increased second screen 2420 for a predetermined time after the size of the second screen 2420 is increased. The controller 1430 may receive the stream segment of the second bitrate and output the received stream segment of the second bitrate to the increased second screen 2420 by processing the received stream segment.

In accordance with the embodiment, if the second screen 2420 becomes a full screen of the display unit 1420 by the size change of the second screen on which the video data related to the first content is displayed, the controller 1430 may recover the resource assigned for processing and output of the first screen 2410 and assign the recovered resource for processing and output of the video data displayed through the second screen 2420 which is the full screen. In this case, the controller 1430 may request the server of a stream segment of a third bitrate greater than the second bitrate.

Figure 25:
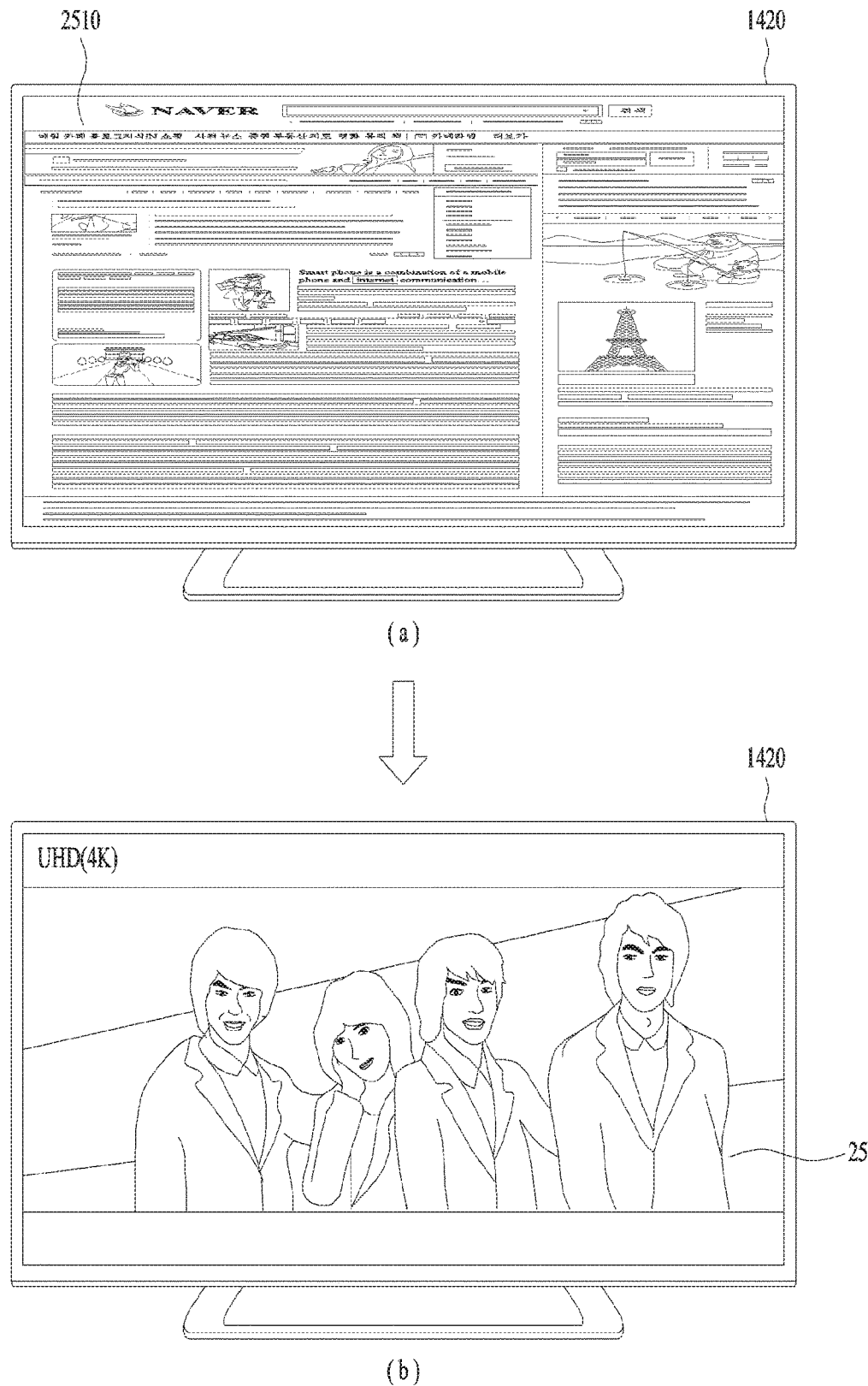
FIG. 25 is a diagram illustrating another example of a method for displaying a content by receiving the content in an adaptive bitrate streaming mode in a multimedia device according to one embodiment of the present invention.

FIG. 25 is a diagram illustrating another example of a method for displaying a content by receiving the content in an adaptive bitrate streaming mode in a multimedia device according to one embodiment of the present invention.

Referring to (a) FIG. 25, the controller 1430 may display a first screen 2510 related to a first media service on the display unit 1420. For example, the first screen 2410 related to the first media service may be an execution screen of a web browser. The first screen 2510 may be displayed as a full screen of the display unit 1420.

Afterwards, the controller 1430 may detect a command for selecting execution of a second media service (e.g., playback of the first content) and display a second screen 2520 for outputting video data related to the first content on the display unit 1420 as shown in (b) of FIG. 25. The second screen 2520 may be displayed as a full screen of the display unit 1420. A user may select playback of the first content after ending execution of the web browser, or may select playback of the first content in a state that web browser is executed.

The controller 1430 may receive meta data, which includes information on stream segments of several bitrates, which constitute the first content, from the server, if playback of the first content is selected.

The controller 1430 controls the reception unit 1410 to request the server of a stream segment of a first bitrate on the basis of the meta data and receive the requested stream segment from the server, in consideration of at least one of a screen size of the display unit 1420 (size of second screen 2520 which is a full screen), a current bandwidth and a currently available resource. If playback of the first content is selected and a stream segment is first requested to the server, the controller 1430 may receive a stream segment of the lowest bitrate from the server and then request the server of the stream segment of the first bitrate in consideration of at least one of the size of the second screen 2520, the current bandwidth and the currently available resource.

For example, if the user selects playback of the first content after ending execution of the web browser, the controller 1430 may recover the resource assigned for execution of the web browser and then determine the first bitrate in consideration of the available resource.

For another example, if the user selects playback of the first content in a state that the web browser is executed, the controller 1430 may determine the first bitrate in consideration of a resource excluding the resource assigned for execution of the web browser from among capacities of the available resource in the multimedia device. The controller 1430 may determine the first bitrate in consideration of the available resource by forcibly ending execution of the web browser operated in a background due to playback of the first content and recovering the resource assigned for execution of the web browser.

FIG. 26 is a diagram illustrating still another example of a method for displaying a content by receiving the content in an adaptive bitrate streaming mode in a multimedia device according to one embodiment of the present invention.

Referring to (a) of FIG. 26, the controller 1430 may virtually split the screen of the display unit 1420 into at least a first area 2610 and a second area 2620, output a first screen related to a first media service to the first area 2610 and output a second screen related to a second media service to the second area 2620. In this embodiment, it is assumed that the first screen related to the first media service may be an output screen of video data related to the first content, the second screen related to the second media service may be an output screen of video data related to the second content, and each of the first content and the second content may be received in an adaptive bitrate streaming mode.

The controller 1430 may receive meta data, which includes information on stream segments of several bitrates, which constitute the first content, from the server, if playback of the first content is selected.

The controller 1430 controls the reception unit 1410 to request the server of a stream segment of a first bitrate on the basis of the meta data related to the first content and receive the requested stream segment from the server, in consideration of at least one of a size of the first area 2610, a current bandwidth and a currently available resource. For example, the currently available resource may mean a capacity excluding a resource assigned for processing of the second content from among capacities of the available resource in the multimedia device. The controller 1430 may process the stream segment of the first bitrate by using the resource assigned for processing of the first content and display video data corresponding to the processed stream segment of the first bitrate on the first area 2610.

Meanwhile, the controller 1430 may receive meta data related to the second content from the server if playback of the second content is selected.

The controller 1430 may control the reception unit 1410 to request the server of a stream segment of a second bitrate on the basis of the meta data related to the second content and receive the requested stream segment from the server, in consideration of at least one of a size of the second area 2620, a current bandwidth and a currently available resource. For example, the currently available resource may mean a capacity excluding a resource assigned for processing of the first content from among capacities of the available resource in the multimedia device. The controller 1430 may process the stream segment of the second bitrate by using the resource assigned for processing of the second content and display video data corresponding to the processed stream segment of the second bitrate on the second area 2620.

The first bitrate and the second bitrate may be the same as or different from each other. For example, if the size of the first area 2610 is greater than that of the second area 2620, the first bitrate may be greater than the second bitrate.

The controller 1430 detects a size change of the screen (e.g., the first area 2610) on which the video data related to the first content is displayed. Referring to (b) of FIG. 26, the size change of the screen on which the video data related to the first content is displayed may mean that the display unit 1420 is changed to a full screen in a state that the display unit 1420 is split into at least the first area 2610 and the second area 2620. In this embodiment, it is assumed that the video data related to the first content is displayed on the display unit 1420 as a full screen as the display unit 1420 is changed to a full screen in a state that the display unit 1420 is split into at least the first area 2610 and the second area 2620.

The controller 1430 may control the reception unit 1410 to request the server of a stream segment of a third bitrate on the basis of the meta data related to the first content in consideration of at least one of the screen size of the display unit 1420, the current bandwidth and the currently available resource. At this time, the controller 1430 may recover the resource assigned for processing of the second content and determine the third bitrate in consideration of the recovered resource. The third bitrate may be greater than the first bitrate and the second bitrate. The controller 1430 may output the video data corresponding to the steam segment of the first bitrate, which is previously received and processed, to the display unit 1420 as a full screen for a predetermined time after the size change of the screen of the display unit 1420 is detected. The controller 1430 may receive the stream segment of the third bitrate and output the received stream segment of the third bitrate to the display unit 1420 as a full screen by processing the received stream segment.

Figure 27:
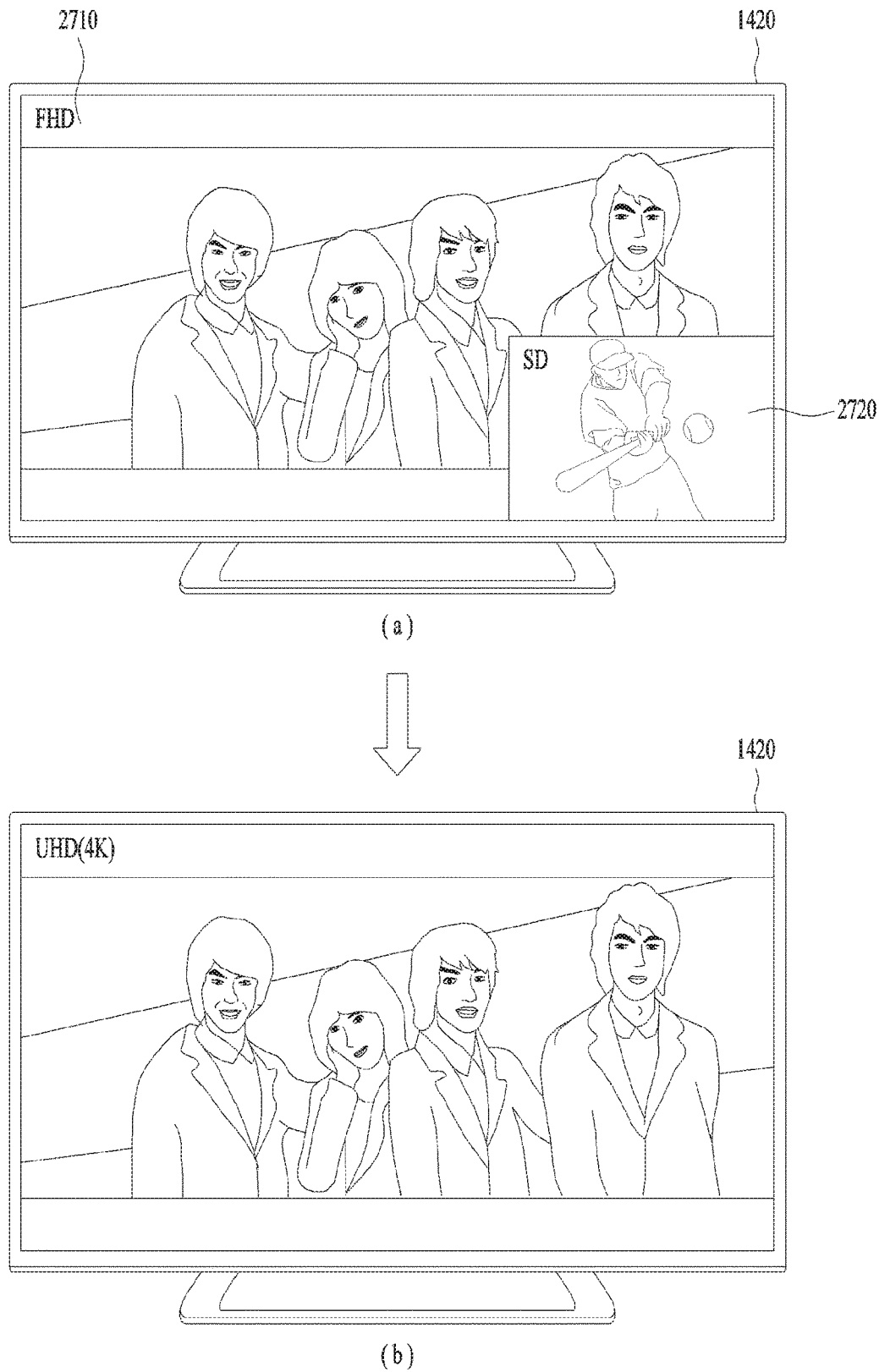
FIG. 27 is a diagram illustrating further still another example of a method for displaying a content by receiving the content in an adaptive bitrate streaming mode in a multimedia device according to one embodiment of the present invention.

FIG. 27 is a diagram illustrating further still another example of a method for displaying a content by receiving the content in an adaptive bitrate streaming mode in a multimedia device according to one embodiment of the present invention.

Referring to (a) of FIG. 27, as a PIP function is executed, the controller 1430 may split the screen of the display unit 1420 into at least a main area 2710 and a sub area 2720, output a first screen related to a first media service to the main area 2710 and output a second screen related to a second media service to the sub area 2720. In this embodiment, it is assumed that the first screen related to the first media service may be an output screen of video data related to the first content, the second screen related to the second media service may be an output screen of video data related to the second content, and each of the first content and the second content may be received in an adaptive bitrate streaming mode.

The controller 1430 may receive meta data related to the first content from the server, if playback of the first content is selected.

The controller 1430 may control the reception unit 1410 to request the server of a stream segment of a first bitrate on the basis of the meta data related to the first content and receive the requested stream segment from the server, in consideration of at least one of the number of sub areas 2720, a size of each sub area 2720, a current bandwidth and a currently available resource. For example, the currently available resource may mean a capacity excluding a resource assigned for processing of the second content from among capacities of the available resource in the multimedia device. The controller 1430 may process the stream segment of the first bitrate by using the resource assigned for processing of the first content and display video data corresponding to the processed stream segment of the first bitrate on the main area 2710.

Meanwhile, the controller 1430 may receive meta data related to the second content from the server if playback of the second content is selected.

The controller 1430 may control the reception unit 1410 to request the server of a stream segment of a second bitrate on the basis of the meta data related to the second content and receive the requested stream segment from the server, in consideration of at least one of the number of sub areas 2720, the size of each sub area 2720, the current bandwidth and the currently available resource. For example, the currently available resource may mean a capacity excluding a resource assigned for processing of the first content from among capacities of the available resource in the multimedia device. The controller 1430 may process the stream segment of the second bitrate by using the resource assigned for processing of the second content and display video data corresponding to the processed stream segment of the second bitrate on the sub area 2720.

The first bitrate may be greater than the second bitrate.

The controller 1430 detects a size change of the screen on which the video data related to the first content is displayed. Referring to (b) of FIG. 27, the size change of the screen on which the video data related to the first content is displayed may mean that the display unit 1420 is changed to a full screen in a state that the display unit 1420 is split into at least the main area 2710 and the sub area 2720. In this embodiment, it is assumed that the video data related to the first content is displayed on the display unit 1420 as a full screen as the display unit 1420 is changed to a full screen in a state that the display unit 1420 is split into at least the main area 2710 and the sub area 2720.

The controller 1430 may control the reception unit 1410 to request the server of a stream segment of a third bitrate on the basis of the meta data related to the first content in consideration of at least one of the screen size of the display unit 1420, the current bandwidth and the currently available resource. At this time, the controller 1430 may recover the resource assigned for processing of the second content and determine the third bitrate in consideration of the recovered resource. The third bitrate may be greater than the first bitrate and the second bitrate. The controller 1430 may output the video data corresponding to the steam segment of the first bitrate, which is previously received and processed, to the display unit 1420 as a full screen for a predetermined time after the size change of the screen of the display unit 1420 is detected. The controller 1430 may receive the stream segment of the third bitrate and output the received stream segment of the third bitrate to the display unit 1420 as a full screen by processing the received stream segment.

Although it has been described in FIG. 27 that the size change of the screen on which the video data is displayed is executed as the PIP function released, the embodiment of FIG. 27 may similarly be applied to even the case that playback of the second content is paused/ended while the video data corresponding to the second content is being displayed to be overlaid on the video data corresponding to the first content as a small screen.

Figure 28:
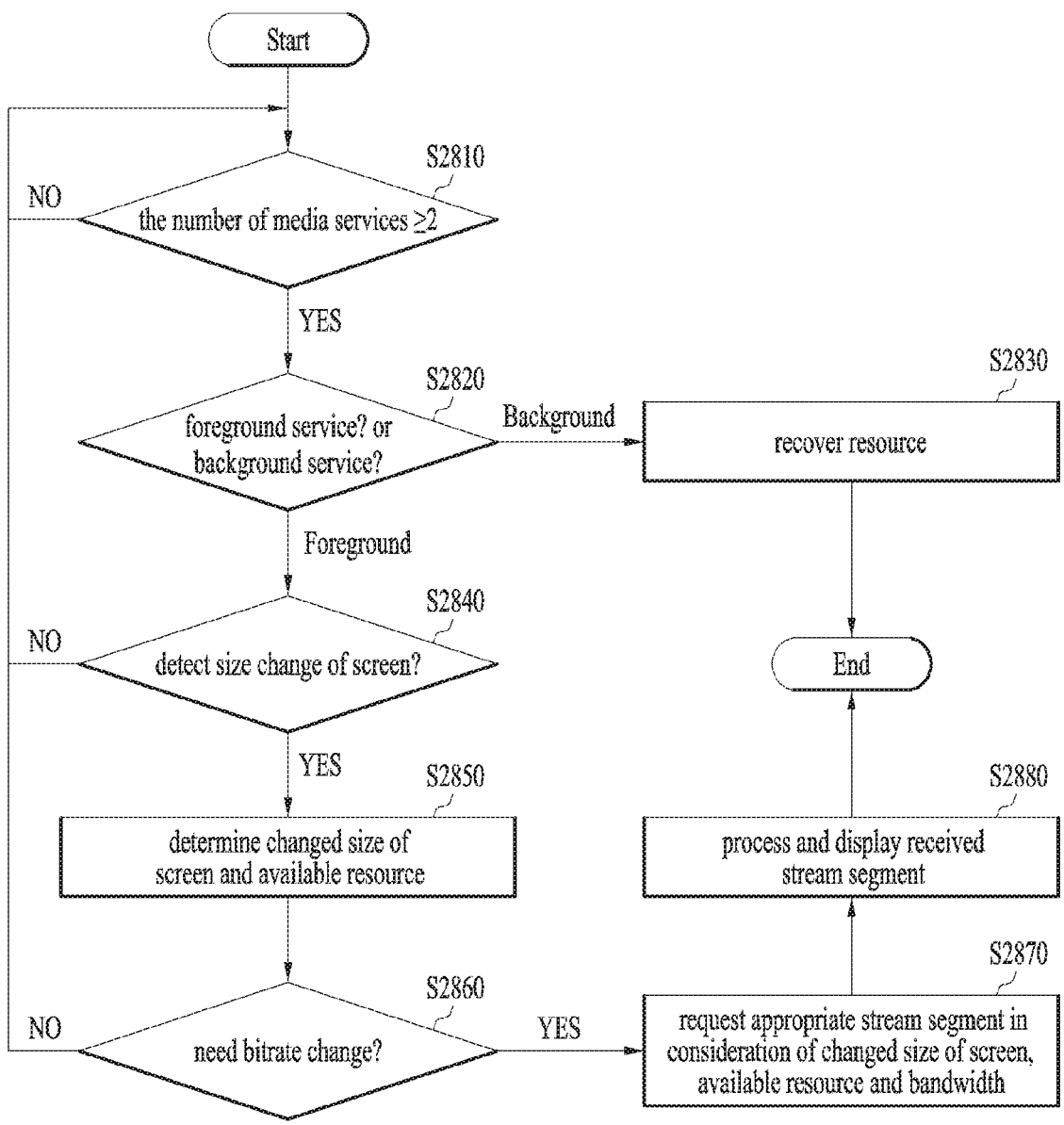
FIG. 28 is a flow chart illustrating another example of a method for displaying a content by receiving the content in an adaptive bitrate streaming mode in a multimedia device according to one embodiment of the present invention.

FIG. 28 is a flow chart illustrating another example of a method for displaying a content by receiving the content in an adaptive bitrate streaming mode in a multimedia device according to one embodiment of the present invention.

The controller 1430 of the multimedia device determines whether the number of media services currently executed is two or more (S2810). In this case, the media service includes a media service executed in a foreground like that an execution screen of the media service is output through the display unit 1420 and a media service executed in a background like that an execution screen of the media service is not output through the display unit 1420. The controller 1430 needs to assign a resource required for processing of the media service even in case of the media service executed in the background.

If the number of media services currently executed is two or more, the controller 1430 determines whether each media service is executed in the foreground or the background (S2820).

If the media service executed in the background exists in the media services currently executed, the controller 1430 may recover a resource assigned for processing of the media service executed in the background (S2830).

Meanwhile, if the media service executed in the foreground exists in the media services currently executed, the controller 1430 detects a size change of the screen related to the media service executed in the foreground (S2840).

The controller 1430 determines the changed size of the screen and an available resource (S2850). In this case, the available resource may include the resource recovered in step S2830. In accordance with the embodiment, the controller 1430 may further measure a current bandwidth. The controller 1430 may measure the current bandwidth on the basis of a size of data received through the reception unit 1410 just before the step S2850 is performed and time required to receive the data.

The controller 1430 determines whether to need to receive a stream segment of another bitrate different from a bitrate of a previously received stream segment when a stream segment related to the media service executed in the foreground is received from the server, on the basis of the determined result of the step S2850 (S2860). For example, the controller 1430 may determine to need to request the server of a stream segment of a bitrate greater than the bitrate of the previously received stream segment if the size of the screen is increased and the available resource is increased, whereas the controller 1430 may determine to need to request the server of a stream segment of a bitrate smaller than the bitrate of the previously received stream segment if the size of the screen is decreased and the available resource is decreased. At this time, the controller 1430 may use the measured current bandwidth in determining the bitrate.

If it is determined that it is required to receive a stream segment of another bitrate different from the bitrate of the previously received stream segment when a stream segment related to the media service executed in the foreground is received from the server, the controller 1430 may request the server of a stream segment of an appropriate bitrate in consideration of at least one of the changed size of the screen, the available resource and the bandwidth (S2870).

In accordance with the embodiment, if types of bitrates that may be received from the server are two or more in consideration of at least one of the changed size of the screen, the available resource and the bandwidth, the controller 1430 may output a guide message for allowing a user to list the types of the bitrates that may be received and select an appropriate bitrate.

The controller 1430 receives the stream segment of the requested bitrate from the server and displays the received stream segment on the display unit 1420 by processing the received stream segment (S2880).

FIG. 29 is a diagram illustrating an example of a method for displaying a content by receiving the content in an adaptive bitrate streaming mode in a multimedia device according to one embodiment of the present invention.

The controller 1430 of the multimedia device may receive meta data, which includes information on stream segments of several bitrates, which constitute the first content, from the server. The controller 1430 controls the reception unit 1410 to request the server of a stream segment of a first bitrate on the basis of the meta data and receive the requested stream segment from the server, in consideration of at least one of a screen size of the display unit 1420 and a current bandwidth. The controller 1430 may consider a currently available resource in determining the first bitrate. The controller 1430 may display video data included in the received stream segment of the first bitrate on the display unit 1420. In (a) of FIG. 22, it is assumed that the video data included in the stream segment of the first bitrate is output to a partial screen 2910 of the display unit 1420 and the first bitrate corresponds to resolution of UHD.

The controller 1430 detects a command for executing another media service in addition to execution of the first content. For example, the command for executing another media service may be a command for playing back a second content as shown in (b) of FIG. 29. In this specification, it is assumed that the user views the second content through another partial screen 2920.

If the command for playing back a second content is detected, the controller 1430 may control the reception unit 1410 to request the server of a stream segment of a second bitrate among the stream segments of several bitrates, which constitute the first content, and receive the requested stream segment from the server, on the basis of at least one of the number of media services currently executed and a current bandwidth. In the meantime, the controller 1430 may output video data corresponding to the stream segment of the first bitrate, which is previously received and processed, to the partial screen 2910. The second bitrate may be smaller than the first bitrate. For example, the second bitrate may correspond to resolution of FHD. The controller 1430 may process the stream segment of the second bitrate and output the processed stream segment to the partial screen 2910.

Also, the controller 1430 may control the reception unit 1410 to request the server of a stream segment of a third bitrate among the stream segments of several bitrates, which constitute the second content, and receive the requested stream segment from the server, on the basis of at least one of the number of media services currently executed and a current bandwidth. The third bitrate may be smaller than the first bitrate. For example, the third bitrate may correspond to resolution of FHD. The controller 1430 may process the stream segment of the third bitrate and output the processed stream segment to the partial screen 2910.

The user may change the size of the first partial screen 2910, change a size of a second partial screen 2920, end playback of at least one of the first content and the second content, select playback of another third content, or output at least one of the first content and the second content to a full screen of the display unit 1420, in the course of playing back the first content and the second content. Therefore, the controller 1430 may request the server of a stream segment of an appropriate bitrate on the basis of at least one of a screen size of the display unit 1420, the number of media services to be executed at the same time, and a current bandwidth.

Figure 30:
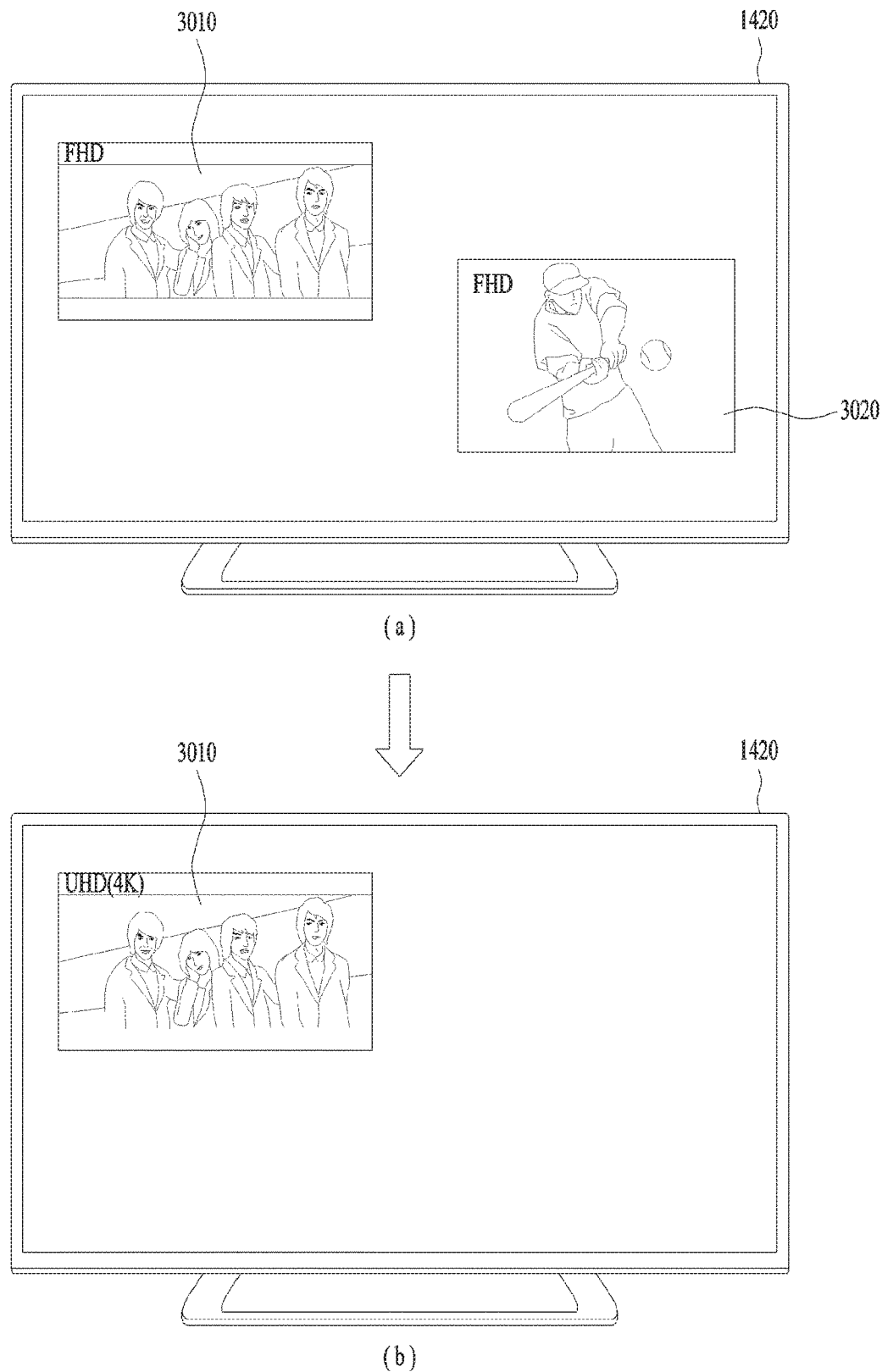
FIG. 30 is a diagram illustrating an example of a method for displaying a content by receiving the content in an adaptive bitrate streaming mode in a multimedia device according to one embodiment of the present invention.

FIG. 30 is a diagram illustrating another example of a method for displaying a content by receiving the content in an adaptive bitrate streaming mode in a multimedia device according to one embodiment of the present invention.

Referring to (a) of FIG. 30, the controller 1430 may output video data related to a first content to a first partial screen 3010 and output video data related to a second content to a second partial screen 3020. The controller 1430 may receive a stream segment of a first bitrate among stream segments of several bits, which constitute the first content, and output the video data included in the received stream segment of the first bitrate to the first partial screen 3010, on the basis of at least one of a size of the first partial screen 3010, the number of media services currently executed, and a current bandwidth. Also, the controller 1430 may receive a stream segment of a second bitrate among stream segments of several bits, which constitute the second content, and output the video data included in the received stream segment of the second bitrate to the second partial screen 3020, on the basis of at least one of a size of the second partial screen 3020, the number of media services currently executed, and a current bandwidth. For example, it is assumed that each of the first bitrate and the second bitrate corresponds to resolution of FHD.

Referring to (b) of FIG. 30, the controller 1430 may detect a command for ending playback of the second content.

If the command for ending playback of the second content is detected, the controller 1430 may control the reception unit 1410 to request the server of a stream segment of a third bitrate among the stream segments of several bitrates, which constitute the first content, and receive the requested stream segment from the server, on the basis of at least one of the number of media services currently executed and a current bandwidth. The controller 1430 may output the video data corresponding to the stream segment of the first bitrate, which is previously received and processed, to the first partial screen 3010. The third bitrate may be greater than the above bitrate. For example, the third bitrate may correspond to resolution of HHD. The controller 1430 may process the stream segment of the third bitrate and output the processed stream segment to the first partial screen 3010.

The user may change the size of the first partial screen 3010, select playback of another third content, or output the first content to a full screen of the display unit 1420, in the course of playing back the first content. Therefore, the controller 1430 may request the server of a stream segment of an appropriate bitrate on the basis of at least one of a screen size of the display unit 1420, the number of media services to be executed at the same time, and a current bandwidth. According to the aforementioned embodiments of the present invention, when a user desires to simultaneously use a plurality of media services by using a restrictive resource, a solution for processing the media services may be provided.

The above-described present invention may be implemented in a medium in which a program is recorded, as a code that can be read by a computer. Example of the medium that can be read by a computer include an HDD (hard disk drive), an SSD (solid state disk), an SDD (silicon disk drive), a ROM, a RAM, a CD-ROM, a magnetic tape, a floppy disk, and an optical data storage unit. Also, another example of the recording medium may be implemented in a type of carrier wave (for example, transmission through Internet). Also, the computer may include the controller 1430 of the mobile terminal. Thus, the above detailed description is to be considered in all respects as illustrative and not restrictive. The scope of the present invention should be determined by reasonable interpretation of the appended claims and all changes which come within the equivalent scope of the invention are included in the scope of the invention.

MODE FOR CARRYING OUT THE INVENTION

The mode for carrying out the invention has been sufficiently described in the above headline "best mode for carrying the invention", and those skilled in the art may implement other embodiments based on the mode within the scope of the present invention.

INDUSTRIAL APPLICABILITY

The present invention relates to a multimedia device and a control method therefor, and has industrial applicability.

The invention claimed is:

1. A control method for a multimedia device for receiving a first content in an adaptive bitrate streaming mode, the control method comprising the steps of:
   receiving a stream segment of a first bitrate among stream segments of several bits, which constitute the first content;
   displaying video data corresponding to the received stream segment of the first bitrate on a display unit;
   detecting a size change of a screen on which the video data is displayed;
   requesting a stream segment of a second bitrate, which is different from the first bitrate, on the basis of the detected size change of the screen, wherein the second bitrate is greater than the first bitrate when detecting that a size of the screen is increased;
   receiving the requested stream segment of the second bitrate;
   displaying video data corresponding to the received stream segment of the second bitrate on the display unit;
   splitting the screen of the display unit into a main area and a sub area in accordance with execution of a PIP function;
   requesting a stream segment of a third bitrate smaller than the first bitrate;
   receiving the requested stream segment of the third bitrate; and
   displaying the video data corresponding to the received stream segment of the third bitrate on the sub area.

2. The control method according to claim 1, further comprising the step of measuring a current bandwidth, wherein the step requesting the stream segment of the second bitrate includes requesting the stream segment of the second bitrate different from the first bitrate on the basis of the detected size change of the screen and the measured bandwidth.

3. The control method according to claim 1, further comprising the step of requesting the stream segment of the first bitrate among the stream segments of several bitrates, which constitute the first content, on the basis of a screen size of the display unit of the multimedia device.

4. The control method according to claim 1, if another content in addition to the first content is executed in a background of the multimedia device, further comprising the step of recovering a resource assigned for processing of another content.

5. The control method according to claim 1, wherein, if the step of detecting the size change of the screen includes decreasing the size of the screen on which the video data is displayed, the second bitrate is smaller than the first bitrate.

6. The control method according to claim 1, further comprising the steps of:
receiving a stream segment of a fourth bitrate among the stream segments of several bitrates, which constitute a third content, on the basis of a size of the main area; and
displaying a video data corresponding to the received stream segment of the fourth bitrate on the main area,
wherein the second bitrate is smaller than the first bitrate, and the fourth bitrate is greater than the second bitrate.

7. A control method for a multimedia device for receiving a first content in an adaptive bitrate streaming mode, the control method comprising:
receiving a stream segment of a first bitrate among stream segments of several bits which constitute the first content;
displaying video data corresponding to the received stream segment of the first bitrate on a display unit;
detecting a size change of a screen on which the video data is displayed;
requesting a stream segment of a second bitrate which is different from the first bitrate on the basis of the detected size change of the screen;
receiving the requested stream segment of the second bitrate;
displaying video data corresponding to the received stream segment of the second bitrate on the display unit;
splitting the screen of the display unit into a first area and a second area smaller than the first area;
requesting a stream segment of a third bitrate smaller than the first bitrate;
receiving the requested stream segment of the third bitrate; and
displaying the video data corresponding to the received stream segment of the third bitrate on the second area.

8. The control method according to claim 7, further comprising the steps of:
receiving a stream segment of a third bitrate among the stream segments of several bitrates, which constitute a second content, on the basis of a size of the second area; and
displaying a video data corresponding to the received stream segment of the third bitrate on the second area,
wherein each of the second bitrate and the third bitrate is smaller than the first bitrate.

9. The control method according to claim 7, further comprising the steps of:
receiving a stream segment of a fourth bitrate among the stream segments of several bitrates, which constitute a third content, on the basis of a size of the sub area; and
displaying a video data corresponding to the received stream segment of the fourth bitrate on the sub area,
wherein the second bitrate is smaller than the first bitrate, and the fourth bitrate is smaller than the second bitrate.

10. The control method according to claim 7, further comprising the steps of:
receiving a first command for executing a web browser; and
displaying an execution screen of the web browser on the second area in response to the first command.

11. The control method according to claim 10, wherein the step of displaying the execution screen of the web browser on the second area includes searching for information related to the first content through the web browser on the basis of meta data of the first content, and outputting the searched result of the information to the execution screen of the web browser.

12. A control method for a multimedia device for receiving a first content in an adaptive bitrate streaming mode, the control method comprising the steps of:
receiving a stream segment of a first bitrate among stream segments of several bits, which constitute the first content;
displaying video data corresponding to the received stream segment of the first bitrate on a display unit;
detecting a size change of a screen on which the video data is displayed;
requesting a stream segment of a second bitrate, which is different from the first bitrate, on the basis of the detected size change of the screen, wherein the second bitrate is greater than the first bitrate when detecting that a size of the screen is increased;
receiving the requested stream segment of the second bitrate; and
displaying video data corresponding to the received stream segment of the second bitrate on the display unit,
wherein, if the step of detecting the size change of the screen includes changing the screen of the display unit to a full screen in a state that the screen of the display unit is split into at least two areas, the step of detecting the size change of the screen further includes displaying the video data corresponding to the received stream segment of a third bitrate on the full screen, and
wherein the third bitrate is greater than the first and second bitrates.

13. The control method according to claim 12, if the second bitrate is greater than the first bitrate and another content in addition to the first content is executed in a background of the multimedia device, further comprising the step of recovering a resource assigned for processing of another content.

14. A multimedia device for receiving a first content in an adaptive bitrate streaming mode, the multimedia device comprising:
a receiver configured to receive a stream segment of a first bitrate among stream segments of several bits, which constitute the first content;
a display configured to display video data corresponding to the received stream segment of the first bitrate;
a controller configured to:
detect a size change of a screen on which the video data is displayed;

request a stream segment of a second bitrate, which is different from the first bitrate, on the basis of the detected size change of the screen, wherein the second bitrate is greater than the first bitrate when detecting that a size of the screen is increased;

receive the requested stream segment of the second bitrate; and control the display to display video data corresponding to the received stream segment of the second bitrate, split the screen into a main area and a sub area in accordance with execution of a PIP function, request a stream segment of a third bitrate smaller than the first bitrate, receive the requested stream segment of the third bitrate, and control the display to display the video data corresponding to the received stream segment of the third bitrate on the sub area.

15. A multimedia device for receiving a first content in an adaptive bitrate streaming mode, the multimedia device comprising:

a receiver configured to receive a stream segment of a first bitrate among stream segments of several bits which constitute the first content;

a display configured to display video data corresponding to the received stream segment of the first bitrate;

a controller configured to:

detect a size change of a screen on which the video data is displayed;

request a stream segment of a second bitrate which is different from the first bitrate on the basis of the detected size change of the screen;

receive the requested stream segment of the second bitrate; and control the display to display video data corresponding to the received stream segment of the second bitrate, split the screen into a first area and a second area smaller than the first area, request a stream segment of a third bitrate smaller than the first bitrate, receive the requested stream segment of the third bitrate, and control the display to display the video data corresponding to the received stream segment of the third bitrate on the second area.

16. A multimedia device for receiving a first content in an adaptive bitrate streaming mode, the multimedia device comprising:

a receiver configured to receive a stream segment of a first bitrate among stream segments of several bits, which constitute the first content;

a display configured to display video data corresponding to the received stream segment of the first bitrate;

a controller configured to:

detect a size change of a screen on which the video data is displayed;

request a stream segment of a second bitrate, which is different from the first bitrate, on the basis of the detected size change of the screen, wherein the second bitrate is greater than the first bitrate when detecting that a size of the screen is increased;

receive the requested stream segment of the second bitrate; and control the display to display video data corresponding to the received stream segment of the second bitrate, wherein, if the controller detects changing the screen to a full screen in a state that the screen is split into at least two areas, the controller is further configured to control the display to display the video data corresponding to the received stream segment of a third bitrate on the full screen, further the third bitrate is greater than the first and second bitrates.

* * * * *